(12) United States Patent
DeRaedt et al.

(10) Patent No.: US 11,192,772 B1
(45) Date of Patent: Dec. 7, 2021

(54) MANAGEMENT SYSTEM FOR BEVERAGE DISPENSING

(71) Applicant: BAR EVOLUTION LLC, Henderson, NV (US)

(72) Inventors: Peter Wolfgang DeRaedt, Henderson, NV (US); Bernd Witzany, Munich (DE)

(73) Assignee: BAR EVOLUTION LLC, Henderson, NV (US)

( * ) Notice: Subject to any disclaimer, the term of this patent is extended or adjusted under 35 U.S.C. 154(b) by 384 days.

(21) Appl. No.: 16/449,051

(22) Filed: Jun. 21, 2019

Related U.S. Application Data

(60) Provisional application No. 62/688,170, filed on Jun. 21, 2018.

(51) Int. Cl.
  *B67D 1/08* (2006.01)
  *G05B 19/042* (2006.01)
  *B67D 1/00* (2006.01)

(52) U.S. Cl.
  CPC ......... *B67D 1/0888* (2013.01); *B67D 1/0041* (2013.01); *G05B 19/042* (2013.01); *G05B 2219/2645* (2013.01)

(58) Field of Classification Search
  CPC .. B67D 1/0888; B67D 1/0041; G05B 19/042; G05B 2219/2645
  See application file for complete search history.

(56) References Cited

U.S. PATENT DOCUMENTS

| | | | | |
|---|---|---|---|---|
| 6,908,032 B1* | 6/2005 | Somers, Jr. | ........ | G06Q 20/1085 235/379 |
| 7,627,496 B2* | 12/2009 | Walker | ............... | G06Q 30/0613 705/16 |
| 8,340,815 B2* | 12/2012 | Peters | .................... | G07F 9/002 700/236 |
| 8,442,674 B2* | 5/2013 | Tilton | .................. | B67D 1/0857 700/233 |
| 8,515,574 B2* | 8/2013 | Studor | ................ | A47J 31/5251 700/231 |
| 8,565,916 B2* | 10/2013 | Zhang | .................. | B67D 1/0888 700/235 |

(Continued)

FOREIGN PATENT DOCUMENTS

EP 1295844 A1 3/2003

*Primary Examiner* — Michael Collins
(74) *Attorney, Agent, or Firm* — Howard & Howard Attorneys PLLC

(57) ABSTRACT

Systems and methods for use with one or more beverage dispensing systems are provide. A system execution program is stored on a memory device. A database stores data records related to a plurality of users of the system and recipe records related to a plurality of beverages. A server includes a processor programmed to execute the system execution program to establish a creation engine and a licensing engine. The creation engine is programmed to allow a mixologist to create and/or edit a beverage recipe and store/update the beverage recipe in the database in one of the recipe records. The dispensing system is configured to dispense a beverage as a function of the beverage recipe. The licensing engine provides a commission to the mixologist in response to the dispensing system dispensing the beverage as a function of the beverage recipe stored in the one of the recipe records.

44 Claims, 44 Drawing Sheets

(56) References Cited

U.S. PATENT DOCUMENTS

| | | | |
|---|---|---|---|
| 8,676,376 B2* | 3/2014 | Quartarone | B67D 1/0024 |
| | | | 700/231 |
| 8,739,840 B2* | 6/2014 | Mattos, Jr. | B67D 1/124 |
| | | | 141/94 |
| D781,632 S | 3/2017 | Kaytas et al. | |
| 10,813,488 B2* | 10/2020 | Lavie | A23F 5/465 |
| 11,053,113 B2* | 7/2021 | Tomforde | A47J 31/521 |
| 2009/0069932 A1* | 3/2009 | Rudick | B67D 1/0888 |
| | | | 700/239 |
| 2012/0035761 A1* | 2/2012 | Tilton | B67D 1/0857 |
| | | | 700/233 |
| 2014/0107835 A1* | 4/2014 | Biasi | B67D 1/0892 |
| | | | 700/231 |
| 2019/0071298 A1* | 3/2019 | Tomforde | G06K 7/1417 |

\* cited by examiner

FIG. 5A — 26A

| | NAME | LOCATION DETAILS | CONTACT DETAILS | SYSTEM ID | INSTALLATION DATE | BANK DETAILS | LICENSED COCKTAIL RECIPES | LICENSE FEES PAID |
|---|---|---|---|---|---|---|---|---|
| OPERATOR #1 | | | | | | | | |
| OPERATOR #2 | | | | | | | | |
| OPERATOR #3 | | | | | | | | |
| OPERATOR #4 | | | | | | | | |
| ...... | | | | | | | | |
| OPERATOR #n | | | | | | | | |

FIG. 5B — 26B

| | NAME | FULL NAME | ADDRESS | CONTACT DETAILS | DOB | LIST OF RECIPES | RECIPE BRANDING | LICENSEE FEE (PER DRINK) RECEIVED OR PAID | RECEIVED RATING |
|---|---|---|---|---|---|---|---|---|---|
| CREATOR #1 | | | | | | | | | |
| CREATOR #2 | | | | | | | | | |
| CREATOR #3 | | | | | | | | | |
| CREATOR #4 | | | | | | | | | |
| ...... | | | | | | | | | |
| CREATOR #n | | | | | | | | | |

FIG. 5C — 26C

| | FULL NAME | ADDRESS | CONTACT DETAILS | DOB | PREFERRED BEVERAGE RECIPES (PER LOCATION) | RECIPE RATINGS | INVITED FRIENDS | LOCATIONS WHERE ORDERS PLACED | PREFERRED INGREDIENTS / BRANDS | POINTS EARNED | ORDER HISTORY | BRAND PREFERENCES |
|---|---|---|---|---|---|---|---|---|---|---|---|---|
| CONSUMER #1 | | | | | | | | | | | | |
| CONSUMER #2 | | | | | | | | | | | | |
| CONSUMER #3 | | | | | | | | | | | | |
| CONSUMER #4 | | | | | | | | | | | | |
| ...... | | | | | | | | | | | | |
| CONSUMER #n | | | | | | | | | | | | |

26D

| MASTER DATA | | | | | TRANSACTIONAL DATA | | | | |
|---|---|---|---|---|---|---|---|---|---|
| UNIT ID | PRODUCTION DATE | SERIAL NUMBER | SOFTWARE VERSION(S) | INTERFACES | PUMP TYPE | LOCATION | OPERATING MODEL (purchase, lease or revenue sharing) | HOURS OF OPERATION | # DRINKS DISPENSED | INGREDIENT STATUS INFORMATION |
| DISPENSING DEVICE #1 | | | | | | | | | | |
| DISPENSING DEVICE #2 | | | | | | | | | | |
| DISPENSING DEVICE #3 | | | | | | | | | | |
| DISPENSING DEVICE #4 | | | | | | | | | | |
| DISPENSING DEVICE #n | | | | | | | | | | |

| | NAME | INGREDIENT fields (type, brand, %alcohol, volume, sugar content, allergic relevance | TOTAL VOLUME/RECIPE | MIXING SEQUENCE | DESCRIPTION | GARNISH DETAILS |
|---|---|---|---|---|---|---|
| RECIPE #1 | | | | | | |
| RECIPE #2 | | | | | | |
| RECIPE #3 | | | | | | |
| RECIPE #4 | | | | | | |
| ...... | | | | | | |
| RECIPE #n | | | | | | |

| | SERVE RESTRICTIONS (times, dates, age,...) | DISTILLED SPIRIT VOLUME RESTRICTIONS | ALLERGIC RELEVANCE |
|---|---|---|---|
| REGULATION RESTRICTION #1 | | | |
| REGULATION RESTRICTION #2 | | | |
| REGULATION RESTRICTION #3 | | | |
| REGULATION RESTRICTION #4 | | | |
| ...... | | | |
| REGULATION RESTRICTION #n | | | |

FIG. 5F

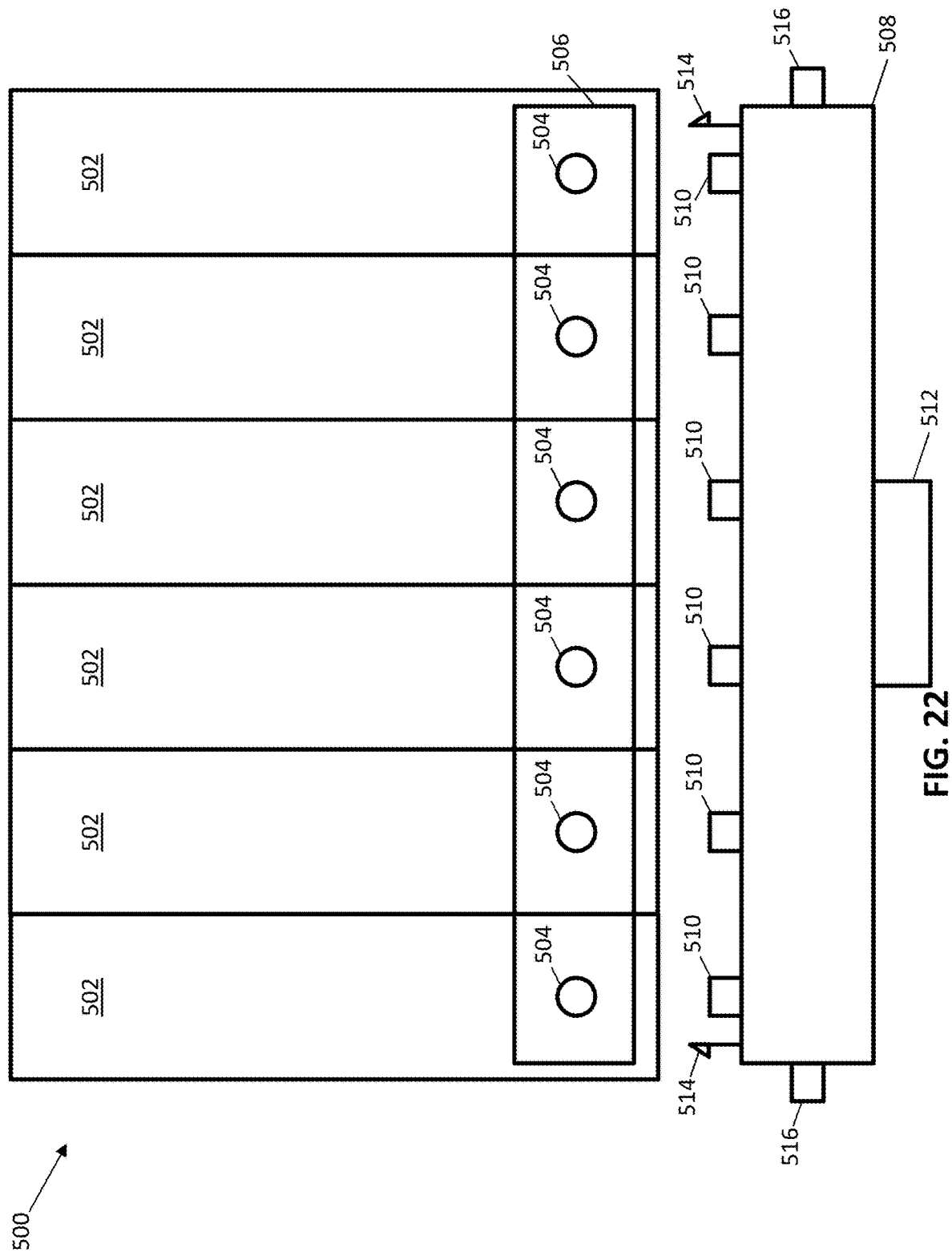

MANAGEMENT SYSTEM FOR BEVERAGE DISPENSING

CROSS-REFERENCE TO RELATED APPLICATIONS

The present application claims the benefit of U.S. Provisional Patent Application Ser. No. 62/688,170, filed Jun. 21, 2018, the entire disclosure of which is hereby incorporated by reference.

FIELD OF THE INVENTION

The present disclosure relates generally to beverage dispensing solutions, and more specifically, to systems and methods for supporting and managing the creation, licensing and promotion of beverage, e.g., cocktail recipe and related services.

BACKGROUND OF THE INVENTION

The production of mixed drinks is a time-consuming event. Even the most experienced mixologist or bartender will need time to make the perfect drink based on a recipe. This recipe determines the ratios of the various ingredients to replicate the precise favor and presentation of as designed by the creator. The number of ingredients can vary from a minimum of 2 to 4 or more. Bar tenders are pretty busy, and this results in long production times for any cocktail as well as inevitably variations to the ratios. The demand of cocktails is on the rise and the variety of ingredients as well as the creativity continues to grow especially with the younger demographics as they tend to be more demanding and creative.

Automation is the only answer to support the increasing demand making mixed drinks a main stream product, serving them at the same speed as any other drink in the bar like a glass of beer or wine. Any recipe can now be consistently be produced with the same quality within 3 to 4 seconds.

There are global bartending competitions to find the most imaginative Bartender. These competitions celebrate the power of imagination in cocktail making with an aim to inspire the endless creativity that is at the heart of great cocktail making. Brands are very interested in this since the creators of the recipes will frequently pick a specific brand for its flavor and combine it with other ingredients that result in the ultimate recipe. The creator may win recognition and/or a prize but does not benefit from ongoing royalties.

The system and method described recognizes this and offers a solution to financially reward creators whenever their recipes have been ordered from a dispending device. This information provides recognition for the creators and can be used towards brand building. Additionally, brands used within the creator's recipe will benefit through further brand recognition.

The system can also ensure that the recipe and production of a mixed drink is in compliance with the applicable regulation by ensuring the total amount of alcohol per drink dispensed is within jurisdictional limits. Any operators may opt to select a function in the system to comply with local operations and/or determine their own limits per drink.

The system also offers to ability to allow a consumer to remotely order, change or create a totally new recipe based on the ingredients available at that dispensing system. Again, the consumer will only be able to mix ingredients with the total Alcohol amount set by the operator/system predetermined restrictions. The consumer is able to share this recipe with other friends via social media. The consumer can become a creator and build recognition as a result of the system build-in functionality that allows consumers to vote on recipes.

The system provides significantly more real-time market data and business intelligence never available to the benefit of Brand companies and others.

(Alcohol) brands spend significant resources on promotion & marketing campaigns to build and/or enhance brand recognition. Its costly for several reasons:
- to design a promotion & marketing campaigns requires significant resources and creativity
- Brands have to convince customers/prospects to participate to a campaign. This is often difficult due the time constraints of customers
- Brands often not have appropriate access to a marketplace where they can offer their promotions.
- Brands often do not have proper data of the impact of their promotions=>
- Brands offer their promotions without proper data on the potential impact as they lack quality data from previous promotions.

In combination with a beverage dispensing device the following invention creates a (digital) marketplace for promotions and/or marketing campaigns. It helps to:
- significantly lowers the cost of designing promotions by offering an engine that allows to easily offer standards for running a promotion
- reduce the efforts to convince customers to participate in a promotion as a customer can search on available promotions that meets customer needs
- reach more potential customers as any customer, connected to a linked beverage dispensing device, could be personally addressed
- generate high quality data like costs and benefits of a particular promotion due to the real time automatic data gathering of the connected beverage dispensing devices The present disclosure is aimed at solving one or more of the problems identified above.

SUMMARY OF THE INVENTION

In one aspect of the present invention a system for use with a beverage dispensing system is provided. The system includes a memory device, a database and a server. The memory device stores a system execution program including computer instructions. The database is coupled to the beverage dispensing system and stores (1) data records related to a plurality of users of the system and (2) recipe records related to a plurality of beverages. The server is coupled to the memory device and the database and including a processor programmed to execute the system execution program to establish a creation engine and a licensing engine. At least one of the users is a mixologist and the creation engine is programmed to allow the mixologist to create and/or edit a beverage recipe and store/update the beverage recipe in the database in one of the recipe records. The dispensing system is configured to dispense a beverage as a function of the beverage recipe stored in the one of the recipe records. The licensing engine is programmed to provide a commission to the mixologist in response to the dispensing system dispensing the beverage as a function of the beverage recipe stored in the one of the recipe records.

In another aspect of the present invention, a method for use with a beverage dispensing system is provided. The method includes the step of storing (1) data records related to a plurality of users of the system and (2) recipe records related to a plurality of beverages in a database, wherein at least one of the users is a mixologist, establishing a creation engine and a licensing engine by a server system coupled to the database, and allowing mixologist, using the creation engine, to create and/or edit a beverage recipe and storing/updating the beverage recipe in the database in one of the recipe records. The method further includes the steps of providing a dispensing system access to the recipe records stored in the database, allowing a consumer to request a beverage from the dispensing system, the beverage being a function of the beverage recipe stored in the one of the recipe records and providing, by the licensing engine, a commission to the mixologist in response to the dispensing system dispensing the beverage as a function of the beverage recipe stored in the one of the recipe records.

The systems and methods of the present invention may be used in conjunction with beverage dispensing device(s) to support and manage the creation, licensing, promotion of beverage, e.g., cocktail, recipes and additional services. For example, the systems and methods of the present invention may enable consumers to interact with dispensing device(s) using mobile and/or other external devices via a consumer application.

The application also enables to the following functionality:
- upload/download recipes to the system and/or a dispensing device;
- upload/download cocktail recipes, consumer created recipes, menus and/or mixologist information; and,
- download various metrics of a dispensing device, e.g., total sales per day/time, all data per cocktail per day/time, specific operator property data (MGM, or Hard Rock . . . ), geo-location, stock levels details, detailed usage of all ingredients including but not limited to brand names . . . )

The systems and methods of the present invention may include a licensing engine that promotes beverage recipes created by 3rd parties. The licensing engine may track licensed beverage recipes. A licensed beverage or cocktail recipe is a recipe offered by the application that awards a commission, e.g., a percentage of sales or a fixed price, to the mixologist thereby rewarding the creativity of mixologists by providing a platform to generate revenue.

Recipes may be received from a variety of sources. For example, mixologists may sign up to the library to share their recipes after agreeing to the licensing agreement. Recipes may be created and/or edited from a base recipe or template or created without a template.

The systems and methods of the present invention creates a platform that encourages mixologists to continue to innovate by rewarding them a commission/license fee. A dispensing device thereby acts as an enabler for anyone who creates successful recipes and provides a platform to establish a brand for the mixologist. The systems and methods of the present invention may also have a positive effect on companies that supply ingredients used in the recipes as brands may be promoted through recipes using these ingredients.

The systems and methods of the present invention provides a platform for mixologists to capitalize on their creativity and/or enable the mixologist to establish and/or promote their brand. The recurring revenue stream may be realized based on the popularity of the beverages based on a mixologist's recipe(s) and/or the mixologist's name and/or associated brands.

Recipes, and other data, may be stored in records in a database. The database may be made available to consumers using a subscription-based model that allows the consumers to upload/download beverage recipes to an appropriate dispensing device. The systems and methods of the present invention may be used to collect royalties for the mixologist and/or brand owners.

The systems and methods of the present invention may also support competitions via a built-in leader board application for the most popular recipes. The systems and methods of the present invention may contain an analytical marketing engine that collects data and provides metrics, such as seasonal drinks, during certain specific times, seasons, (cocktail recipes), brand popularity, ingredient ratios (which provide valuable data for brands).

An appropriate dispensing device may be connected to the systems and methods of the present invention. Lists of beverage receipts may be downloaded to the dispensing device(s). The recipes include the beverage ingredients and ratios (or percentages) for each ingredient. A specific brand may be associated with one or more of the ingredients of a recipe. The recipes may also include the garnish and/or other instructions details to ensure the best presentation of the beverage or cocktail.

The systems and methods of the present invention may collect detailed brand data consumption per consumer, location or event is a specific focus of the application.

A subscription engine may allow the operator of a system to select the beverage or cocktail recipes from a list of available or licensable recipes (or lists of recipes) based on the name of mixologist, popularity, key ingredient(s) and/or brand of ingredient(s). The operator may enable the availability of any recipe for one or more dispensing devices on a particular property or properties. For example, a property owner, i.e., the operator, may select/enable a number of cocktails containing, e.g., rum. The operator may select/enable only recipes containing a specific brand of rum, based on for example, an agreement with the owner of the brand.

The operator may further be able select the cocktails from a specific list or lists and (1) make available on the dispensing device(s), modify and save the modified recipe to the database. The operator may also be able to print a list of cocktails ingredients needed and be informed about stock levels. A supplier database may also be connected to the system that allows the operator to identify suppliers and/or automatically trigger an order via the system.

The systems and methods of the present invention may also automatically inform application user(s) and/or operators of new beverage recipes, popular beverages, brand promotions, and the like.

In one aspect of the present invention, a licensed beverage or cocktail recipe cannot be modified but only offered 'as is' to the consumer. The systems and methods of the present invention may provide detailed consumption and stock level requirements based on peak or averaged consumption of a period of time. The promotional engine may allow for the mobile promotion to the consumers of new and popular drinks, brand promotions etc. . . . .

To offer consumers flexibility, the consumer application may allow the consumer to download a pre-set beverage (cocktail) recipes list available on a local dispensing device (including the pre-set ratios for each recipe) of any one of the connected dispensing devices at a single property or properties in a geographic region.

Each dispensing device may have geo-location data and hence a consumer may obtain data in advance from a specific location and see what beverage recipes are offered or are available and subscribe to special offers at that location. The consumer application may route the consumer to a specific online store so you can order the ingredients of the cocktails you like and make them at home.

The consumer can be given a framework within to adjust and/or create his own cocktail recipes from the available ingredients but checked within the regulatory framework (restrictions of amount of alcohol/drink as they vary per jurisdiction/brands to pick from).

The consumer may be allowed to either (a). adjust any ingredient of the pre-defined recipe, (b). add/remove any ingredient, (c). create a new custom receipt based on the available ingredients and/or (d). upload the new/modified cocktail recipe(s) to share with friends and/or share the recipes in a standard system format for use with other devices.

The systems and methods of the present invention may verify the recipes against a set of rules or regulations defined either by the regulators, operators or any other third party. The rules or regulations may be based on, e.g., limitations of the percentage of alcohol/drink, amount of sugar per drink, amount of ingredients not to exceed etc. . . . . .

To assist in the creation of cocktails, the systems and methods of the present invention may have access to a suggestive database of combinations and may highlight in color those ingredient combinations that are possible (in green), not preferred (in yellow) or simply not advisable at all (in red) like lemon juice and cream.

The systems and methods of the present invention may track the use of all beverages or cocktails created by dispensing devices connected to the system and may award a mixologist with free drinks, points or credits. These may be used across the network. The systems and methods of the present invention may also track beverages ordered by consumers and may recommend new beverages based on the consumer preference and/or historical consumption data.

The consumer application may function as an interface to order drinks in a self-service capacity from a dispensing device connected to the system. Age verification may be provided through collaboration with external services and be linked to available biometrics (if available) to ensure that drinks have been ordered or dispensed by a legitimate consumer. Additional biometric data can be used to identify the health status of the consumer (intoxication level) thereby preventing the consumer to order a drink.

Using the consumer application, the consumer may request ingredients and/or brands that are currently not available thereby sharing local consumer needs with the operator. By offering the consumers the ability to create their own beverage/cocktail recipes or selecting a cocktail recipe from the library/database, the operator will be able to adjust the cocktail recipes offered in that market based on the market data gathered.

The consumer application may also allow a consumer the ability to vote on anybody's recipes and provide the ability to comment via the system and/or other social media platform.

The consumer application may support the concept of a "membership bonus system". The consumer application may allow consumer to apply for a membership that entitles the consumer to gain points which can be used at any location that supports the membership loyalty program. Based on their status the consumer may be entitled to:
- request new ingredients/brands,
- self-dispense drinks,
- receive free drink offers or share their offer with someone else, and
- invite another member to a drink.

Communication between the consumer application and the dispensing device(s) may be via NFC, Bluetooth, QCode or other communication medium. The consumer application may get the data via the cloud from the local dispensing device.

The dispensing device(s) may include built-in fluid flow sensor(s) to track and indicate the level of distilled spirits consumed and a multi-color LED or any other display or signal may be used to inform the operator of the status so that containers can be quickly removed/replaced. The beverage dispensing device(s) may include built-in or externally connected indicator(s) to show the status and/or level of the one or more ingredient(s) in a container. Also, a device built-in to the dispensing device may provide ingredient packing ID the packaging and the content thereof to indicate if the right ingredient is connected to the dispensing device.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

FIG. 5A is a diagrammatic illustration of a series of operator records including sample operator record fields, according to an embodiment of the present invention.

FIG. 5B is a diagrammatic illustration of a series of creator records including sample creator record fields, according to an embodiment of the present invention.

FIG. 5C is a diagrammatic illustration of a series of consumer records including sample consumer record fields, according to an embodiment of the present invention.

FIG. 5D is a diagrammatic illustration of a series of dispensing device records including sample dispensing device record fields, according to an embodiment of the present invention.

FIG. 5E is a diagrammatic illustration of a series of recipe records including sample recipe record fields, according to an embodiment of the present invention.

FIG. 5F is a diagrammatic illustration of a series of regulatory records including sample regulatory record fields, according to an embodiment of the present invention.

FIG. 22 illustrates an alternative embodiment of a beverage dispensing package having elongated rectangular compartments that may be used with the beverage dispensing system shown in FIG. 18.

DETAILED DESCRIPTION OF INVENTION

Figure 1:
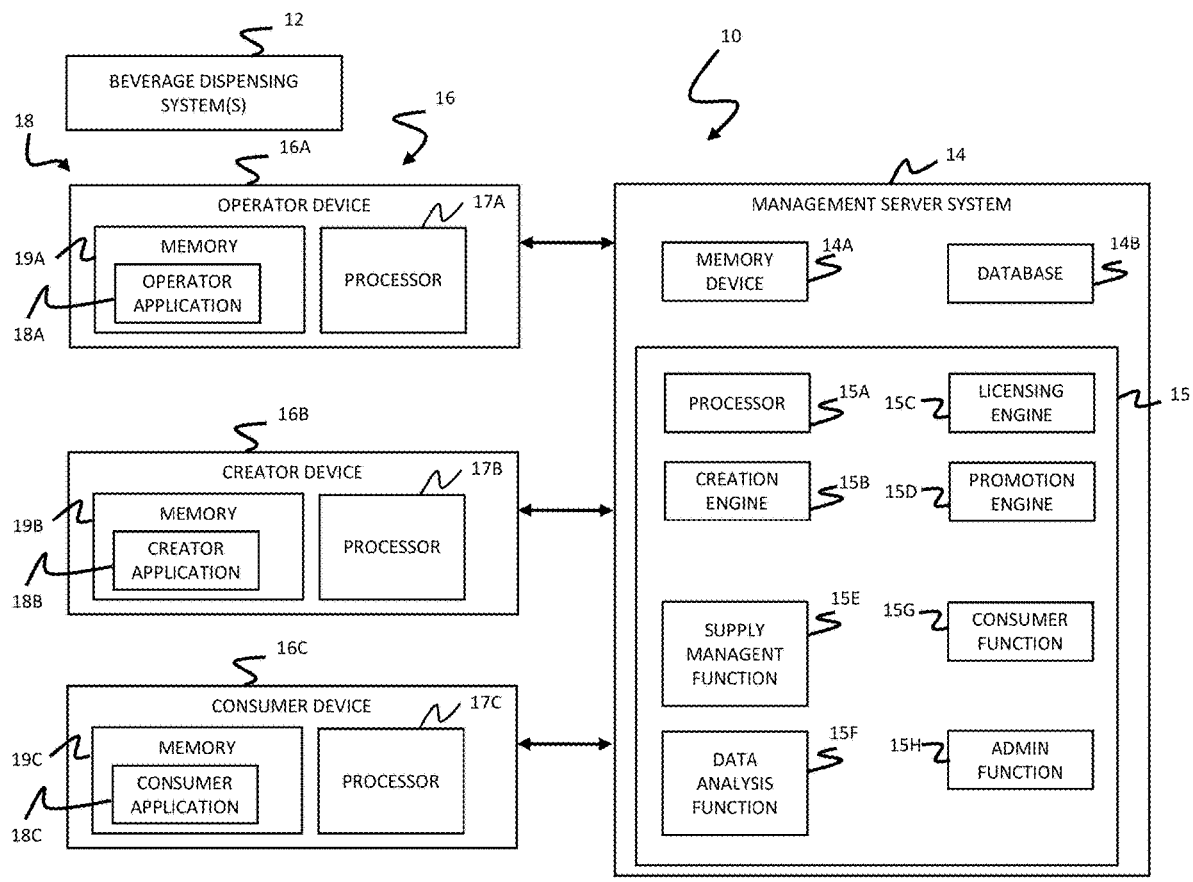
FIG. 1 is a block diagram of a system for managing and supporting the creation, licensing, promotion of beverage, e.g., cocktail, recipes and additional services, according to an embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

With reference to the FIGS. and in operation, the present invention provides systems 10 and methods for use with one or more beverage dispensing system(s) 12 to support and manage the creation, licensing, promotion of beverage, e.g., cocktail, recipes and additional services. In one embodiment, the present invention is used to manage beverage recipes, and specifically, cocktail recipes. However, the systems 10 and methods of the present invention may be used to manage recipes for the creation of any product. In this regard, the term "recipe" is used to refer to the ingredients or components and the instructions to make any type of product.

In the following description, the following terms are used:

Client: a user of the system or a device connected to the system. A client may be a consumer, a mixologist, an operator or a person associate with an operator.

Consumer: a person who consumes or uses a product produced by dispensing device.

Licensor: a person that creates or owns a recipe and/or licenses recipe(s), a person that allows its name/brand to be used by an operator and/or an administrator.

Licensee: a person that wants to use the products and/or services of the Licensor for paying or receiving money.

Mixologist: a person who creates a recipe.

Ingredient: material used in a recipe.

Recipe: any combination of ingredients resulting in a product, may include mixing or other instructions such as specific instructions for combining the ingredients.

Operator: a person or entity that owns/operates a dispensing device.

Administrator/Administration: an entity that operates a system or operates the method under the present invention for creating a marketplace that offers products and/or services to licensee(s) and licensor(s).

With specific reference to FIG. 1, a system 10, according to one embodiment of the present invention is shown. The system 10 is coupled to one or more dispensing system(s) 12. In the illustrated embodiment, dispensing system 12 is a beverage dispensing system 12, such as a cocktail dispensing system 12, as described in detail below. However, it should be noted that the dispensing system 12 may include any type of device for constructing or assembling ingredients, including but not limited to a three-dimensional printer for constructing or assembling any type of product.

The illustrated system 10 includes a management server system 14. The management server system 14 may include one or servers 15, a system memory device 14A and a database 14B managed by the one or more servers 15. The database 14B stores and maintains various records for use by the system 10. The database 14B may be comprised of one or more databases distributed and/or maintained by the one or more servers 14A. The system memory device 14A stores one or more pieces of software or system execution program(s) which are used by the server(s) and/or other devices for controlling operation of the system, servers 14S and/or other devices of, or associated with, the system 10. The system execution program(s) comprise algorithms, which when run by the various devices, implement respective functions and/or engines of the system 10.

As discussed above, in the illustrated embodiment, the (system) memory device 14A stores a system execution program including computer instructions. The database 14B is coupled to the beverage dispensing system 12 for storing (1) data records related to a plurality of users of the system and (2) recipe records related to a plurality of beverages. The server system 14 is coupled to the memory device 14A and the database 14B. The server 15 includes a processor 15A programmed to execute the system execution program to establish a creation engine 15B and a licensing engine 15C. At least one of the users is a mixologist and the creation engine 15B is programmed to allow the mixologist to create and/or edit a beverage recipe and store/update the beverage recipe in the database 14B in one of the recipe records.

As will be described in more detail below, the dispensing system 12 is configured to dispense a beverage as a function of the beverage recipe stored in the one of the recipe records.

Further, the licensing engine 15C is programmed to provide a commission to the mixologist in response to the dispensing system 12 dispensing the beverage as a function of the beverage recipe stored in the one of the recipe records.

In general, the system 10 may be implemented using a cloud-based computing system, e.g., a management server system 14, which may include the one or more servers 15. The server system 14 includes and manages the database 14B. The systems 10 and methods of the present invention allow users to manage, create, license and perform other functions related to the use of recipes, for example, beverage recipes, and more specifically cocktail recipes. Referring to FIG. 1, an exemplary environment in which the system 10 operates is illustrated. In the illustrated embodiment, the system 10 is configured to enable a user to access the database 14B and other functions of the system with a user device 16. Users may be an operator, a creator or a consumer having a respective operator device 16A, creator device 16B and consumer device 16C. Generally, each type of user has various functions related thereto, although some functions may be shared. Each device 16A, 16B, 16C includes a processor 17A, 17B, 17C and respective memory 19A, 19B, 19C. An application, e.g., software instructions or "app" is stored on the memory 19A, 19B, 19C. In the illustrated embodiment, an operator application 18A is stored in the memory 19A of the operator device 16A; a creator application 18B is stored in the memory 19B of the creator device 16B; and a consumer application 18C is stored in the memory 19C of the consumer device 16C. The devices 16 may be a desktop or laptop computer, a mobile device, such as a cell phone or other device. The applications 18 may be a set of computer instructions or software application or "app" running on a mobile device or an internet browser which provides access to a website or application running on the server(s) 15.

For clarity in discussing the various functions or engines of the system 10, multiple computers and/or servers are discussed as performing different functions. These different computers (or servers) may, however, be implemented in multiple different ways such as modules within a single computer, as nodes of a computer system, etc. The functions performed by the system 10 (or nodes or modules) may be centralized or distributed in any suitable manner across the system 10 and its components, regardless of the location of specific hardware. Furthermore, specific components, engines or functions of the system 10 may be referenced using functional terminology in their names. The function terminology is used solely for purposes of naming convention and to distinguish one element from another in the following discussion. Unless otherwise specified, the name of an element conveys no specific functionality to the element or component.

Communications between the device 16 and the system may be performed using any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user devices 16 may include any suitable device that enables a user to access and communicate with the system 10 including sending and/or receiving information to and from the system 10 and displaying information received from the system 10 to a user. For example, in one embodiment, the user devices 16 may include, but is not limited to, a desktop computer, a laptop or notebook computer, a tablet computer, smartphone/tablet computer hybrid, a personal data assistant, a handheld mobile device including a cellular telephone, and the like.

The processors of the various devices 16 and servers 15 execute various programs, and thereby controls components of the system 10. Each device 16 or server may include one or more processors 17A, 15A and respective memory 19A. The memory 19A may include read only memory (ROM) and random-access memory (RAM) for storing processor-executable instructions. In embodiments where the device or server 16, 15 includes two or more processors, the processors can operate in a parallel or distributed manner.

Figure 2:
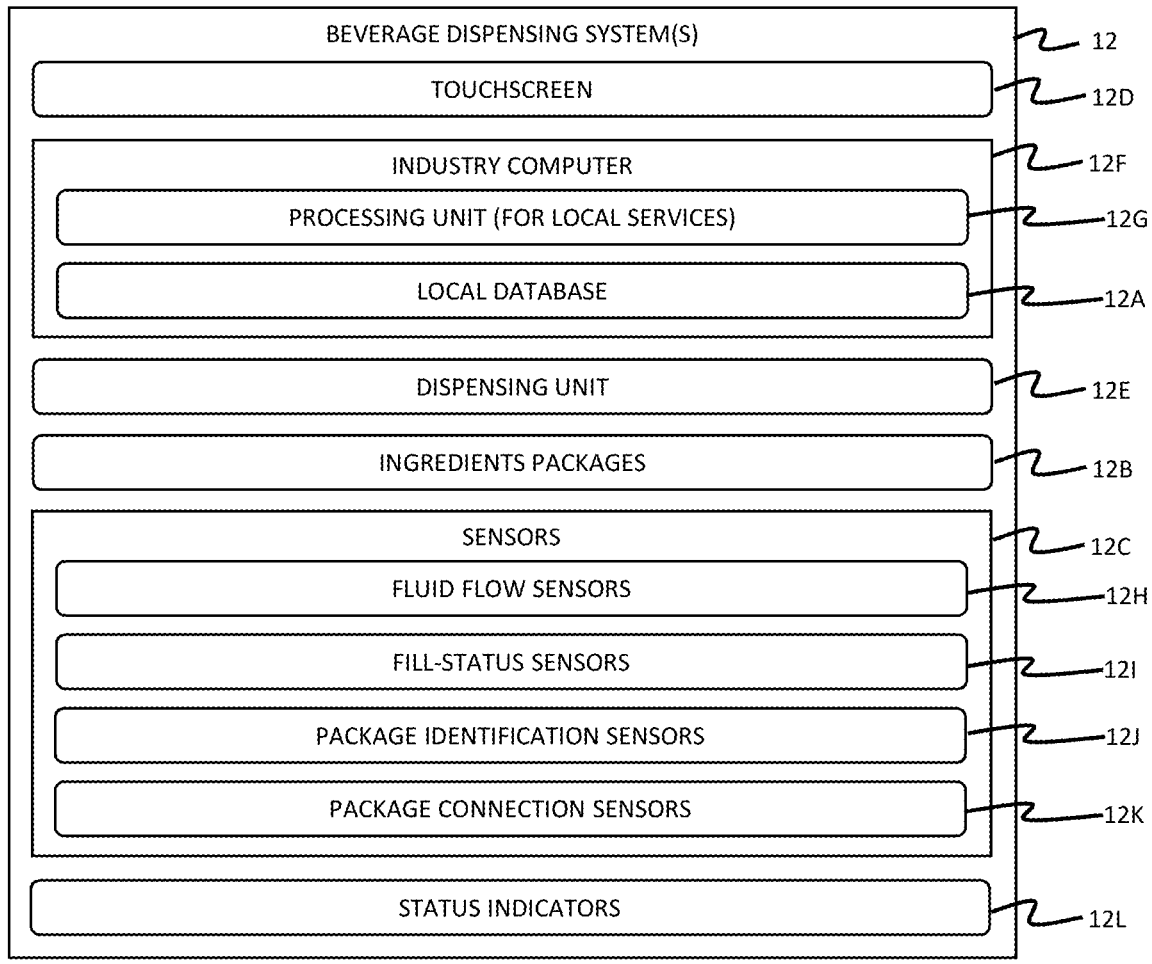
FIG. 2 is a block diagram of a beverage dispensing system for use with the system of FIG. 1.
Figure 3:
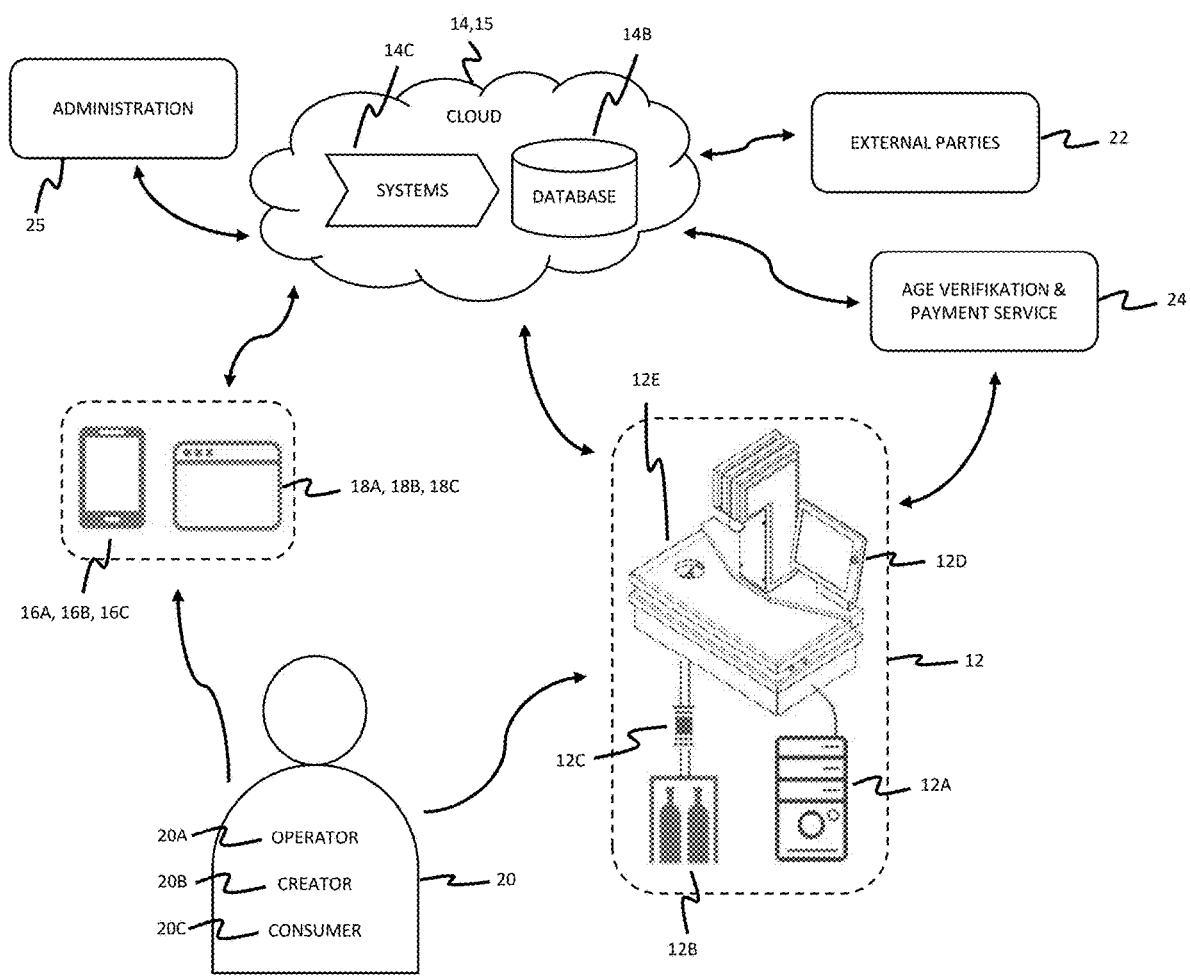
FIG. 3 is a diagrammatic illustration of the system of FIG. 1, according to an embodiment of the present invention.

FIG. 2 and FIG. 3 represent an exemplary beverage dispensing device 12 and a system 10 for managing one or more beverage dispensing devices 12, according to an embodiment of the present invention. The exemplary system 10 is used by one or more users 20, such as an operator 20A, creator 20B and/or a consumer 20C. Using the respective application or "app" 18A, 18B, 18C running on the respective user device 16A, 16B, 16C, a user 20 may interact with the system 10 and/or the beverage dispensing device(s) 12. In addition, the respective app 18A, 18C, 18C may allow the respective user to interact, access or utilize provide external payment service provider(s) 22 and other external service providers 24. These are described in more detail below. A client device may be any suitable device, such as a laptop, notebook or desktop computer, a mobile phone, tablet or other computing device that allows a user to interact with the system 10.

The management server system 14, including the one or more server(s) 15 and the database 15 and system services 14C may be implemented remotely and be hosted by a third party. Thus, the system 14 may exist in the "cloud". The system services 14C refers to the engines, functions and other services provided by the system 10.

The dispensing device 12 may include a computer 12F, including a processing unit 12F, a local database 12A, ingredients packages 12B, an interface device, such as a touchscreen device, 12D, and a dispensing unit 12E. Suitable dispensing devices 12 are described in U.S. Design Pat. D781,632s, issued Mar. 21, 2017 and European Patent Application 1295844, both of which are incorporated by reference.

The dispensing device 12 may also include a variety of sensors 12C and status indicators 12M. For example, the dispensing device 12 may include one or more of the following sensors: fluid flow sensors 12H, fill-status-sensors 12i, package identification sensors 12J, package connection sensors 12K. The sensors 12C may provide information to system 10 about the status of the ingredients, ingredient type, ingredient connectivity alignment issues, inventory control etc. The fill-status sensors 12I may be built into the ingredient packages 12B and send a constant signal over a package connector to the computer or processing device of the dispensing device 12. The fill-status sensors 12I may also send signal(s) to the status-indicator(s) 12L. This provide a double-checking or confirmation function, i.e., whether the fill-status is correctly calculated and the elimination of the task of manually setting the initial fill-status of packages.

The package identification sensors 12J may be built into the ingredient packages 12B and/or the package connector of the dispensing device 12. The sensors 12J identify the ingredient connected to the particular line and may receive additional ingredient information, such as the fill capacity of the packages. The sensors 12J send a signal to the computer or processing device 12F, 12G of the dispensing device 12.

One embodiment of a package identification sensor 12J is an RFID tag built into the ingredient package 12B and a RFID reader built into the package connector. The RFID tag/reader may be used to supervise or confirm that that the correct package 12B is connected to the correct line and benefit the system in the same way as the fill-status sensors.

Package connection sensors 12K may be built into the connectors of the dispensing device 12 and be used to check whether the ingredient packages 12B are correctly connected to the connectors of the dispensing device 12. The sensors 12K may send a signal to the computer or processing unit 12F, 12G of the dispensing device 12 and/or status indicators 12L.

The dispensing device 12 may include several status indicators 12L that are built into the connectors, ingredient packages 12B and/or are externally connected. The indicators 12L may include multi-color LEDs or a simple LCD-panel which indicate the signals of the above described sensors. The indicators benefit the operator in being independent of the cloud supply management services which do not work in an offline setting and are independent of the local supply management services which require logging into the dispensing device over the touchscreen.

A user 20 may interact with the server system 12 and system services 14C through the application or app 18A, 18B, 18C on one of the user devices 16A, 16B, 1C. A user 20 may also interact directly with a dispensing device 12 using the interface device (or as a touchscreen device) 12D. For example, the consumer 20C may interact directly with the dispensing device 12 to order a beverage. And an operator 20A may also interact with the dispensing device 12, for example, to download recipes and monitor the status indicators 21M for visual support.

Various external parties 22 may be connected to the server system 14 to access or interact with various system services 14C. The external parties 22 may include brands, suppliers and external data providers. The external parties 22 may communicate directly with the Administrator/Administration 25 or communicate with the system services 14C through, for example, a web portal.

Figure 4:
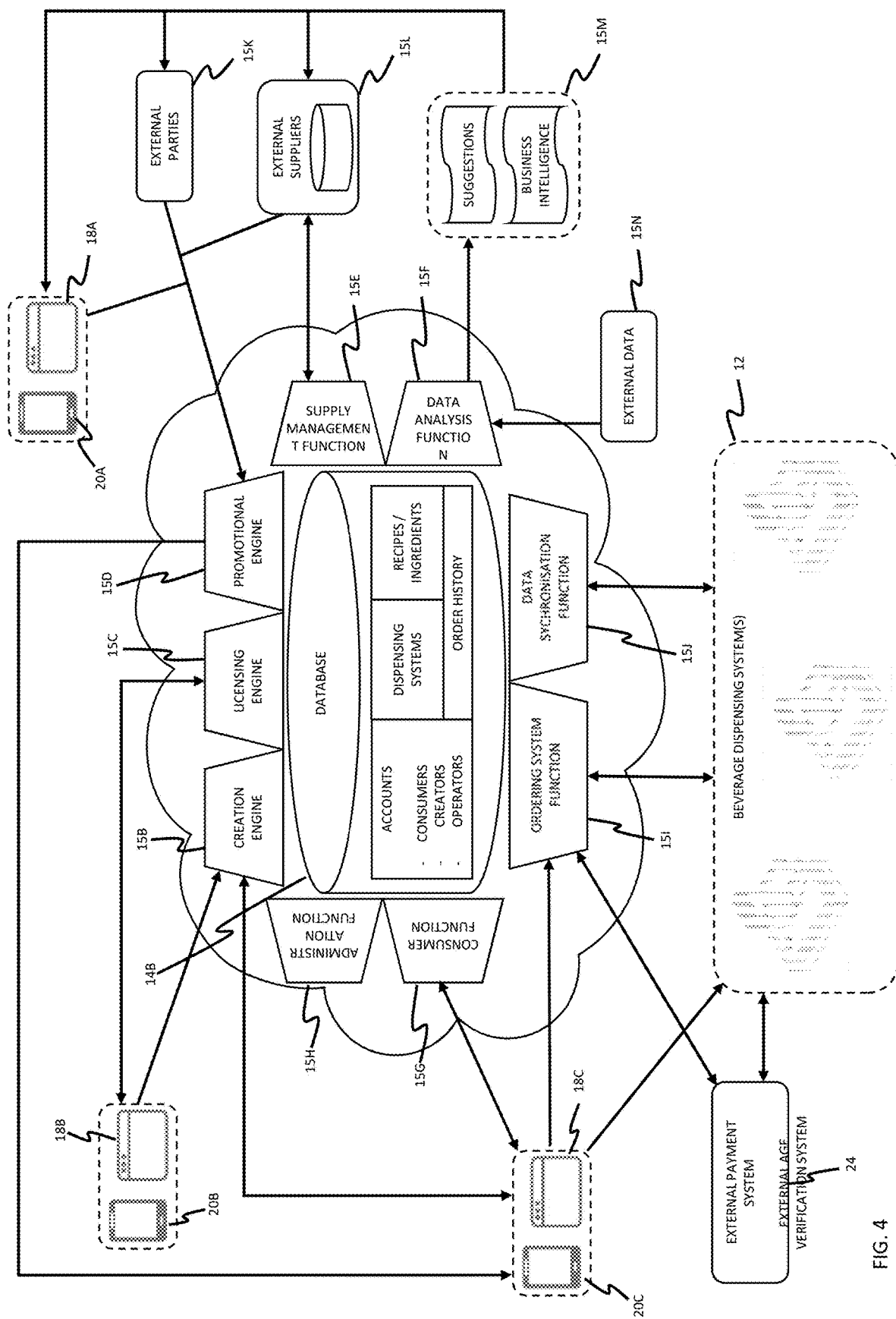
FIG. 4 is a diagrammatic function illustration of the system of FIG. 1, according to an embodiment of the present invention.

With reference to FIG. 4, a more detailed diagrammatical and functional view of the system 10, according to an embodiment of the present invention, is shown. The management system 10 of FIG. 4 may be used with one or more dispensing devices 10 to support and manage the creation and promotion of beverage recipes, for example cocktail recipes or mixed drinks; ingredients; ingredient brands, and related products and services through the creation, licensing and promotional engines. Further the management system serves as a data collection point system. With respect to FIG. 3, generally, the system 10 shown in FIG. 4 is implemented using a cloud-based server system 12 and includes a database 14B and various supporting applications, i.e., engines and functions that provide external services. In the illustrated embodiment, the system 10 includes the following elements:

1. Database 14B for storing records of various user (consumers, creators ("mixologists") operators, order history, details related to a plurality of dispensing device(s) 12 connected to the system 10 and beverage recipes, including ingredients and instructions.
2. Interfaces/Services including, but not limited to (a) creation engine 15*b*, (b) licensing engine 15C, (c) promotion engine 15D, (d) supply management function 15E, (e) data analysis function 15F, (f) consumer function 15G, (g) administration (admin) function 15H, (h) ordering system function 15I, and (i) data synchronization function 15J.

The supply management function 15E consists of the automatic and manual supply management for consumers and operators and the tracking of local dispensing device supply status as well as the resulting notification of operators. The supply management function 15E may have access to supplier databases. The service may also compare prices of different suppliers. The service may be configured for automatic reordering.

The data analysis function 15F is divided into automatic and manual data analysis (see below). Automatic data analysis is started by other services. Manual data analysis is configured by the administrator upon request by itself, brands, suppliers and/or operators. The data analysis function 15F may access all data of the cloud-based database which are available for data analysis use. The service may produce Business Intelligence or suggestions for the Administrator, brands, suppliers, Mixologists and/or Operators.

The leader-board list—in sequence of its popularity—of products like Cocktails, Brands, or any other pertinent data . . . ) service constantly updates the leader-board and saves them in the cloud database.

The data synchronization function or communication service 15J handles the automatic synchronization of the cloud-based database with the local databases of all dispensing devices. For Example: completed orders, the Cocktail Recipe list, local supply status, etc. are constantly being synchronized.

It should be noted that the database 14B may be a single large database, a number of separate databases for storing records of a similar type (of data) in a separate database. The database 14B may be stored or managed by a single server or may be distributed across multiple servers at one or more locations.

With reference to FIGS. 5A-5C, in the illustrated embodiments, the database 14B maintains records (in separate database(s) or sub-databases) related to (1) user accounts, (2) dispensing systems, (3) beverage recipes, and (4) order history. In the illustrated embodiment, database 14B includes 3 types of records: operator records; creator records; and consumer records. As shown in FIG. 5A, in the illustrated embodiment, the operator records 26A include the following fields: NAME, LOCATION DETAILS, CONTACT DETAILS, SYSTEM ID, INSTALLATION DATE, BANK DETAILS, LICENSED COCKTAIL RECIPES and LICENSE FEES PAID. As shown in FIG. 5B, in the illustrated embodiment, the creator records 26B include the following fields: NAME, FULL NAME, ADDRESS, CONTACT DETAILS, DOB, LIST OF RECIPES, RECIPE BRANDING, LICENSEE FEE (PER DRINK) RECEIVED OR PAID, and RECEIVED RATING. As shown in FIG. 5C, in the illustrated embodiment, the consumer records 26C include the following fields: FULL NAME, ADDRESS, CONTACT DETAILS, DOB, PREFERRED BEVERAGE RECIPES (PER LOCATION), RECIPE RATINGS, INVITED FRIENDS, LOCATIONS WHERE ORDERS PLACED, PREFERRED INGREDIENTS/BRANDS, POINTS EARNED, ORDER HISTORY and BRAND PREFERENCES.

Operators are individual, groups or entities that use one or more dispensing systems, connected to the system 10 to produce drinks based on stored recipes. Creators or mixologists are individuals who have created and licensed beverage or cocktail recipes, brands the recipe with an associated name and receives a licensing fee. Consumers are individuals that order drinks, either through the system 10 using the consumer application 18C or through the interface device 12D on one of the dispensing devices 12.

With reference to FIG. 5D, in the illustrated embodiment the database 14B includes a series of dispensing device records 26D. In the illustrated embodiment, each dispensing device record may include a number of master data fields (which are generally fixed) and a number of transactional data fields (which may change). In the illustrated embodiment the master data fields include: Unit ID, production date, serial number, software version(s), interfaces, and pump type. In the illustrated, the transactional data fields including: Location, operating model (e.g., purchase, leasing, rev share models), hours of operation, number of dispensed drinks, ingredient status information.

With reference to FIG. 5E, in the illustrated embodiment, the database 14B includes a series of recipe records 26E. In the illustrated embodiment, each receipt record may include: a recipe name and a number of fields related to use ingredient in the receipt. For instance, for each ingredient the recipe record may include: type, brand, % alcohol, volume, sugar content, allergic relevance. Further, each recipe may further include: a total volume amount per recipe, sequence of mixing, description and garnish details.

With reference to FIG. 5F, in the illustrated embodiment, the database 14 includes a series of regulatory records 26F which contains any location based regulatory restrictions. The regulatory records may also be used by operators to put in place minimum operational-wide restrictions beyond the local regulatory restrictions. One can select the strictest regulation and apply that to the whole operation. In the illustrated embodiment, each regulator record 26F may include the following fields: serve restriction fields, including, times, dates, age . . . ); distilled spirit volume restrictions; and allergic relevance.

Returning to FIG. 1 in the illustrated embodiment, the system 10 includes a creator application 16B. As discussed, the creator application 16B is configured to be run by the processor 17B on the creator device 16B. The creator application 16B may be used by a creator, e.g., a mixologist. Using the creator application 16B, the processor of the server 15 allows the mixologist to create and/or edit a beverage recipe using the creator application 16B. The database 14B is configured to storing ingredient records related to ingredients available to be used in beverage recipes. The creator application 18B is programmed to allow the mixologist to select, from the ingredient records, ingredients from the ingredient records to be used in the beverage recipe.

In one embodiment, the database 14B may include a list of ingredient combinations and a classification for each ingredient combination. For example, the classification may be one of: possible, not preferred and not advisable. The classification may be provided by the creator application 16B to the creator/mixologist during the creation process.

The system 10 may also including an operator application 18A. The operator application 18A is configured to be run by the processor 17A on the operator device 16A and used by an operator associated with one of the beverage dispensing systems 12. The processor of the server 15 is programmed by the system execution program to establish a subscription engine 15I. The subscription engine 15I is programmed to allow the operator to select one or more beverage recipes stored in the database 14B and to download the selected recipes to the beverage dispensing system 12. The operator application i18A may be further programmed to allow the operator to search the recipe records based on at least one characteristic of the beverage recipes or ingredients. For instance, the at least characteristic may be one or more of the following: mixologist, key ingredient, brand name of one of the ingredients, popularity.

The system 10 may further include a consumer application 18C. The consumer application 18C is configured to be run by the processor 17C on the consumer device 16C and used by a consumer to order a beverage from the beverage dispensing system 12. In addition, the consumer application 18C may be further programmed to allow the consumer to create and/or edit a beverage recipe.

The consumer application 18C may be programmed to allow other consumer related services. For instance, the system 10 may be linked to a plurality of beverage dispensing systems 12. The consumer application 18C may be programmed to allow the consumer to view and search the beverages available at each beverage dispensing system.

In another aspect of the present invention, the age of the consumer may be verified through the consumer application 16C using, for example, the external age verification system 24 prior to the beverage being dispensed.

In still another aspect of the present invention, the database may include a plurality of regulatory records, the regulatory records include a set of rules related to the recipe records 26F. The regulator records 26F may contain rules related to one or more of the following: (1) max volume of alcohol per recipe, (2) percentage of alcohol content, (3) maximum volume of alcohol per recipe, (4) number of ingredients, and (5) a set limit of any ingredient (min/max). The creation engine 15B may be further programmed to compare the recipes against the regulatory records and provide an indication of the comparison to the mixologist. Recipes consist of a set of ratios of the various ingredients used that make up that recipe. When the volume of any one of the ingredients changes the other ingredients will have to change in the same proportion in order to retain the intended taste of the recipe. The volume of ingredients may be changed due to a. jurisdictional rules or b. operator self-imposed rules and c. a combination of both of them. As an example, a jurisdiction A has a legal restriction that the amount of alcohol in a specific drink cannot be more than 4 ounce per drink. If the original recipe contains 2 ounce of rum and 4 ounce of vodka, 6 ounce of pineapple juice and 2 ounce of cranberry then, when the system administrator has configured the system by enabling the function to follow local jurisdictional rules, the system will automatically adjust all the ratios of the ingredients to ensure that when a specific dispensing device is operating in jurisdiction A the mixed drink dispensed will now not contain 6 ounce of alcohol but 4 ounce of alcohol. This means a ratio reduction by about 33%. The new recipe will look something like 1.32 ounce of rum, 2.64 ounce of vodka, 3.96 ounce of pineapple juice and 1.32 ounce of cranberry. The automatic adjustment of ratios is not limited to the amount of alcohol but can be managed depending on certain characteristics such as sugar levels, caffeine level etc. Since system knows the geographical location of each dispensing device it can, if configured by the Administrator, automatically comply with any and all jurisdictional rules as defined in the regulatory records. The administrator may configure the system to a. comply with all regulatory rules as defined in the database, b. complies with an administrator defined set of maximum levels or c. a combination of both a. and b. thereby always ensuring that the stringiest rules are being applied when applicable. Whilst there might be a set of regulatory rules entered into the system for specific jurisdictions, the dispending devices may very well operate in a jurisdiction without any limit on volume of alcohol dispensed. In this case again the administrator can apply a set of rules that could be a. no rule—recipe will be dispensed as is, b. total volume rule—ratio will be adjusted so that the total drink volume is met, c. total alcohol volume rule for the drink or d. any set of rule created by the administrator like total sugar level etc. The system also allows for a set of rules per licensee. For example a specific Brand that is a licensee in the system and uploaded its recipes might elect to be excluded from any rules, or define its own set of rules like all run cokes of this brand will be dispensed as total volume drink x with a total amount of rum of y.

In still another aspect of the recipe ratios are automatically be adjusted as a function of a geographical location associated with the dispensing system before the beverage is dispensed.

In still yet another aspect of the present invention, the database includes a plurality of operator records. The operator records includes a set of rules, established by the operator, related to the recipe records. The creation engine 15B is further programmed to compare the recipes against the operator records and provide an indication of the comparison to the creator. In one embodiment, the recipe ratios are automatically adjusted to ensure compliance with the operator records before the drink is dispensed.

As discussed in more depth below, the system execution program may also establish a data analysis function 15F. The data analysis function 15F may be used to track system data, including number of downloads of recipes and/or uses of recipes to create beverages on the dispensing systems 12 to maintain one or more lists or leaderboards of mixologists, recipes, ingredients (including brands) based on popularity.

Figure 6:
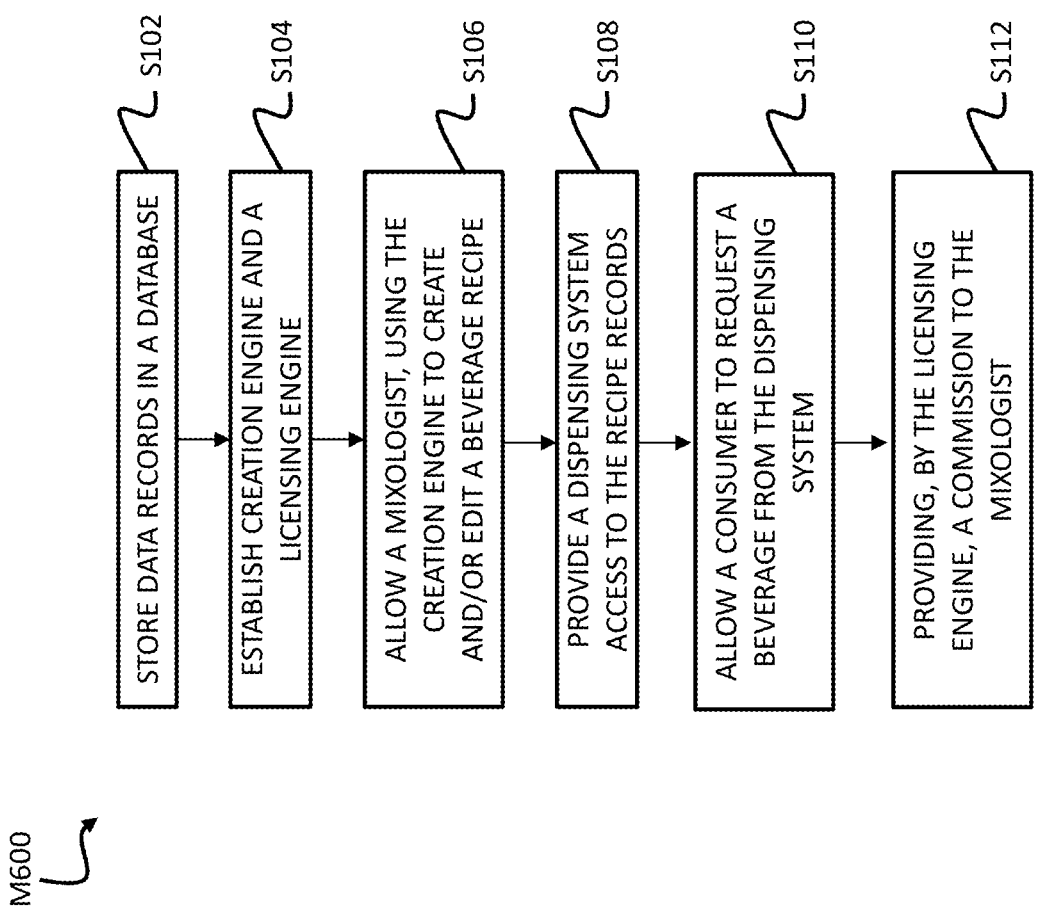
FIG. 6 is a flow diagram of a method for use with a dispensing system, according to an embodiment of the present invention.

With reference to FIG. 6, a method M600 for use with a beverage dispensing system 12 according to an embodiment of the present invention is provided. In a first step S102, data records are stored in the database 14B. The data records may be related to a plurality of users of the system and to a plurality of beverages in a database. At least one of the users is a creator or mixologist.

In a second step S104, a creation engine 15B and a licensing engine 15 are established by a server 15 coupled to the database 14B. In a third step S106, the creation engine 15B allows the mixologist to create and/or edit a beverage recipe and storing/updating the beverage recipe in the database 14B in one of the recipe records. A dispensing system 12 is provided access to the recipe records stored in the database 14B in a fourth step S108. A consumer is allowed to request a beverage from the dispensing system 12 in a fifth step S110. The beverage is a function of the beverage recipe stored in the one of the recipe records. A commission is provided to the creator (associated with the one of the recipe records) in a sixth step S112.

INDUSTRIAL APPLICABILITY

With reference to the drawings, and in operation, the present invention provides systems 10 and methods, for use with one or more beverage dispensing devices 12 to support and manage the 12 to support and manage the creation, licensing, promotion of beverage, e.g., cocktail, recipes and additional services. Using the respective application 18A, 18B, 18C, a user 20 may interact with one of the engines and/or functions of the system 14.

For instance, the creation engine 15B allows a consumer (or any user) to:

Search/view/download available beverage recipes which are available on the system 10, available at a given location (having one or more beverage dispensing devices), or a specific beverage dispensing device;

Search/view the ingredients, including brand of specific ingredients, available on the system 10, available at a given location (having one or more beverage dispensing devices), or a specific beverage dispensing device; and, Search/view/download available beverage recipes available from a specific operator (assuming, for instance, that the operator uses the same ingredients for all dispensing devices 12 used during an event or within the property).

Further, the creation engine 15B may allow a creator/mixologist to:

Search/view/download the ingredients (in the system 10, at a specific location or by dispensing device);

Add a new ingredient and/or brand; and,

Inform an operator of the need of a particular ingredient for a recipe. In general, beverage or cocktail recipes will only be available (and hence licensable) when an operator makes available that ingredient and/or brand of ingredient.

An operator of the platform decides what information can be shared with either the consumer(s) or the creator(s). For example, the Operator might restrict access to information of a location(s) and/or dispensing device(s).

In general, the creation engine 15B is a tool to create recipes of beverages such as mixed drinks. During the creation process, the creation engine 15B provides access to the cloud-based ingredient database or a selection of ingredients, restricted by the available ingredients in a selection of dispensing devices. The creator may choose:

one or more ingredients, the quantity of each Ingredient and the order and timing of dispensing/adding/mixing to create a beverage recipe.

The creation engine 15B may further includes a suggestion system for ingredients, a state rule compliance ("regulatory) system and a price calculator. The creator may start the creation engine 15B with a preset recipe and modify the preset recipe to produce a new recipe.

Figure 7:
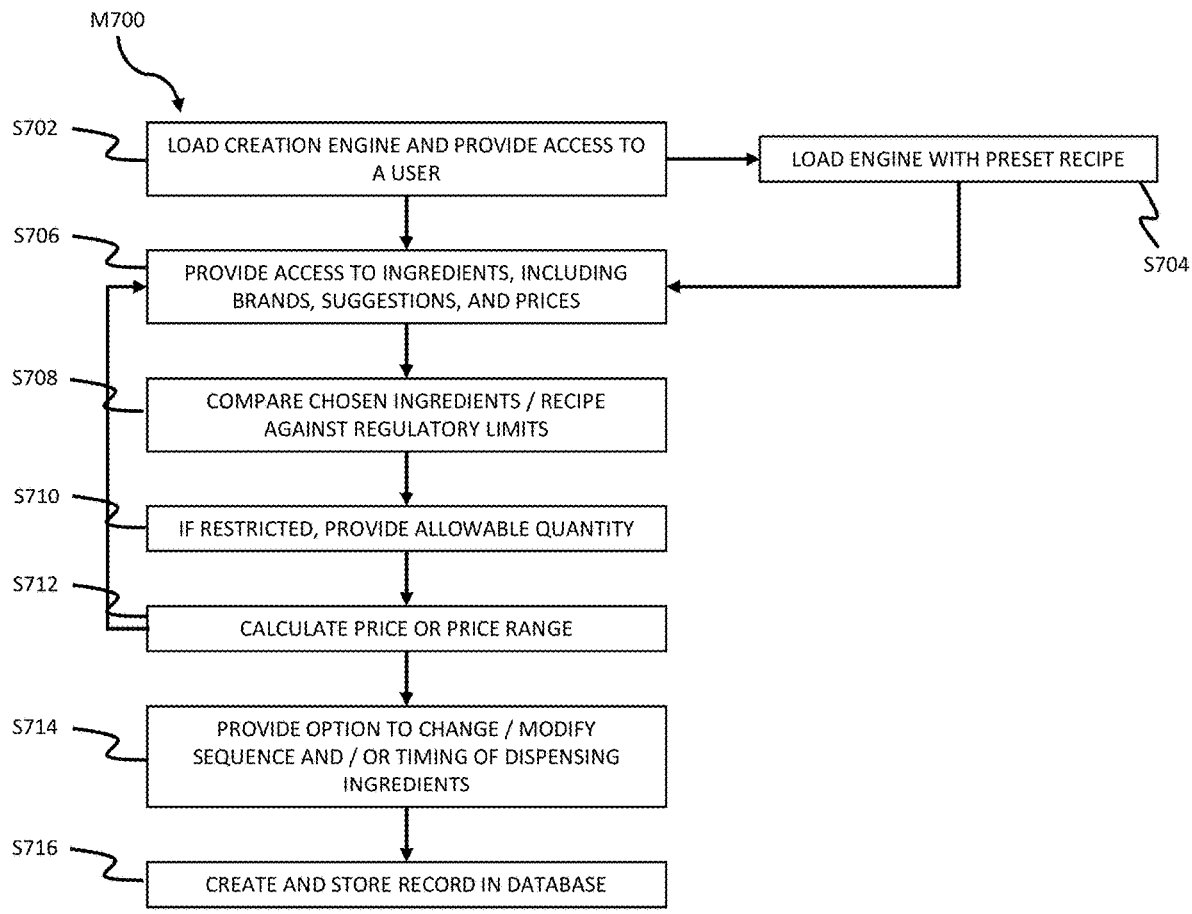
FIG. 7 is a flow diagram of a method of operation of a creation engine of the system of FIG. 1, according to an embodiment of the present invention.

With reference to FIG. 7, a flow diagram of a method M700 of operation related to the creation engine 15B is shown. In a first step S702, the creation engine 15B is initiated and a selection of available dispensing devices is loaded from the database 14B. The system 10 may then be accessed by a user (consumer, operator, administrator or creator) through an associated application, application, portal or via the interface/touchscreen device 12B on the dispensing system 12.

The user may load the creation engine 15B with an existing or preset recipe in a second step S704. In a third step S706, the user is provided access to the ingredients (from an ingredients database or records). The creation engine 15B may provide prices and may suggest ingredients (based on the existing or chosen ingredients in the recipe). The user may be allowed to filter and/or select one or more the dispensing device(s) 12 available through the system 10. The ingredients available may be limited based on the selected dispensing device(s) 12.

In a fourth step S708, after the user has selected an ingredient, the creation engine 15B compares the selected ingredient and compares against any regulatory limits (from the regulatory records). Based on the current ingredients, the creation engine may calculate the maximum amount of the selected ingredient that may be added.

In a fifth step S710, the creation engine 15B may provide a suggest with respect to the selected ingredient. Based on all of the selected ingredients, a total price or price range is provided in a sixth step S712.

If the user has additional ingredients to add to the recipe than the method 700M returns to the third step S706. Otherwise, the method 700M proceeds to a seventh step S714.

In the seventh step S714, the creation engine 15B allows the user to change/modify the sequence and/or timing of the dispensing or adding of the individual ingredients.

The recipe is then compiled into a record and the record stored in the database 14B in an eighth step S716.

The licensing engine 15C promotes Cocktail Recipes created by third parties, i.e. creators. In one aspect of the present invention, the licensing engine 15C tracks licensed recipes, such as a beverage or cocktail recipe. A licensed recipe is a recipe offered by the system 10 that awards a commission (% of sales or fixed price) to the creator thereby rewarding the creativity of a creator and providing a platform to generate revenue. The recipes stored in the database 14B, i.e., the system's 10 recipes library may receive recipes from any source. After creating and storing a recipe in the recipe library (and agreeing to a licensing agreement between the creator and the administrator), the creator may share their saved recipe(s) using a pre-defined recipe format.

The dispensing device (12) act as an enabler for any creator who creates successful recipes and provides the creators a platform to establish their brand. The system 10 will also have a positive effect on liquor companies as the system 10 allows brand owners to promote their brands further through the creativity of successful recipes.

The system 10 and the licensing engine 15C, in particular, in combination with the dispensing device(s) 12 creates a marketplace allowing two or more parties to exchange their products and/or services. The licensing engine 15C manages the process between the parties involved. From the perspective of the licensing engine parties are the licensor, the licensee and the administrator. The licensor may a creator (or mixologist) of a (beverage or cocktail) recipe, a producer/supplier of a brand and/or ingredient, a celebrity or any other party that wants to sell, license a recipe and/or any additional products and/or services, e.g., the right to use a name or brand associated with the cocktail recipe on the licensee's property to one or more licensing partners (licensee).

The licensee may be any property or entity that wishes to receive products and/or offer services from a licensor using the dispensing devices. In one aspect of the present invention, a licensor, desiring to participate in the marketplace, needs to create an account on the system 10. In one embodiment, the licensor's account or record contains the following data fields:

Personal information (name, legal entity, DOB, address, . . . )

Financial information (bank details, selected payment schedule (daily, monthly . . . )

Payment History ( . . . )

A licensee that is interested in licensing products and/or services from a licensor must also create an account. A licensee's account contains the following fields:

Operators master data (name of legal entity, address, . . . ), User information (name, DOB, address, access rights . . . ), Financial information (bank details, selected payment schedule (daily, monthly, . . . ), and Payment History In the illustrated embodiment, the licensor may offer their products and/or services, including, but not limited to:

- (Beverage or cocktail) recipes (to be created or dispensed by a dispensing device),
- Onsite services for specific events at an operator's property,
- If the licensor is a (prominent) person, the licensor may offer to support a specific event at by the licensor's physical presence,
- If the licensor is a brand, the licensor might offer free of charge any of their products or any other promotional packages to the licensee,
- Offering services/consultations to operators to improve the operator's offerings, e.g., bar improvements, improvements on operational procedures, etc. . . . , or
- Providing free trial products over either a defined timeframe, e.g., up to three months or a defined volume.

The licensor may offer their products and/or services either to:

- To receive money ("positive payment") or any other compensation to be defined (marketing presence in the media),
- Free of charge,
- To pay money ("negative payment") or provide any other compensation, i.e. the licensor may pay the licensee an amount or any other contribution, e.g., labor, in order to motivate the licensee to accept his/her products and/or services, and
- Providing a contribution in cash or anything else like labor to the Licensor.

The intention is that the licensors might want to promote their products and or services at the licensee's property. The licensee may search for specific offers of products and or services, in which the licensee might be interested and can place request for proposals to the marketplace. The licensor may offer his/her products and/or services and search for bids from licensees.

The services provided by the system 10 may be summarized as follows:

- Providing a marketplace that allows the licensor and the licensee "to find each other".
- Allow both the licensor and the licensee to define their products/offers/services in a structured manner, that enables both parties to search and find relevant offers and bids.
- Provide proposals for standard agreements under which the licensor and the licensee can operate their business. The system 10 allows both parties to enter into those agreements electronically by using the services provided by the system 10.
- The creation engine 15B provides its built-in services, e.g., checking regulatory requirement for different jurisdictions, to the licensor.
- The system 10 tracks all licensing fees that any of the party is entitled to receive/obliged to pay.
- The system 10 is capable of handling payment transactions for the exchanged services/products.

Figure 8:
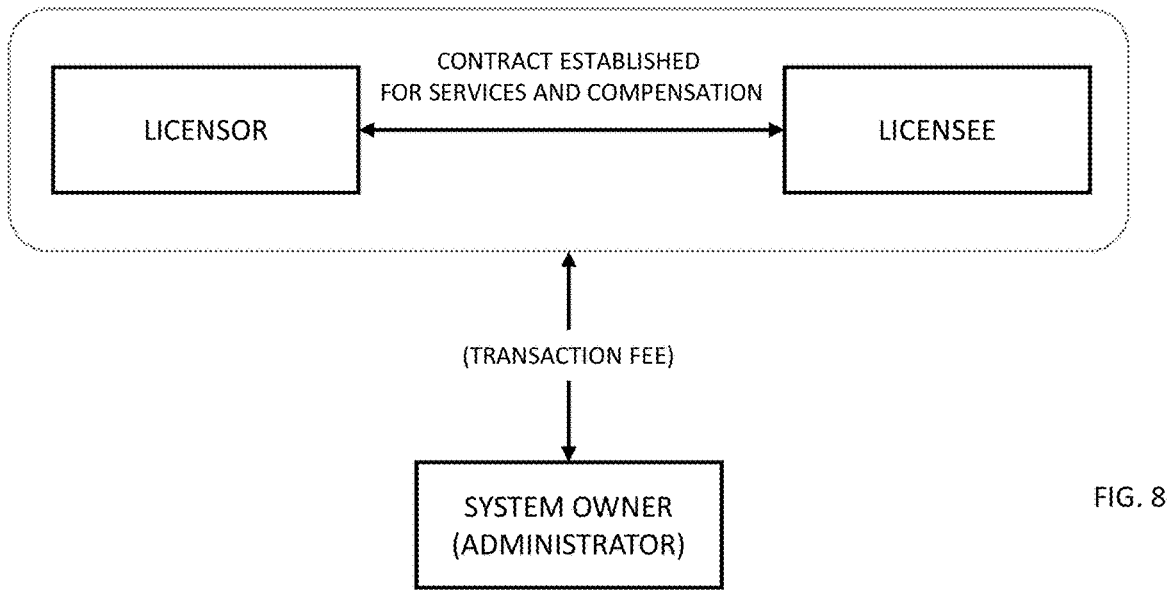
FIG. 8 is a block diagram of a passive licensing model used by the system of FIG. 1, according to an embodiment of the present invention.
Figure 9:
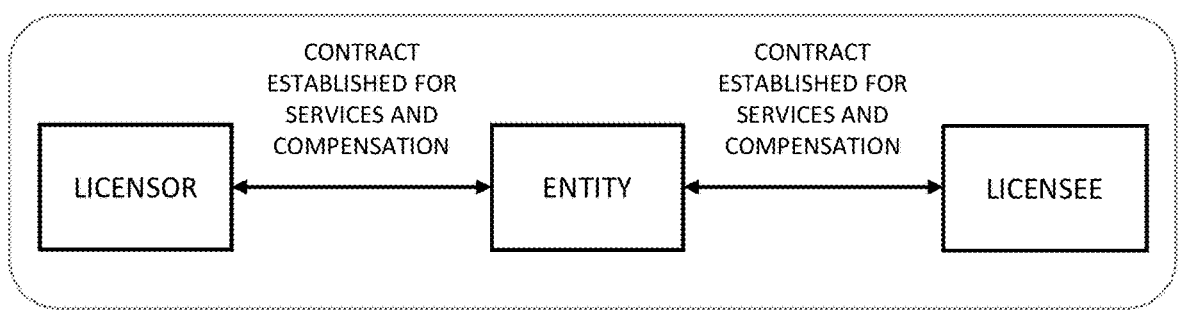
FIG. 9 is a block diagram of an active licensing model used by the system of FIG. 1, according to an embodiment of the present invention.

With reference to FIGS. 8 and 9, the licensing engine 15C may follow either a "passive" license model or an "active" license model. With specific reference to FIG. 8, in the passive model the licensing engine 15C facilitates the formation of a contractual relationship between the licensor and the licensee. The exchange of products/services and corresponding compensation is mainly between the licensor and the licensee. The administrator of the system 10 receives a transaction fee from either/and/or the Licensor and Licensee in exchange for the services provided by the system 10.

With specific reference to FIG. 9, in the active license model, the system 10 serves as the middleman between licensor and licensee by establishing a direct contractual relationship between the entity running the system 10 (the administrator) and the Licensor as well as between that administrator and the Licensee. The administrator buys and sells products and services to/from the licensor and the licensee. The system 10 handles all tasks as described under passive license, including all payment transactions.

License contracts/agreements may be stored in the database 14B. Each license contract has an associated license record. Each license records includes a plurality of fields, including, for example, but not limited to:

License Contract ID

Overall Account Balance [all license fee positions aggregated (also general fees)] Current Account Balance [total account balance—all payments to the Licensor/Licensee]

Payment History ID [tracks all payments to the Licensor/Licensee]

License fee positions ID

Every license fee account has an associated license fee positions list consisting of all completed order of a licensed recipe and associated fees and all general fixed fees of the license. Each license position may include the following fields:

Date

Fee type [see Fee ID]

Order ID [empty for general fees type]

Net-fee amount

If any licensed recipe is ordered online or locally, a new entry is created. If a local dispensing device 12 is not connected to the cloud, the licensed local order list has to be sent to the administration by the operator.

The licensor may access the system 10 to manage a licensor account through a license tracking interface (not shown). Using the license tracking interface, the licensor can login to their licensor account using an application or through a web portal. The license tracking interface allows the licensor to track their licensed services and/or account balance to have a transparent overview of all licenses.

The account balance may be viewed for different licenses. Within a license, the service also calculates the fees per fee type. The overall account balances or the current account balances can be viewed. The total account balance is the aggregated balances of all licenses one licensor holds, again divided into overall and current. For example, a licensor may view the total amount of fees collected for a service, for example, for a cocktail recipe) which is licensed with different partners. The licensor may view a list of all ordered services. e.g., of all or a specific licensed Cocktail Recipe, including the order locations. The licensor may get an overview of all his license contracts and the contract details.

The licensor interface also allows the licensor to request a license fee payment from one or more licensees at any time. If more than one license is affected, the service first aggregates all payment amounts from the same licensing partner and initiates the payment request separately per licensing partner.

In the case of an active license, the payment from the related financial account to the licensor financial account is immediately completed over an external payment service 24 (see FIG. 4). The system 10 may request the licensing fee payment periodically or upon licensor request from the operator financial account to the system.

In the case of a passive license, the payment from the operator financial account to the licensor financial account may be requested by the operator or may be immediately completed over the external payment service 24, if the Operator has agreed on automatic transactions in the operator account. After a completed transaction, the payment history and the current account balance of the specific license and the payment confirmations history of the specific licensor and operator is updated.

The promotion engine 15D provides an automatic or manual process for promoting a product or service for a licensor and allows a licensee to search for available products or services. In addition, it allows the licensee to place requests for proposals from an administrator or licensor.

Figure 10:
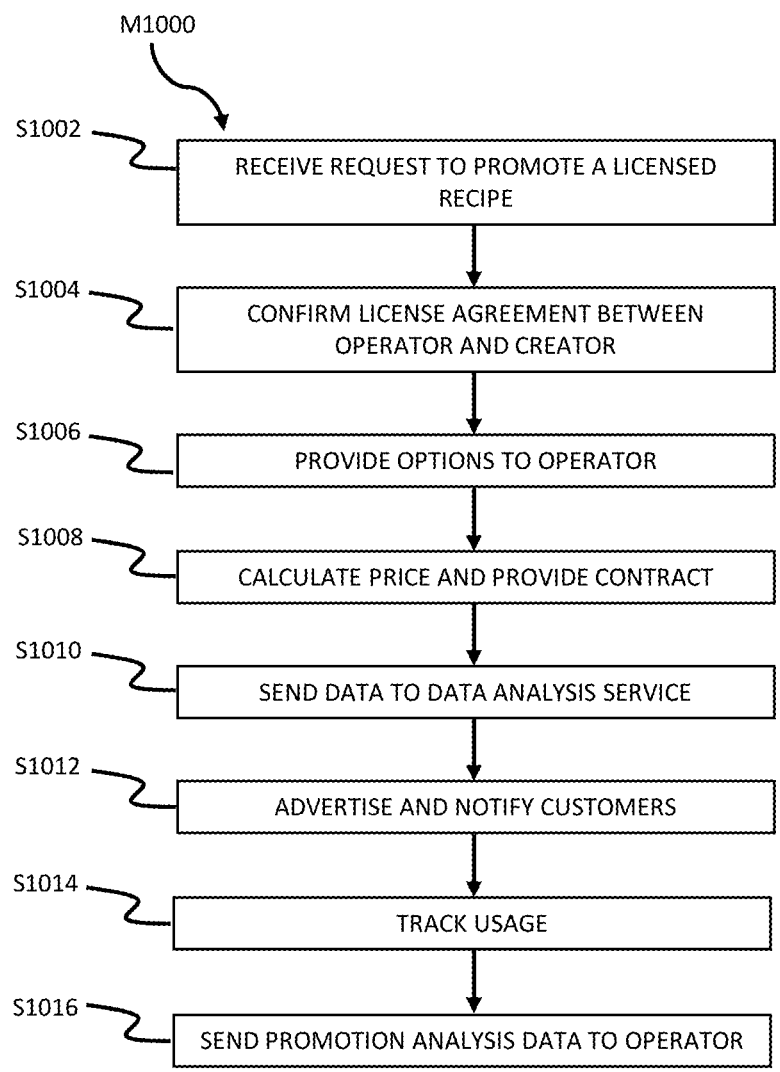
FIG. 10 is a flow diagram of an automatic method associated with the promotion engine of the system of FIG. 1, according to an embodiment of the present invention.
Figure 11:
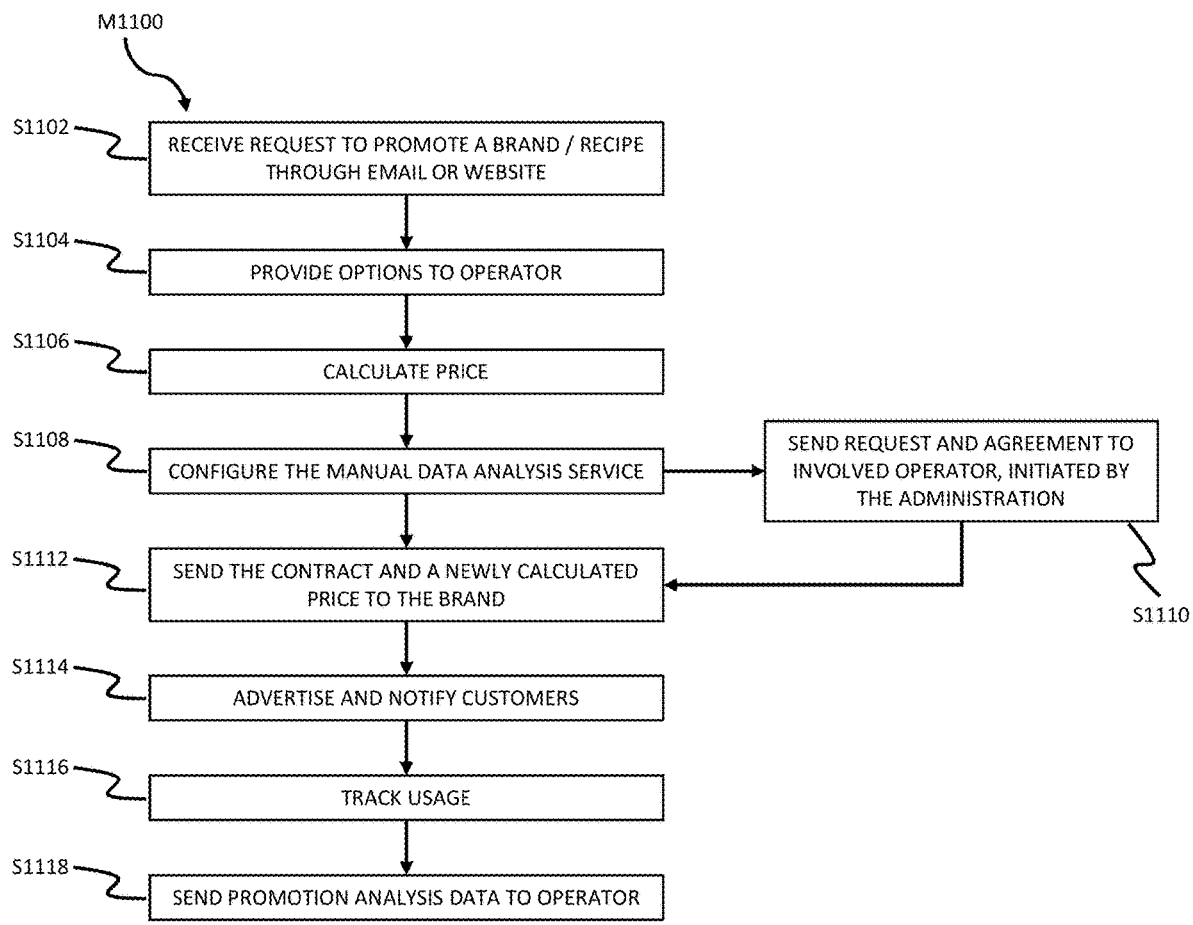
FIG. 11 is a flow diagram of a manual method associated with the promotion engine of the system of FIG. 1, according to an embodiment of the present invention.

For example, in one example, through the promotion engine 15D, a licensor offers 2 days of consulting. This can happen either in an automatic process (as shown in FIG. 10) with fixed terms and conditions or a manual process (as shown in FIG. 11) The licensee may utilize the system 10 to determine who offering the service. Once the potential licensor and licensee are in contact, the parties can negotiate and settle on terms.

In another example, the licensee can also place a Request for Proposal, e.g., the licensee may need 5 people to service the bar. Both scenarios can be handled using the automatic or manual processes.

With reference to FIG. 10, an automatic method M1000 associated with the promotion engine 15D is shown. The automatic promotion method M1000 follows a pre-defined process and terms and conditions as determined by the administrator.

In a first step S1002, a request to promote a licensed recipe is received. In a second step S1004, the promotion engine 15D confirms the existence of a license agreement between the operator and creator. In a third step S1006, a number of options associated with the license are provided to the operator. For example, the options provided may include the advertising geographic region, the consumer target group, the advertisement headline and text, special offerings, time duration and advertisement priority.

In a fourth step S1008, a price (based on the chosen options) is calculated and provided to the licensee. In a fifth step S1010, the chosen options are sent to an external data analysis 15N and a list of matching consumers and other advertisement data is received from the external data analysis 15N. In a sixth step S1012, the advertisements are displayed based on the data received form the external data analysis and sent to the list of matching consumers.

In a seventh step S1014, advertisement clicks and online and local orders are tracked and stored in the database 14B. In an eighth step S1016, the tracking data is analyzed and the data send to the operator.

With reference to FIG. 11, a manual method M1100 associated with the promotion engine 15E is shown. The manual promotion method M1100 is based on an exchange of products and services that does not follow a pre-defines process with a fixed set of terms and conditions, instead it allows for individual negotiation with the administrator or licensor.

In a first step S1102, a request to promote a licensed recipe is received. In a second step S1104, a number of options associated with the license are provided to the operator. For example, the options provided may include the advertising geographic region, the consumer target group, the advertisement headline and text, special offerings, time duration and advertisement priority.

In a third step S1106, a price (based on the chosen options) is calculated and provided to the licensee. In a fourth step S1008, the manual data analysis is configured to match the chosen options. In a fifth step S1110, the request (and an agreement) are sent, by the administrators, to the involved operators. In a sixth step S1112, the agreement and calculated price are sent to the brand (licensor). In a seventh step S114, the advertisements are displayed based on the data received form the external data analysis and sent to the list of matching consumers.

In an eighth step S1116, advertisement clicks and online and local orders are tracked and stored in the database 14B. In a ninth step S118, the tracking data is analyzed and the data send to the operator.

Figure 12:
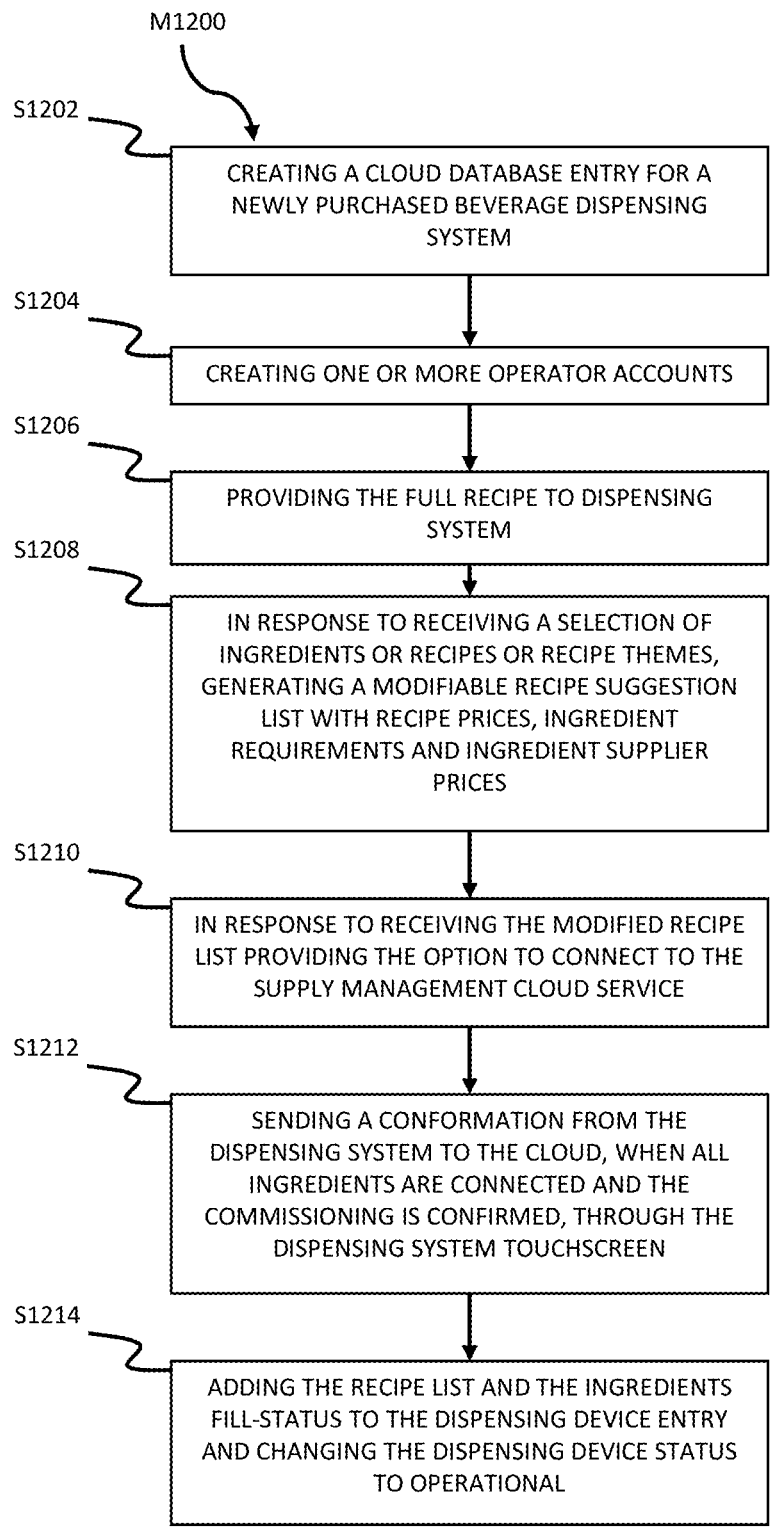
FIG. 12 is a flow diagram illustrating initial set-up of a beverage dispensing device, according to an embodiment of the present invention.

With reference to FIG. 12, a method M1200 describing the initial setup of a newly installed dispensing device 12 is shown. This method M1200 allows an operator to quickly configure a dispensing device 12 by downloading a set of cocktail recipes, consumer preferences, ingredients and any other system configurational data lists.

In a first step S1202 a database entry or record for the new dispensing device 12 is created in the database 14B. The dispending device record may include a number of fields, including but not limited to owner information, geographic location, disclosing preferences and specifications of the system. This information may be provided through the operator application 18A or a web portal.

In a second step S1204 one or more operator accounts may be created in the database. In a third step S1206, the recipes records and ingredients records (associated with the operator) may be downloaded to the new dispensing device 12.

Based on the list of available ingredients, recipes or recipe themes, a modifiable recipe or recipes suggestion list with prices, ingredient requirements and ingredient supplier prices is generated in a fourth step S1208. In a fifth step S1210, an option is provided to the operator to connect to a supply management service. A confirmation is sent, in the sixth step S1212, from the dispensing device 12 to the system (using the interface device 12D).

The recipe list and the ingredients fill-status are established and added to the dispensing device record in the database 14B.

The method S1200 describes the creation of new operator accounts and a change in the available cocktail recipes. This may be done on multiple occasions to adapt to consumer feedback, local events, supplier or brand deals. The described method S1200 may also be uses on multiple dispensing devices 12 at once.

An operator may operate several dispensing devices 12 at the same location and choose to configure them all the same or not, e.g.: same financial accounts, cocktail recipe lists and permission levels.

The administrator requires the geographical location of the dispensing device, the type of the facility in which the dispensing device is placed, e.g., casino, and operator information, such as the company address and the financial account of the operator which will be used for handling order payments at the local device.

The operator has to decide which, locally gathered information, he wants to disclose to external parties. The system 10 offers a marketplace for the operator to disclose information and also provides the ability to reward an operator for doing so.

The operator can choose what information to disclose such as ingredient, brands or price per unit of ingredients etc. . . . . The specifications of the dispensing device, such as available sensors, number of dispensing lines, electrical or pneumatic dispensing will also be added to the entry.

The set of data permissions provided by the operators will be added to the operator account. The owner may define or change the permission levels of the operators.

Figure 13:
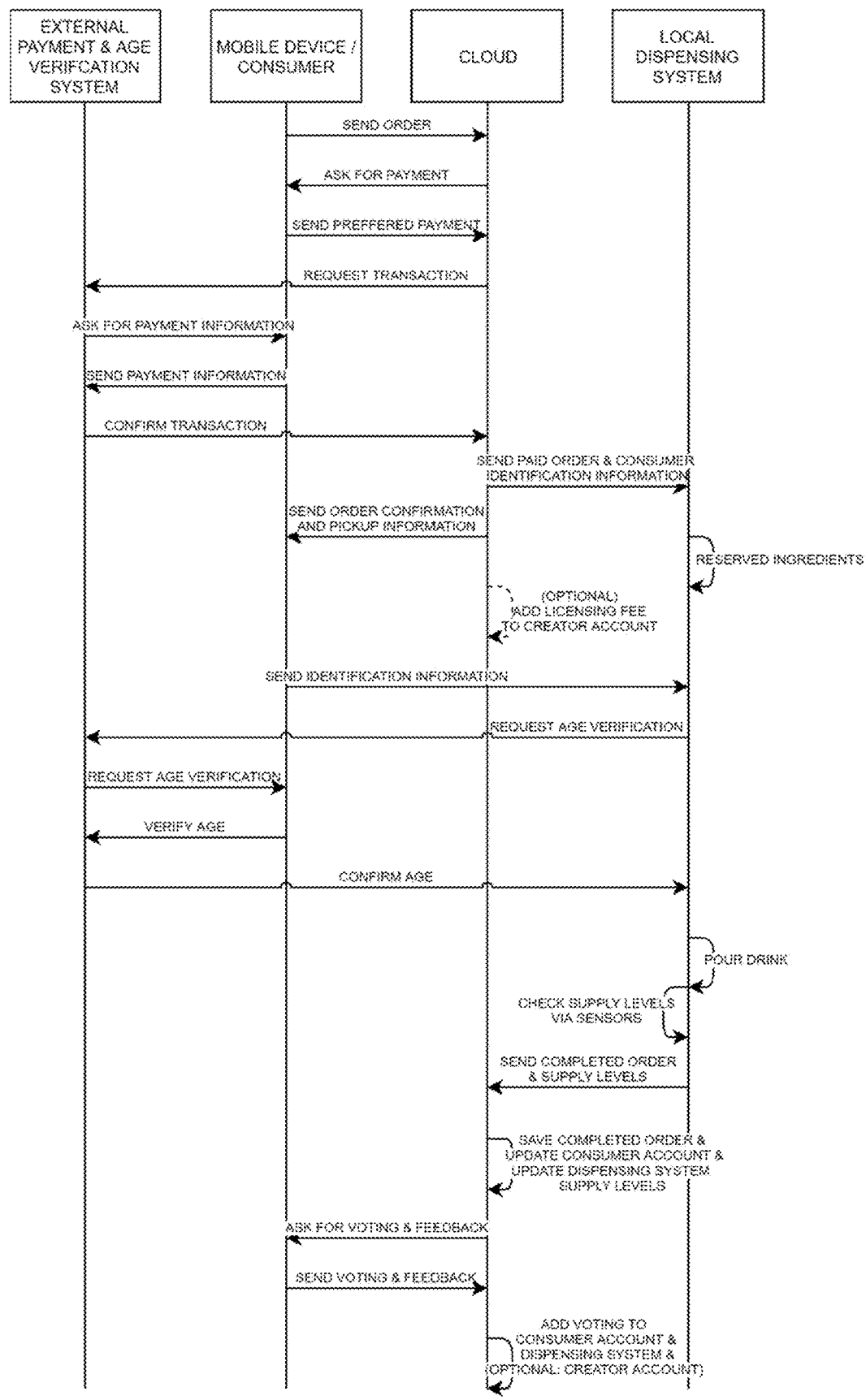
FIG. 13 is a communications flow diagram of a consumer using the system of FIG. 1, according to an embodiment of the present invention.

With reference to FIG. 13, the online ordering service is a service for consumers to order and pay a cocktail remotely using a consumer application or app 18C on a consumer device 16C. The consumer can then be identified by the local dispensing device 12 of their choosing to receive their order. The system 10 also stores all online orders in the cloud database 4B. The system 10 may also use the external age verification provider and external payment service provider 24. The consumer may also order and pay for another consumer. The other consumer may receive a notification that an order can be collected at any chosen dispensing device 12.

A consumer may access various consumer services through the consumer application 18C, including but not limited to a recipe search engine, a dispensing device search engine, a feedback service, a share service and an order history service. To offer consumers flexibility, the consumer application 18C may be embodied in a mobile app that interacts with the server system 14 to allow the consumer to download the pre-set cocktail recipes list available on a local device 12, including the pre-set ratios for each recipe, of any one of the connected dispensing devices 12 (single property/company-wide ingredient and cocktail recipes list has been created/used).

The cocktail recipe search engine allows the consumer to search for a cocktail recipe by name, in leaderboards or with filters and sorters. The dispensing device search engine lets the user search locations by name, in leaderboards or geographically. The feedback service allows the Consumer to leave votes, comments or requests at dispensing devices, cocktail recipes or ingredients. A membership bonus system service provides the consumer with benefits for orders, feedback or shares. The share service lets the consumer share cocktail recipes and locations with social media services, other consumers or the whole system. The order history provides the consumer with a transparent overview of all his online and local orders.

Figure 14:
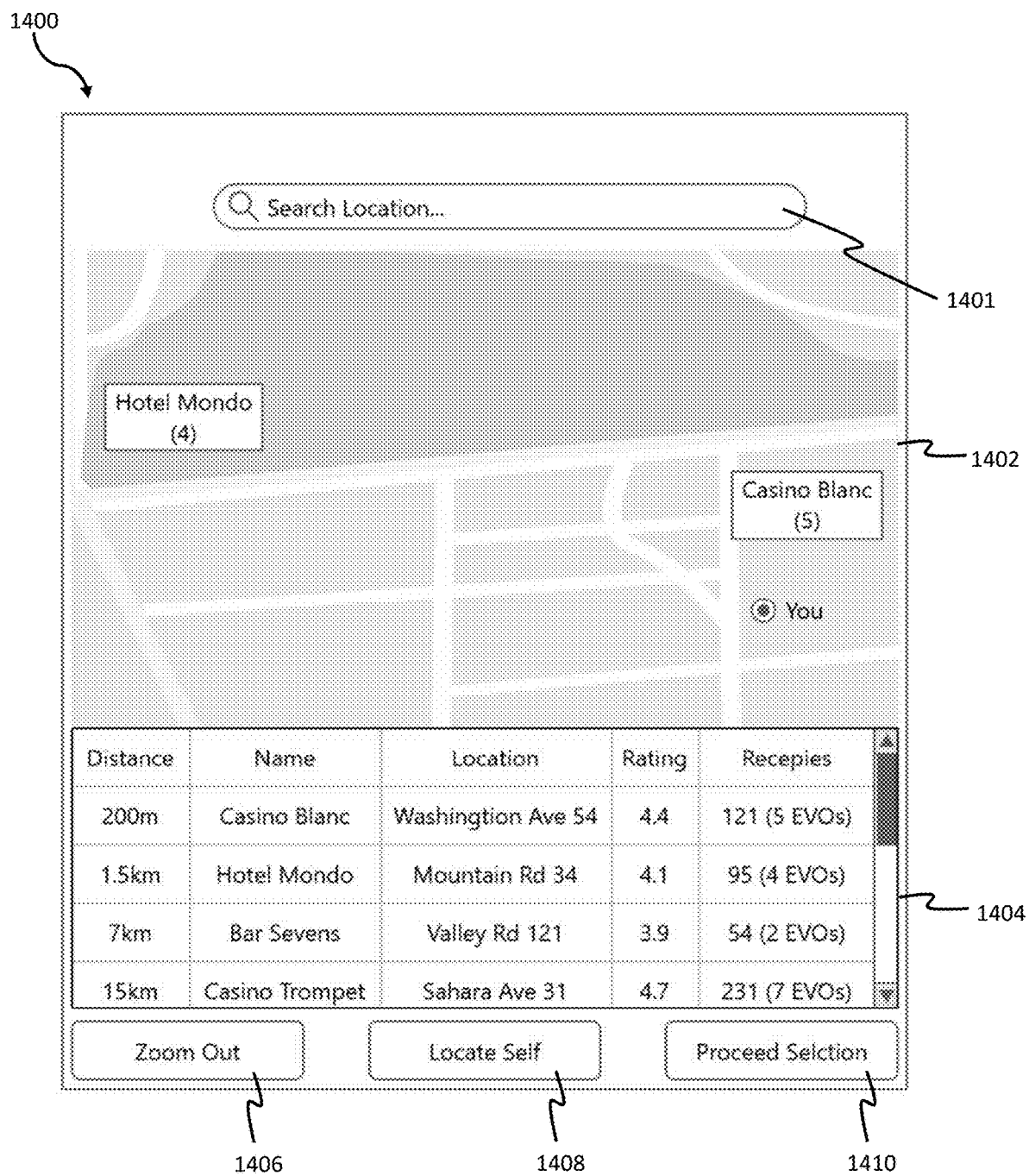
FIG. 14 is a diagrammatic illustration of a consumer interface used to find dispensing devices, according to an embodiment of the present invention.

In one aspect of the present invention, the dispensing devices 12 include geo-location data/capabilities. Hence, a consumer may obtain data in advance from a specific location, including what recipes are offered or available at a certain location (having multiple dispensing devices 12) or specific dispensing device(s). The consumer application or app 18C can route to a specific online store to order the ingredients of the recipe(s) consumers prefer in order to allow the customer to make the beverage at home. FIG. 14 is a diagrammatic illustration of a screen 1400 of the consumer application or app 18C containing a map 1402. The map 1402 may be centered to the current location of the user. The map 1402 shows available locations and is zoomable and draggable. The locations list 1404 shows available dispensing systems 12 nearby.

The consumer may enter a specific geographically location into a search bar 1401 to change the centered location. All distances in the list 1404 will be calculated from this geographical location. The consumer may also search for a specific operator, specific recipe name or any other criteria, such as, but not limited to brands, leader board ranking, taste . . . ) to geographically identify the dispensing devices 12 that meets the selected criteria as per his location input in 1402, 1404.

The consumer may press the "zoom out" button 1406 to expand the map 1402. The consumer may then select multiple locations by tap and hold and highlight the selected locations. The consumer may press the "locate self" button 1408 to re-center the map 1402 and the list 104 to their current position. The consumer may proceed to "choose drink" of a specific location by taping the location ones in the list or map. The consumer may also proceed to "choose drink" of multiple locations by pressing the "proceed selection" button 1410.

Figure 15:
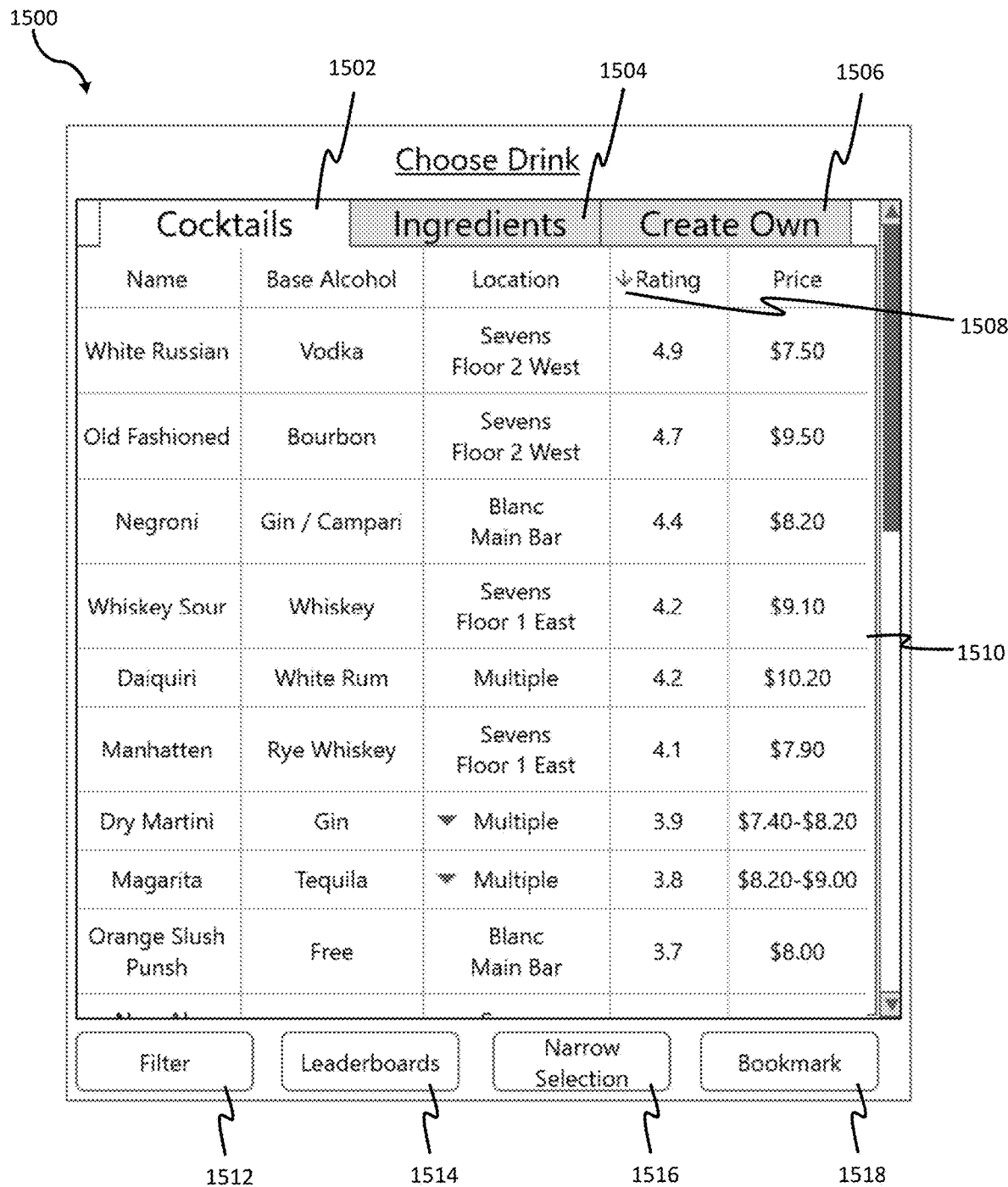
FIG. 15 is a diagrammatic illustration of a consumer interface used to find recipes, ingredients and/or to create a new recipe, according to an embodiment of the present invention.

With reference to FIG. 15, the consumer application or app 15C may provide the consumer a framework to adjust and/or create their own recipes from the available ingredients but checked within an operator defined framework or regulatory framework (restrictions of the AVB percentage for example). The Consumer may either:
  adjust any ingredient of the pre-defined recipe,
  add/remove any ingredient,
  create their own custom receipt based on the available ingredients, and
  upload their recipe(s) to share with friends and/or share the recipe in a standard format for use with other dispensing devices 12.

FIG. 12 is a screenshot 1500 of a consumer interface to select cocktails from any selected location(s) that have a dispensing system 12 connected to the system 10. The consumer may list all recipes available at any dispensing system 12 at the selected location(s) in the cocktails tab 1502 or available ingredients in the ingredients tab 1504 or proceed to "create drink" in the create own tab 1506 for the selected location(s). The consumer may press the "narrow selection" button 1516 to deselect certain dispensing devices. In the cocktails tab 1502 a list of cocktails 1510 is displayed with additional information including name, base (primary) alcohol, location, rating, price. The location refers to the specific location of the dispensing device 12. The rating is calculated from the votes of local consumers and system-wide cocktail recipe votes. The consumer may tap one cocktail to proceed to "order drink". If the cocktail is available at multiple selected locations the tap results in a dropdown of all possible dispensing devices 12 that are connected and to which the consumer has access. The consumer may open a filter popup menu by pressing the "filter" button 1512 and filter the list 1510 based on, e.g., amount of sugar, amount of alcohol, Ingredients with intolerances to exclude, price, rating, specific ingredients. The user may tab a column header of 1510 to sort the list. The consumer may press the "leaderboards" button 1514 to select a specific leaderboard from a popup menu. The leaderboard is then displayed in the list 1510 filtered by the selected locations and filters. In the ingredients tab 1504 all available ingredients at the selected locations are displayed in the list 1510 with additional information including name, brands (if operator discloses brands), ABV %, popularity in recipes, price per unit of volume. The user may tap an ingredient to display a recipe with this specific ingredient and the selected locations in 1510. In the ingredients tab the "filter" button 1512 opens a popup menu with filters including amount of alcohol by volume, price range, amount of sugar, ingredients with intolerances to exclude. The "narrow selection" button 1516 and the sorting mechanism 1508 are also available in the ingredients tab. The consumer may press the "bookmark" button 1518 at any time to save the current list, filters, locations to his bookmarks.

Figure 16:
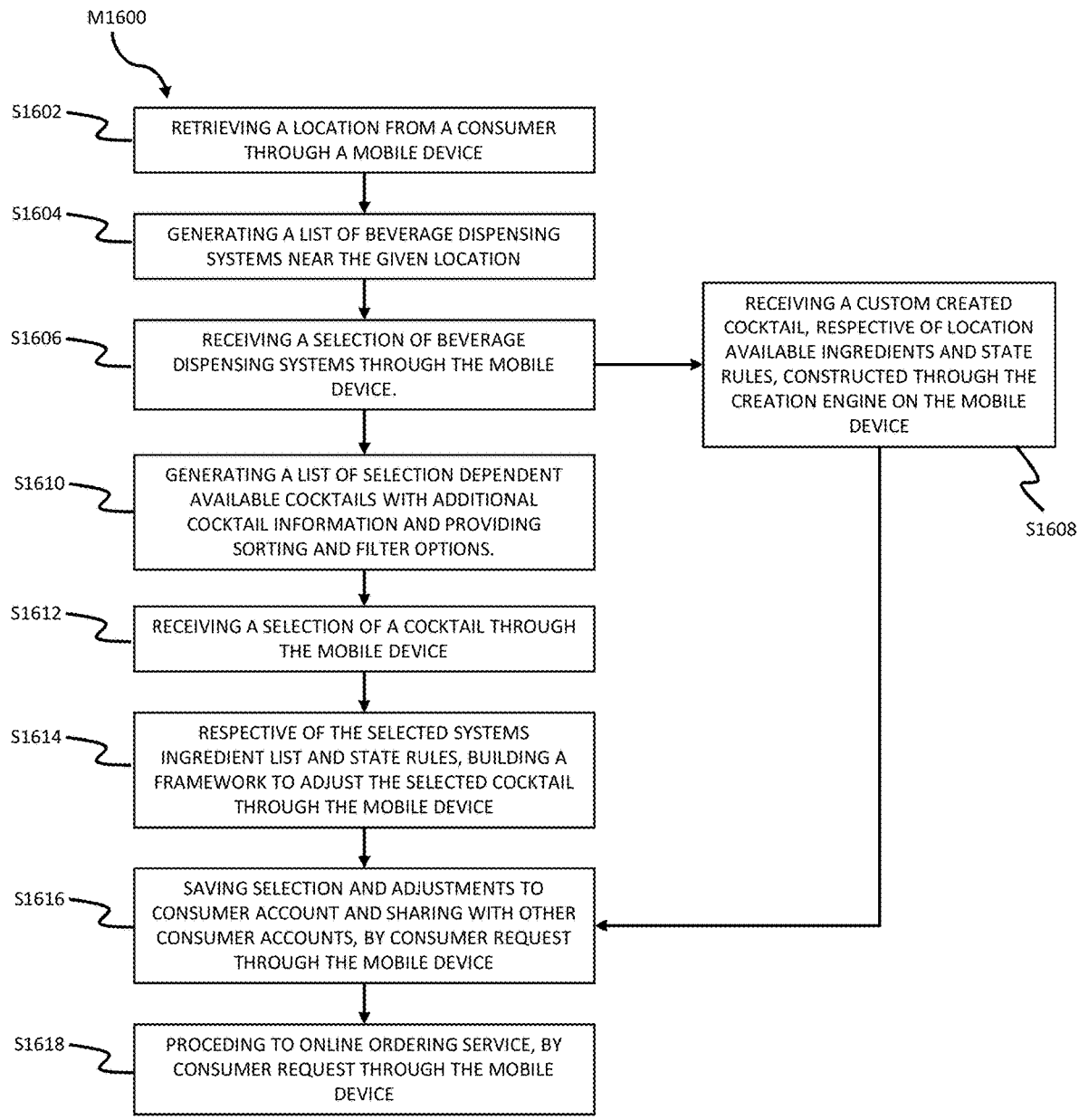
FIG. 16 is a flow diagram of a method of operation of a consumer application, according to an embodiment of the present invention.

With reference to FIG. 16, a method M1600 associated with the consumer application 18C is shown. In a first step 1602, a location associated with the consumer is received, e.g., the location of the consumer device 16C. In a second step 1604, a list of beverage dispensing systems 12 near the consumer's location is generated based on the consumer's location. In a third step S1606, the system 10 receives a selection of beverage dispensing systems from the consumer device 16C (as selected by the consumer).

The consumer may create (or modify a present recipe to create) a custom recipe. The consumer's custom recipe is received in a fourth step S1608.

In a fifth step S1610, a list of available recipes or cocktails is generated. The list of available cocktails may be filtered or dependent on the available ingredients or other filters applied to by the consumer.

In a sixth step S1612, a list of consumer selected cocktails or recipes is received by the system 10. In a seventh step S1614, a framework to adjust or modify one or more of the selected cocktails or recipes is generated. In an eighth step S1616, any selected cocktails or recipes and any modifications are received and saved into the database 14B. In a ninth step S1618, the consumer may proceed to an online order service to either order a cocktail based on one or more of the selected cocktails or recipes at one of the dispensing systems 12 or order the ingredients.

The administration function 15H includes all automatic processes to simplify the administrator's tasks. The administration function 15H includes a task management service for the administrators and programs to identify technical problems. The administration function 15H manages confirmation requests from the licensing and promotional engines 15C, 15D, invitations to licensing, initial/group dispensing device setups, support requests, manual data analysis initiations and other request of operators, brands and suppliers. The administration function 15H also grants the administrator access to the database 14B for supervision.

Figure 17:
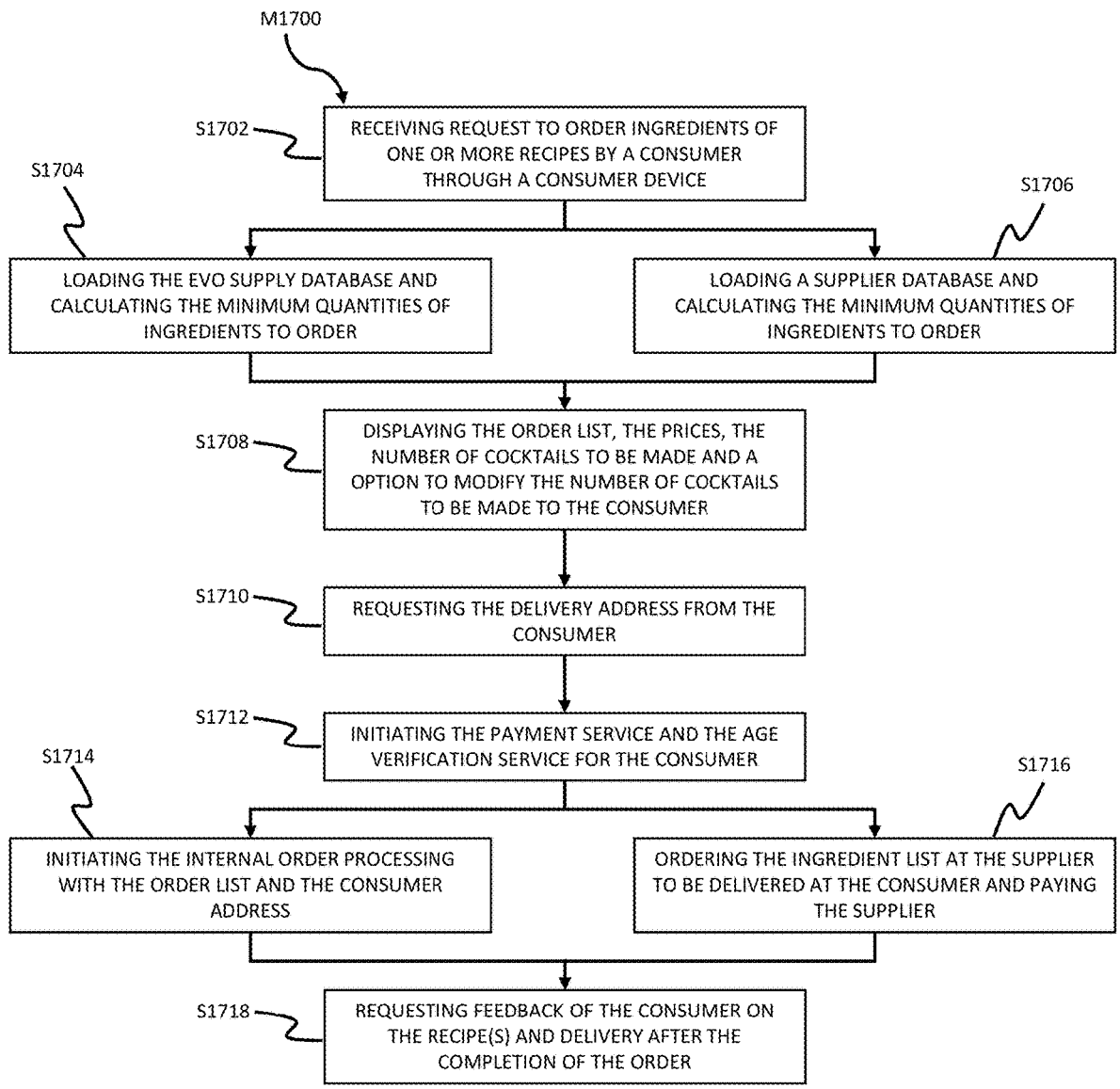
FIG. 17 is a flow diagram of a supply management process, according to an embodiment of the present invention.

With reference to FIG. 17, a method M associated with the supply management function 15E is shown. In a first step S1702 a request to order ingredients associated with one or more of the recipes is received. In second and third steps S1704, S1706, a minimum amount of each ingredient to order is calculated as function of the supply database and the supplier database, respectively. In a fourth step S1708, the order list, associated prices, number of cocktails to be made and an option to modify the number of cocktails is presented/displayed to the consumer on the consumer device 16C.

In a fifth step S1710, the delivery address is requested from the consumer. The order is sent to the external age and payment services 24 in a sixth step 1712. In seventh and eight steps 1714, 1716, the order is initiated, and the ingredient order sent to the supplier(s), respectively.

In a ninth step S1718, feedback on the order and delivery process is requested from the consumer.

There are 4 main groups of users interacting with the system 10 as described. These are administrators, consumers, creators or mixologist, and operators. The dispensing systems 12 are capable of dispensing drinks made from mixing ingredients. The user devices 16 may be any sort of suitable handheld/portable devices or computing devices, such as cell phones, watches, tablets, computer, (mobile, watch, tablets, computer . . . ) used by the users to interact with the system 10 or dispensing device 12. Creators or mixologists allowing operators or consumers to license their mixed drink cocktail recipes through the system 10 and offers the creator an opportunity to promote their name.

Operators are users of the dispensing systems 12. The system 10 provides operators the ability to manage their devices online (configuration, reporting, tracking, control, cocktail recipes, manage consumers, promotions, type of cocktails offered, and information to be made available, user accounts . . . ).

Additional interface may be available to support:
Point of Sales interface in order to sell said drinks,
Using an outside age verification service, the system validates the age of the consumer before an alcoholic beverage can be ordered/dispensed.

The system 10 allows for consumers to interact with dispensing devices 12 using mobile or other external devices. The system 10 is a client/server-based application used to enable the following functionality:
Upload to/download from any dispensing device any application software,
Upload to/download from any dispensing device the cocktail recipes list,
Push down corporate list or upload custom created cocktail recipes or menus and creator/mixologist info
Download various metrics from the dispensing device (total sales per day/time, all data per cocktail per day/time, consumer data, geo-location, stock levels details, detailed usage of all ingredients including but not limited to brand names . . . ), The database 14B may be made available to consumers as a subscription-based model that upload/downloads Cocktail Recipes to an appropriate dispensing device 12 and collects royalties for the cocktail recipes. The system 10 also supports competitions via a built-in leader board application for the most popular cocktail recipes. The system 10 contains full analytic marketing engine collecting data and providing metrics such as seasonal drinks, during certain specific times, seasons, cocktail recipes, brand popularity, ratios (which provide valuable data for brands) . . . .

An appropriate dispensing device 12 can connect to the server 15 and download a list of cocktails that include the ingredients (even particular brands) and ratios. Collecting detailed brand data consumption per consumer, location or event is a specific focus of the application.

The subscription engine allows the operator to select the cocktail recipes from the licensable list based on name of creator/mixologist and its popularity or its key spirits. He can enable the availability of any cocktail on that list for their property. This will enable the operator to pick, for example, RUM cocktails and cut a deal with any brand name.

The operator of the dispensing device(s) can select what cocktails from that list to offer, enable them so they can be used, adjust them at will and re-save/upload them. The operator may also print out a list of cocktails ingredients needed and be informed about stock levels. A supplier database can be connected that allows the operator to i) know from whom to get a specific ingredient ii) automatically trigger an order via the system. The application can also inform the client of new recipes, the popular drinks, brand promotions etc.

A licensed cocktail recipe cannot be modified and only offered as is to the consumer. The system 10 provides detailed consumption and stock level requirements based on peak or averaged consumption of a period of time. The promotional engine 15D allows for the mobile promotion to the consumers of new and popular drinks, brand promotions etc.

To offer consumer flexibility, a mobile app that interacts with the cloud-based software solution can be used to allow the consumer to download the pre-set Cocktail Recipes list available on that local device (including the pre-set ratios for each Cocktail Recipe) of any one of the connected dispensing devices (single property/company-wide ingredient and Cocktail Recipes list has been created/used).

All devices have geo-location data and hence a consumer can get data in advance from a specific location and see what Cocktail Recipes they offer or are available and subscribe to special offers at that location. The app can route you to a specific online store, so you can order the ingredients of the cocktails you like and make them at home.

The consumer can be given a framework within to adjust and/or create his own Cocktail Recipes from the available ingredients but checked within the regulatory framework (restrictions of amount of alcohol/drink as they vary per state/brands to pick from).

The consumer could either a. adjusts any ingredient of the pre-defined Cocktail Recipe, b. add/remove any ingredient, c. creates his own custom cocktail based on the available ingredients and d. upload his Cocktail Recipe(s) to share with friends and/or share the Cocktail Recipes in a standard format for use with other dispensing devices.

The system has the ability to also verify against a set of rules defined either by the regulators, Operators or any other third party. These rules could determine the limitations of % of alcohol/drink, amount of sugar per drink, amount of ingredients not to exceed etc. . . . . .

To assist in the creation of cocktails, the app will have access to suggestive database of combinations and will highlight in color that ingredient combination that are possible (in green), not preferred (in yellow) or simply not advisable at all (in red) like lemon juice and cream.

The system 10 tracks the use of all cocktails created and can award a creator/mixologist with free drinks, points or credits. These can be used to compete on cocktails across the network.

The mobile app can also function as an interface to order drinks in a self-service capacity from the dispensing device. Age verification can be provided through collaboration with external services and be linked to available biometrics available to ensure that no drinks have been ordered by legitimate consumer.

Using the app, the consumer can request for ingredients and/or brands that are not available thereby sharing local consumer needs with the operator. By offering the consumers the ability to create their own recipes or selecting a recipe from the library, the operator will be able to adjust the recipes offered in that market based on the market data gathered.

The app also allows a consumer the ability to vote on anybody's cocktail recipes and provide the ability to comment on it and/or via social media.

The app supports the concept of a "membership bonus system". The app allows a consumer to apply for a membership that entitles the consumer, i.e., member, to gain points which can be used at any location that supports the membership loyalty program. Based on their status they can be entitled to:

Request new ingredients/brands
Self-dispense drinks
Receive free drink offers or share their offer with someone else
Invite another member to a drink Communication between the mobile app and the dispensing devices is via NFC, Bluetooth, QCode or any other suitable communication medium. The app can get the data via the cloud from the local dispensing device.

The present disclosure particularly describes exemplary beverage dispensing systems and packages (e.g., boxes) that may be used to dispense alcoholic beverages. As used herein, the term "alcoholic beverages" refers to any beverage or liquid with alcoholic content that is meant for human consumption.

The boxes include one or more dividers that form two or more compartments within each box. Each compartment is designed to hold an inner container (e.g., a bag) which holds an alcoholic beverage. Each bag includes an outlet for dispensing the alcoholic beverage and a fitment that is attached to the outlet. Each outlet is separated from each other outlet so that the contents of each bag do not mix or flow together until a connector assembly is attached. An alignment plate aligns the fitments of the bags in preparation for attaching to the connector assembly.

A connector assembly is configured to attach to the alignment plate and to the fitments of each bag. The connector assembly includes a connector aligned with each fitment. The connector assembly also includes a holding plate, an actuator plate, a locking member, and a plurality of spring members. The connectors are connected together and are configured to jointly direct liquids from the bags to a common main outlet.

As is described more fully herein, the components of the connector assembly (e.g., the holding plate, the actuator plate, the locking member, and the spring members) cooperate together to enable a user to quickly and accurately attach the connector assembly to the alignment plate and fitments when the user prepares the beverage dispensing system for use. The components of the connector assembly also cooperate together to enable the user to quickly and efficiently disengage the connector assembly from the alignment plate and fitments, for example, when the user wishes to replace empty bags or boxes with filled replacement bags or boxes.

The embodiments described herein comply with the Department of Treasury Alcohol & Tobacco Tax & Trade Bureau (TTB) regulations in that the alcoholic beverages contained in the bags are shipped in a "divorced" state (i.e., the outlets of the bags are not connected together) so that each bag is a self-contained bag that may hold the maximum amount of an alcoholic beverage. The embodiments also enable significant efficiencies to be realized for distributors and end users of the alcoholic beverages. For example, larger quantities of alcoholic beverages may be shipped to a destination and may be efficiently and conveniently prepared for use as compared to prior art systems where individual bottles of alcoholic beverages are shipped. In one example, according to an embodiment described herein, a box may include four bags that each holds up to a maximum allowable volume, e.g., 1.75 liters of an alcoholic beverage. Accordingly, a single box may include 7 liters of an alcoholic beverage that is able to be quickly attached to a connector assembly for dispensing at an end user location. Other boxes may be used with other suitable numbers of bags to enable distributors to have a wide variety of options in the amount of alcoholic beverages to include within a box. For example, boxes with 6 or 8 bags (or any suitable number) may be used to provide 10.5 liters or 14 liters of alcoholic beverages (or any suitable amount) as desired. An exemplary beverage dispensing system 12 is described in more detail below.

Figure 18:
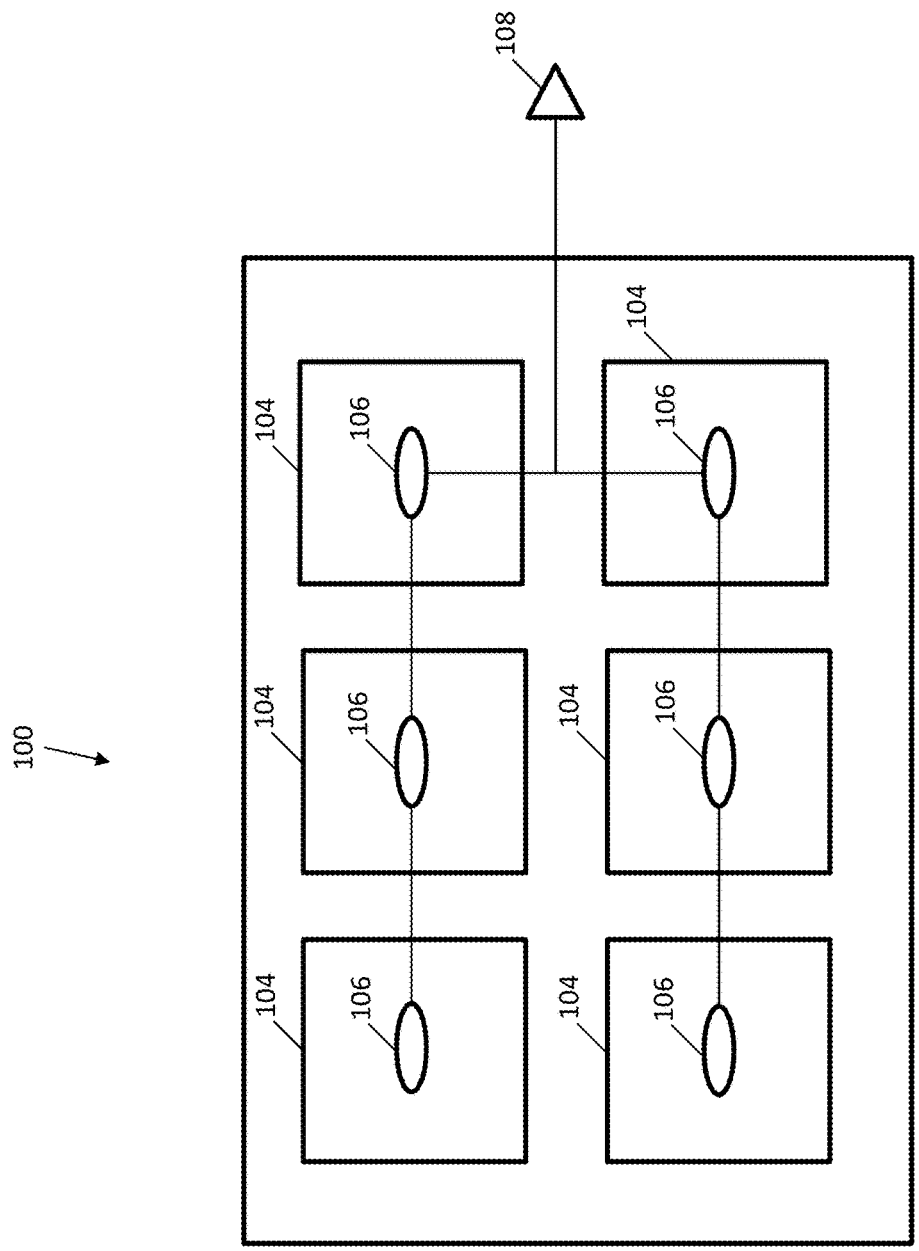
FIG. 18 is a block diagram of a beverage dispensing system that may be used to dispense alcoholic beverages.

FIG. 18 is a block diagram of an exemplary beverage dispensing system 100 that may be used to dispense liquids, such as alcoholic beverages. In one embodiment, beverage dispensing system 100 is a bartender station (or is included therein) at a bar. Alternatively, beverage dispensing system 100 may be used with, or incorporated within, any suitable location such as a kitchen, a bar, a reception area, or may be a portable station that may be used to serve alcoholic beverages in any suitable location.

In one embodiment, beverage dispensing system 100 includes a cabinet or housing 102 and a plurality of beverage dispensing packages 104 positioned within housing 102. Beverage dispensing system 100 may be placed in a bar, a kitchen, or in any other suitable location to enable a user to dispense alcoholic beverages from system 100. For example, a bartender may use beverage dispensing system 100 to dispense alcoholic beverages from each of the beverage dispensing packages 104 during operation.

In one embodiment, each beverage dispensing package 104 is a box or other suitable container that includes a plurality of beverage dispensing bags, for example. Each bag is designed to hold 1.75 liters of alcoholic beverage in order to comply with applicable regulations. Each beverage dispensing package 104 includes an associated connector assembly 106 coupled thereto for dispensing the contents of the bags. For clarity of description, beverage dispensing packages 104 may be referred to herein as boxes 104, although it should be recognized that beverage dispensing packages 104 may be any suitable container other than a box. Similarly, for clarity of description, boxes 104 are described as including a plurality of beverage dispensing bags (or "bags"). However, it should be recognized that any suitable internal containers may be used instead of bags.

In one embodiment, an outlet of each connector assembly 106 may be connected together to form a common outlet line connected to a nozzle 108 or other suitable component for dispensing the contents of the bags. Alternatively, the outlet of each connector assembly 106 may be connected to a separate nozzle 108 so that the contents of the bags within a box 104 may be dispensed separately from the contents of the bags within each other box 104.

Figure 19:
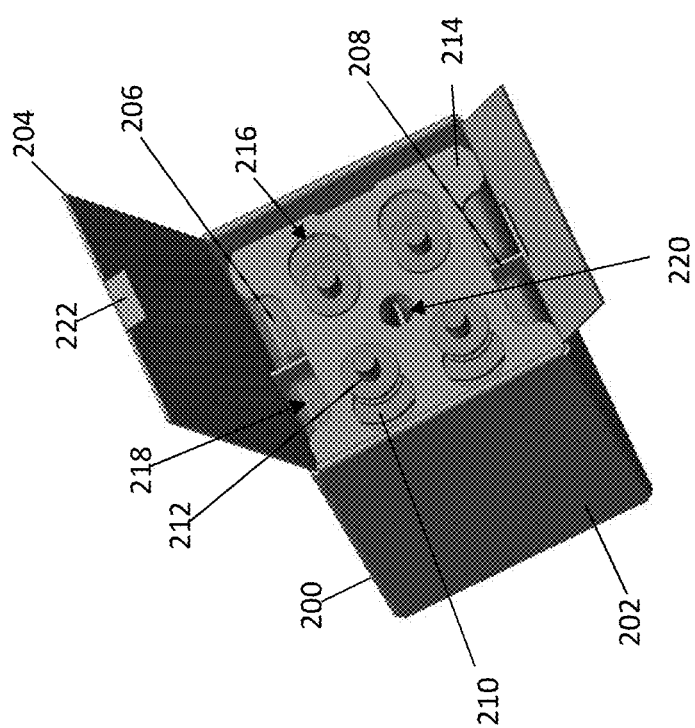
FIG. 19 is a perspective view of an exemplary beverage dispensing package that may be used with the beverage dispensing system shown in FIG. 18.

FIG. 19 is a perspective view of an exemplary beverage dispensing package 200, such as a box 200, that may be used with beverage dispensing system 100 (shown in FIG. 18). While package 200 is described herein as a box, it should be recognized that any suitable package or container may be used.

In an exemplary embodiment, box 200 is a cardboard box that includes sides 202 and a top cover 204. Top cover 204 is movable to expose or to cover a plurality of compartments (not shown in FIG. 19) that include a plurality of inner containers, such as beverage dispensing bags 206. The compartments are formed by one or more dividers 208 positioned within box 200.

In an exemplary embodiment, two dividers 208 are positioned within box 200 to form four substantially equally sized and shaped compartments. More specifically, in the exemplary embodiment, each compartment has a square-shaped cross-section that houses a respective bag 206 that also has a substantially square-shaped cross-section. Alternatively, any suitable number and shape of compartments and bags 206 may be used with box 200. In addition to creating compartments within box 200, dividers 208 provide stability and support to box 200.

Each bag 206 includes an outlet (not shown in FIG. 19) that enables liquid (e.g., an alcoholic beverage) to be dispensed from bag 206. A container fitment 210 or another suitable connector is securely fit onto each outlet to enable the outlet of each bag 206 to be releasably coupled to a connector assembly. Accordingly, in the exemplary embodiment, each outlet is initially separated from each other outlet until the connector assembly is attached to the outlets. In this manner, the outlets of each bag 206 may be transported in a "divorced" manner (i.e., not in fluid communication with each other) to satisfy applicable governmental regulations and may then be connected together by a connector assembly at the final destination to provide one common fluid dispensing line that dispenses the contents of each bag through the common dispensing line.

In one embodiment, each fitment 210 includes a removable cap 212 that prevents the contents of each bag 206 from spilling or leaking out during transport. Caps 212 also may be included for health reasons, for example, to prevent contamination of fitments 210. In a more specific embodiment, each cap 212 may be glued or otherwise attached to top cover 204 of box 200 during shipping so that when a user opens top cover 204, each cap 212 will be automatically removed to expose the fitments of each bag 206. Alternatively, caps 212 may be connected together by a string or another suitable connection to enable a user to quickly remove all caps 212 at the same time or in quick succession. In one embodiment, caps 212 may be used to visibly determine whether bags 206 or fitments 210 have been tampered with or opened. For example, caps 212 may have a detachable ring or another suitable portion that may detach from caps 212 when caps 212 are first removed. Accordingly, a user may determine that caps 212 have been removed or fitments 210 have otherwise been tampered with by determining whether the ring (or other portion) of caps 212 is no longer attached. Alternatively, a seal (not shown) that is removable, penetrable, or may be broken, to facilitate or allow alcohol to flow, may be used. Other suitable indicators may be used to determine whether caps 212 have been removed or tampered with in other embodiments.

In one embodiment, an alignment plate 214 is coupled to a top portion of box 200 and is secured to box 200 by two or more latches (not shown) on opposing sides of alignment plate 214. Alignment plate 214 includes a plurality of fitment openings 216 to enable the outlets of each bag 206 to extend through alignment plate 214. Alignment plate 214 also includes two or more grip openings 218 to enable a user to grasp a portion of alignment plate 214 when attaching a connector assembly to alignment plate 214 and bags 206. Alignment plate 214 also includes a locking member opening 220 for receiving a locking member to removably attach alignment plate 214 to the connector assembly.

[In one embodiment, alignment plate 214 is transparent to enable a user to view bags 206 underneath alignment plate 214. In a further embodiment, bags 206 are transparent to enable a user to view the contents of bag 206 and/or a fill level of bags 206.

In one embodiment, top cover 204 is foldable or otherwise movable to either cover, or expose the top portion of box 200. For example, top cover 204 may be folded down into a closed position for shipping or transport. Additionally or alternatively, top cover 204 may be removable by a user to expose the top portion of box 200. For example, top cover 204 may be removably attached to box 200 by a perforated or pre-scored hinge that a user may tear off to remove top cover 204. In the closed position, top cover 204 hides alignment plate 214 and fitments 210 from view and protects alignment plate 214 and fitments 210 during transport. Top cover 204 may be latched in the secured position by a tab or latch 222. Top cover 204 may also be removed or folded up into an open position when a user wants to access fitments 210 or alignment plate 214, for example, in preparation for dispensing the contents of bags 206.

Figure 20:
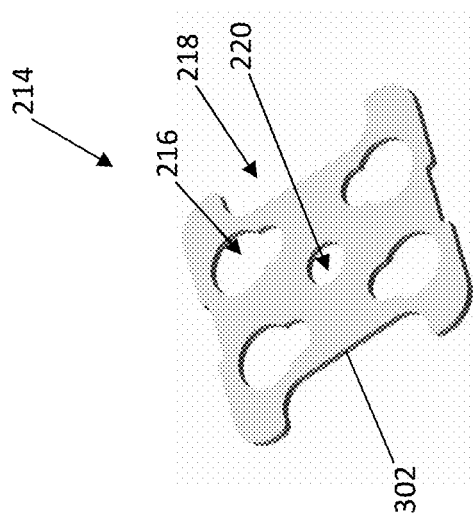
FIG. 20 is a perspective view of an exemplary alignment plate that may be used with the beverage dispensing package shown in FIG. 19.

FIG. 20 is a perspective view of alignment plate 214 that may be used with beverage dispensing package 200 (shown in FIG. 19).

In an exemplary embodiment, alignment plate 214 includes a plurality of fitment openings 216 and a locking member opening 220. In one embodiment, fitment openings 216 are key-hole shaped to enable fitments 210 of each bag 206 to be easily inserted (through the larger portion of each opening 216) and to enable fitments 210 to be secured in a final attachment position (the smaller portion of each opening 216) to facilitate coupling fitments 210 to the connector assembly. Alternatively, fitment openings 216 may have any suitable shape.

Locking member opening 220 is shaped to receive a portion of a locking member of the connector assembly. In one embodiment, locking member opening 220 is circular. Alternatively, locking member opening 220 may be any suitable shape.

Alignment plate 214 also includes two grip openings 218 defined therein to enable a user to grasp a grip portion 302 of alignment plate 214. While two grip openings 218 are shown in FIG. 20, it should be recognized that any suitable number of grip openings 218 may be formed in alignment plate 214.

Figure 21:
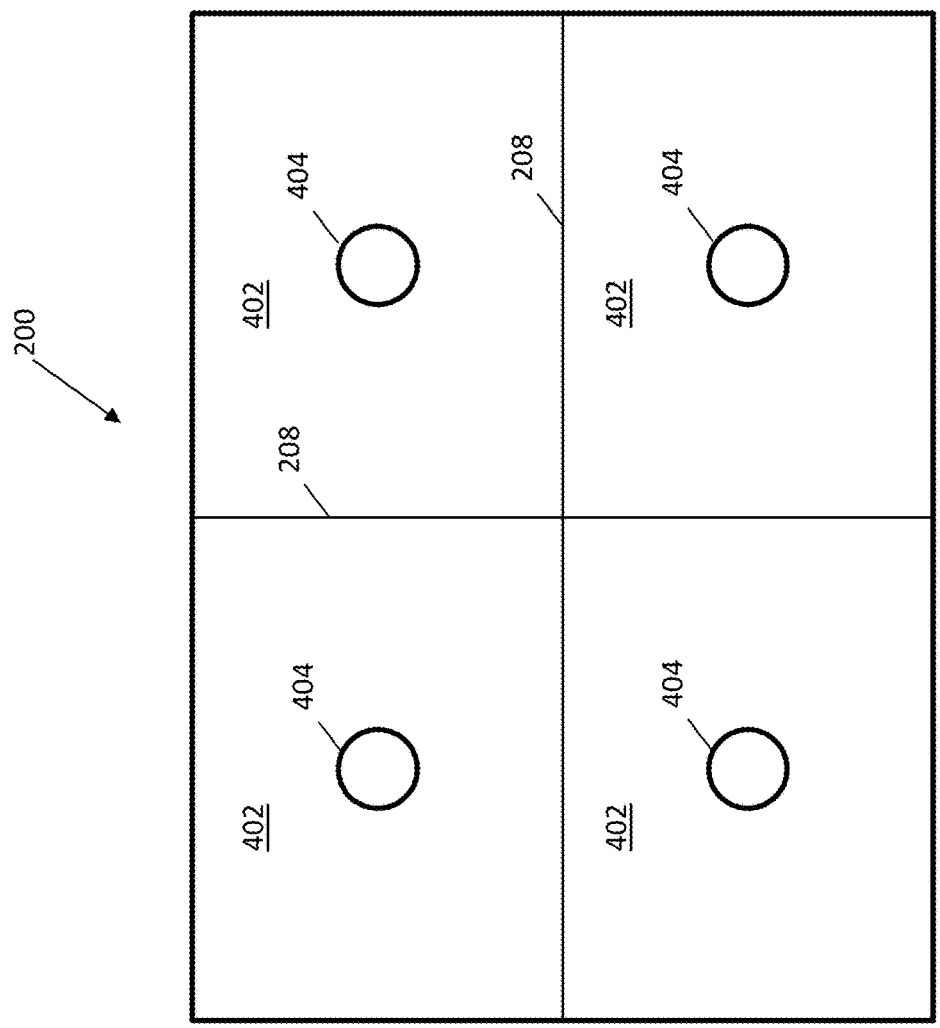
FIG. 21 is a block diagram showing a top view of the beverage dispensing package of FIG. 19 with an alignment plate and fitment caps removed.

FIG. 21 is a block diagram showing a top view of beverage dispensing package 200 (e.g., box 200) with alignment plate 214 and caps 212 removed. As illustrated in FIG. 21, box 200 may include a plurality of dividers 208 that form a plurality of compartments 402 within box 200. While two dividers 208 are shown as forming four compartments 402, it should be recognized that any suitable number of dividers 208 and compartments 402 may be included within each box 200.

In an exemplary embodiment, a separate bag 206 is positioned within each compartment 402. Each bag 206 includes a respective outlet 404 for dispensing the contents of bag 206 (e.g., alcoholic beverages). Each outlet 404 is separated from each other so that the outlets 404 (and therefore, the contents of each bag 206) are not in fluid communication with each other. This is sometimes referred to as being in a "divorced" state.

As illustrated in FIG. 21, box 200, compartments 402, and bags 206 may have a substantially square or rectangular cross-section to enable bags 206 and boxes 200 to be stacked on top of each other during transport or during operation (i.e., during the dispensing of the alcoholic beverages). Alternatively, boxes 200, compartments 402, and bags 206 may have any suitable shape or cross-section as desired. Further examples of box 200, compartments 402, and bag 206 shapes are illustrated in FIGS. 22 and 23A-23D.

FIG. 22 illustrates an alternative embodiment of a box 500 having elongated rectangular compartments 502 that may be used with beverage dispensing system 100 (shown in FIG. 18). While six rectangular compartments 502 are illustrated in FIG. 22, any suitable number and shape of compartments 502 may be used with box 500.

In the embodiment shown in FIG. 22, a bag (not shown) having a rectangular cross-section is placed within each compartment, and an outlet 504 of each bag is positioned near a bottom portion of each compartment 502. Alternatively, outlets 504 may be positioned in any suitable location with respect to the bags or compartments 502. A rectangular alignment plate 506 is coupled to the bags and outlets 504 in a similar manner as described above with reference to FIGS. 2 and 3.

A connector assembly 508 is removably attachable to alignment plate 506. Connector assembly 508 includes a plurality of connectors 510, with each connector 510 aligned with a respective outlet 504 when outlets 504 are positioned within alignment plate 506. The connectors 510 are in flow communication with a main outlet 512 of connector assembly 508. Accordingly, when connector assembly 508 is attached to alignment plate 506, the bags are coupled in flow communication with main outlet 512 through each bag outlet 504 and through the respective connectors 510. The contents of each bag are therefore enabled to jointly and simultaneously flow together through connector assembly 508 and be dispensed out of main outlet 512.

In one embodiment, connector assembly 508 is removably attached to alignment plate 506 by one or more latches 514 that engage a portion of alignment plate 506 and/or box 500. One or more buttons 516 are provided in connector assembly 508 that release latches 514 when buttons 516 are pressed by a user to enable connector assembly 508 to detach from alignment plate 506 and box 500.

Figure 23C:
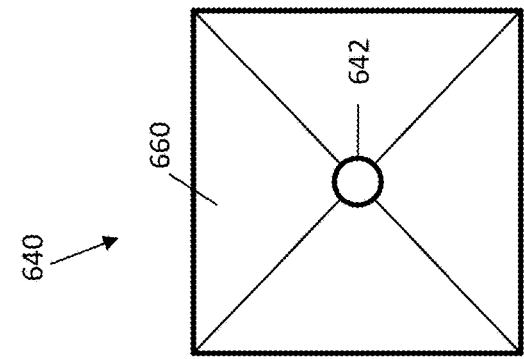
FIGS. 23A-23D illustrate alternative beverage dispensing packages and associated containers that may be used with the beverage dispensing system shown in FIG. 18.
Figure 23B:
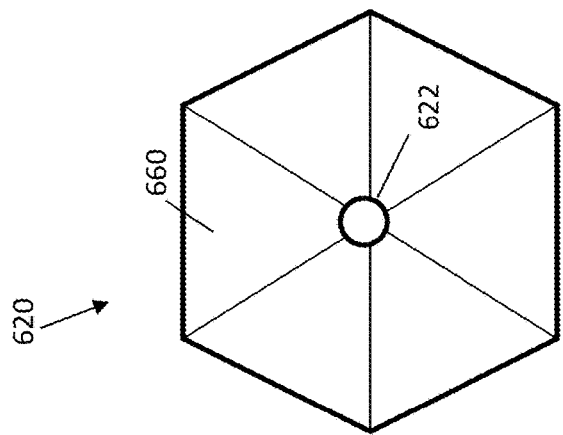
Figure 23A:
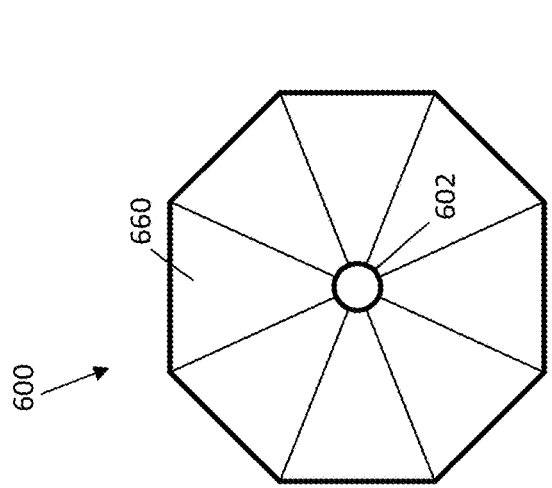
Figure 23D:
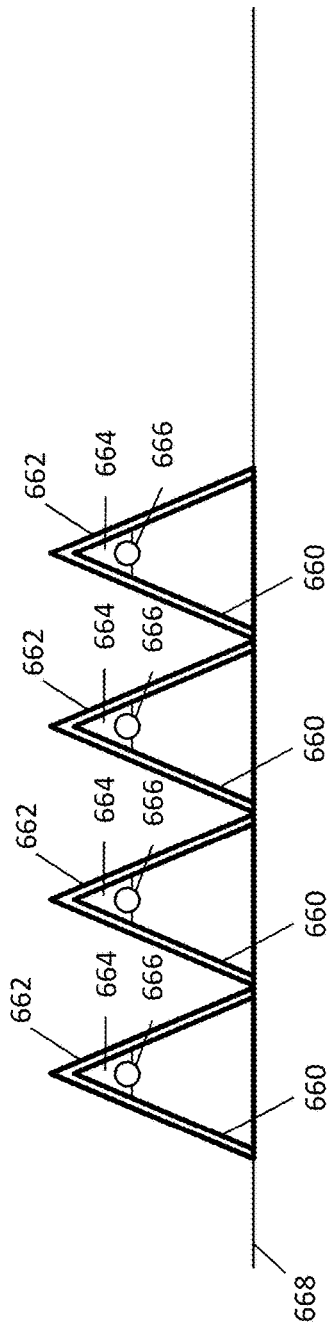

FIGS. 23A-23D illustrate alternative boxes and associated bags that may be used with beverage dispensing system 100 (shown in FIG. 18). FIG. 23A is a block diagram of a substantially octagonal box 600. FIG. 23B is a block diagram of a substantially hexagonal box 620. FIG. 23C is a block diagram of a substantially square box 640. FIG. 23D illustrates bags 660 having a substantially triangular cross-section that may be used with the boxes shown in FIGS. 23A-23C.

Referring to FIG. 23A, octagonal box 600 includes eight bags 660 having a triangular cross-section. A common outlet 602 is positioned in the center of box 600 and is connected to respective outlets (shown in FIG. 23D) of each bag 660.

Referring to FIG. 23B, hexagonal box 620 includes six bags 660 having a triangular cross-section. A common outlet 622 is positioned in the center of box 620 and is connected to respective outlets (shown in FIG. 23D) of each bag 660.

Referring to FIG. 23C, square box 640 includes four bags 660 having a triangular cross-section. Similar to the embodiments of 23A and 23B, a common outlet 642 is positioned in the center of box 640 and is connected to respective outlets (shown in FIG. 23D) of each bag 660.

Referring to FIG. 23D, a plurality of bags 660 having a triangular cross-section may be used with the boxes shown in FIGS. 23A-23C. Bags 660 may be housed or positioned within an intermediate container 662 that also has a triangular cross-section. Each bag 660 includes an alignment portion 664 that may be used to align a respective outlet 666 with the common outlet of the box shown in FIG. 23A, 23B, or 23C.

Each intermediate container 662 may be coupled to a common edge 668 that may form the exterior of the box. For example, in one embodiment, each intermediate container 662 is coupled to a common piece of cardboard that may be folded to form the box. Thus, if four intermediate containers 662 and associated bags 660 are provided, containers 662 may be folded along edge 668 to form the square box shown in FIG. 23C. It should be recognized that other suitable shapes may be used for intermediate containers 662 and bags 660 to form a box of any suitable shape and size. It should also be recognized that intermediate containers 662 may be connected together along different edges to form boxes of any desired shape and configuration.

In one embodiment, the bags of the boxes described in FIGS. 23A-23C may be covered by a removable portion of the respective box. For example, in one embodiment, the box may include one or more tear-away portions or sides that may be pulled away from the bags by a user to reveal the bags and/or outlets.

FIGS. 24-32 illustrate components of a first embodiment of an integrated beverage dispensing system, including a beverage dispensing package and an associated connector assembly.

FIGS. 33-40 illustrate components of a second embodiment of an integrated beverage dispensing system, including a beverage dispensing package and an associated connector assembly.

Figure 31:
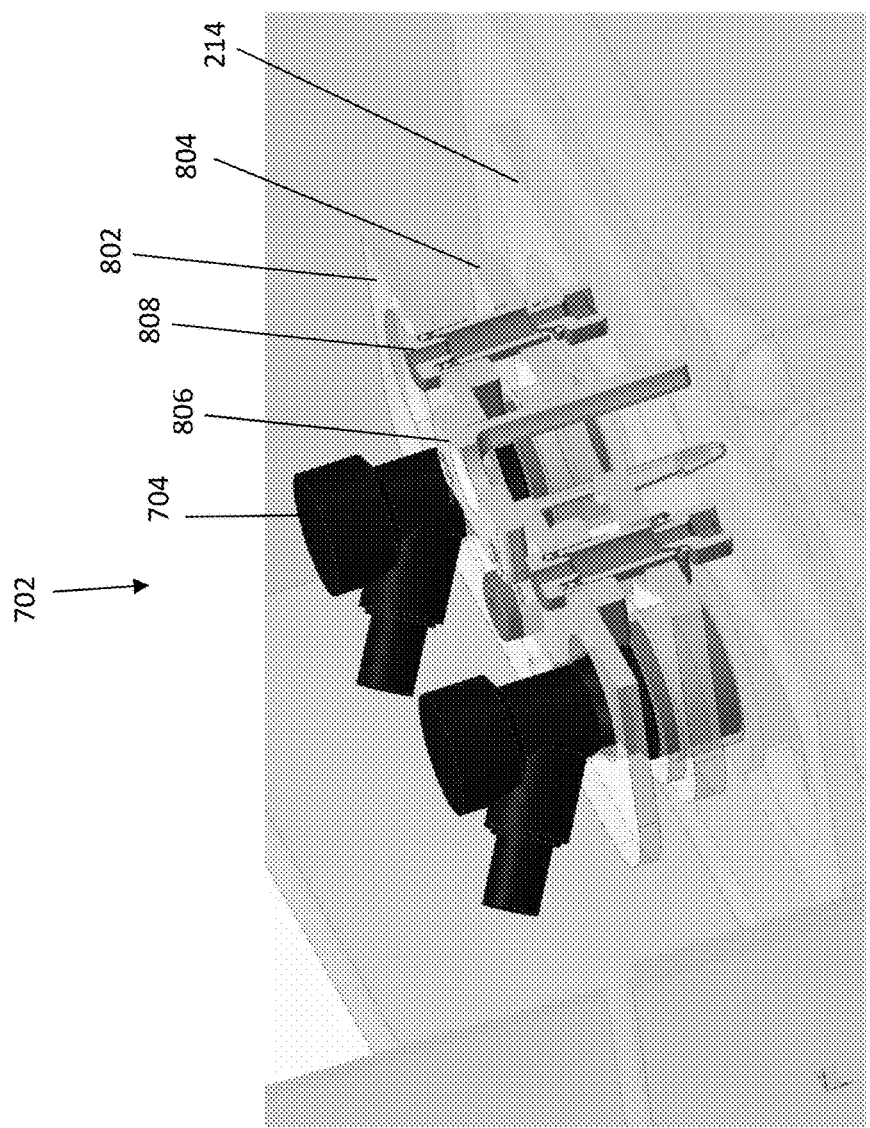
FIG. 31 is a perspective cut-away view of the connector assembly shown in FIG. 25 taken along line A-A.

FIG. 31 illustrates a third embodiment of an integrated beverage dispensing system, including a beverage dispensing package and an associated connector assembly.

Figure 24:
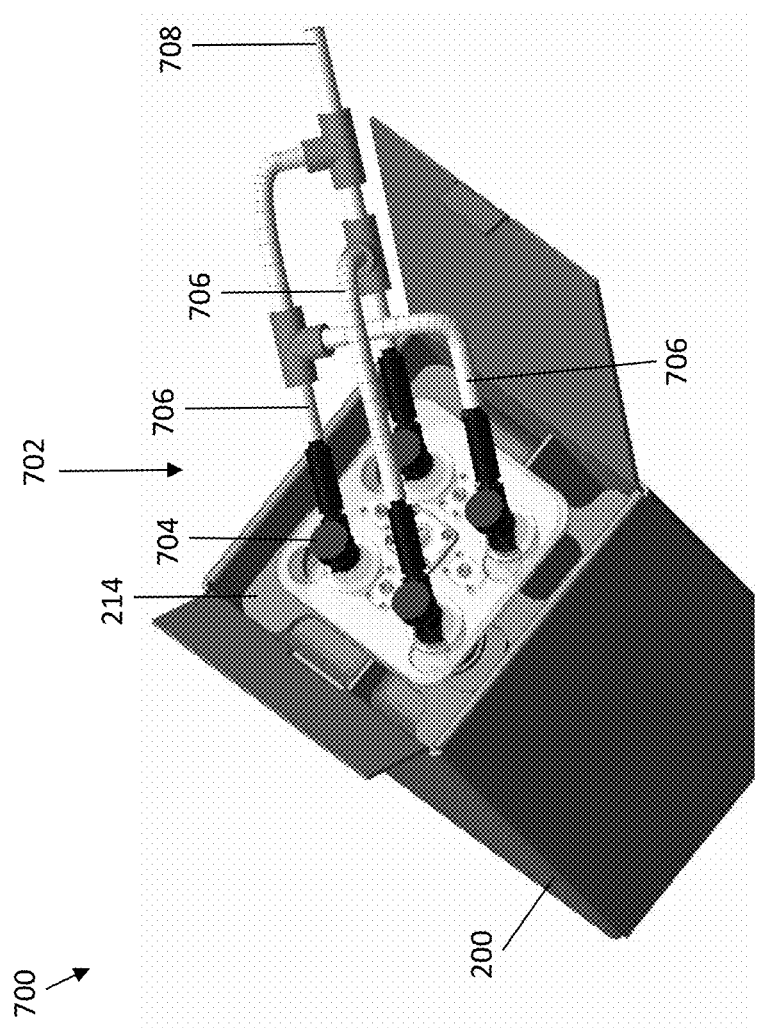
FIG. 24 is a perspective view of a beverage dispensing system.

Referring to FIG. 24 a perspective view of a first embodiment of a beverage dispensing system 700 is illustrated. Beverage dispensing system 700 includes beverage dispensing package 200 (e.g., a box 200) and a connector assembly 702 that is removably coupled to box 200.

In an exemplary embodiment, box 200 includes four bags positioned within four compartments created by two dividers. Alternatively, any suitable number of compartments, bags, and dividers may be used with box 200. In addition, box 200 includes an alignment plate 214 and fitments 210 described above with reference to FIGS. 19 and 20.

Connector assembly 702 includes a plurality of connectors 704 that correspond to fitments 210. Each connector 704 is aligned and sized to enable an insertion portion (not shown) of connector 704 to be inserted within a respective fitment 210 when cap 212 of fitment 210 is removed. Each connector 704 may be connected to an intermediate dispensing line 706, and each intermediate dispensing line 706 may be connected to a main dispensing line 708. Alternatively, connectors 704 may be connected directly to main dispensing line 708 using a single adapter that connects all connectors 704 to main dispensing line 708. When connectors 704 are connected to fitments 210 and to intermediate dispensing lines 706 and main dispensing line 708, a flow communication is established from bags 206 to main dispensing line 708 through bag outlets 404, fitments 210, connectors 704, and intermediate lines 706.

Figure 25:
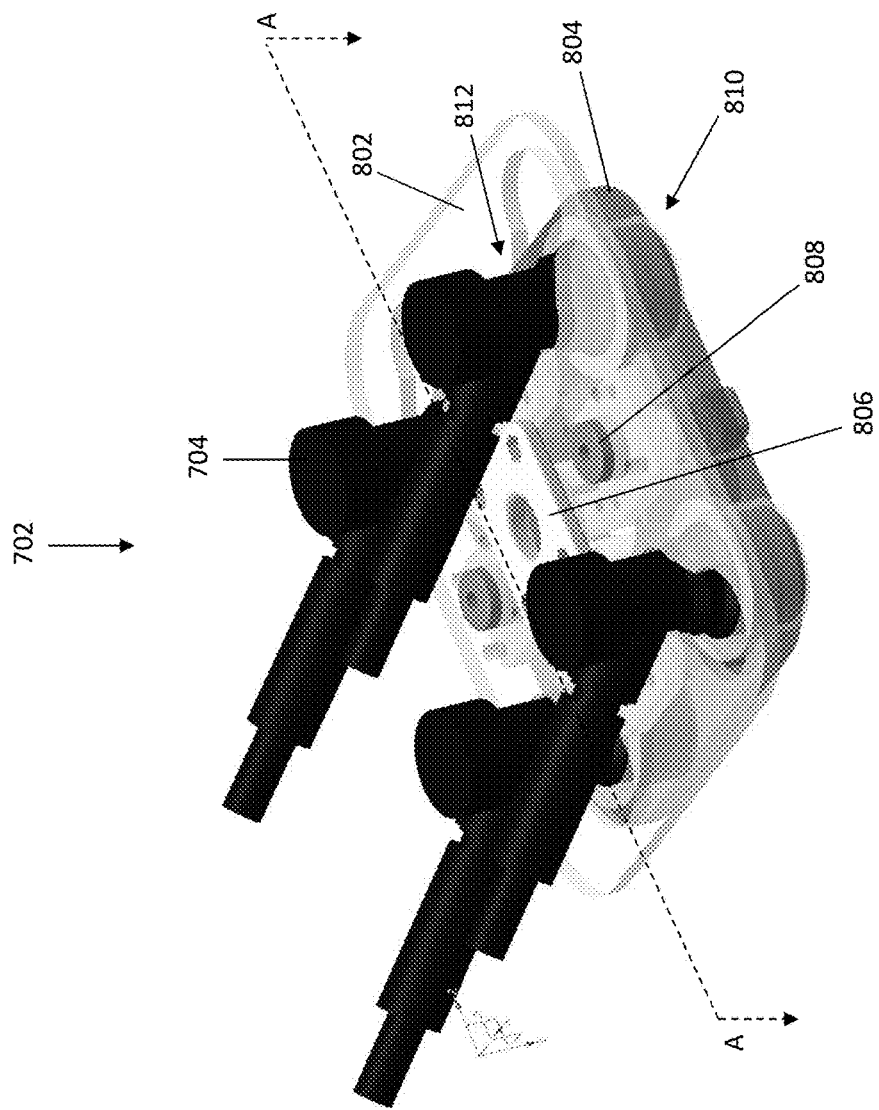
FIG. 25 is a perspective view of a connector assembly that may be used with the beverage dispensing system shown in FIG. 24.
Figure 26:
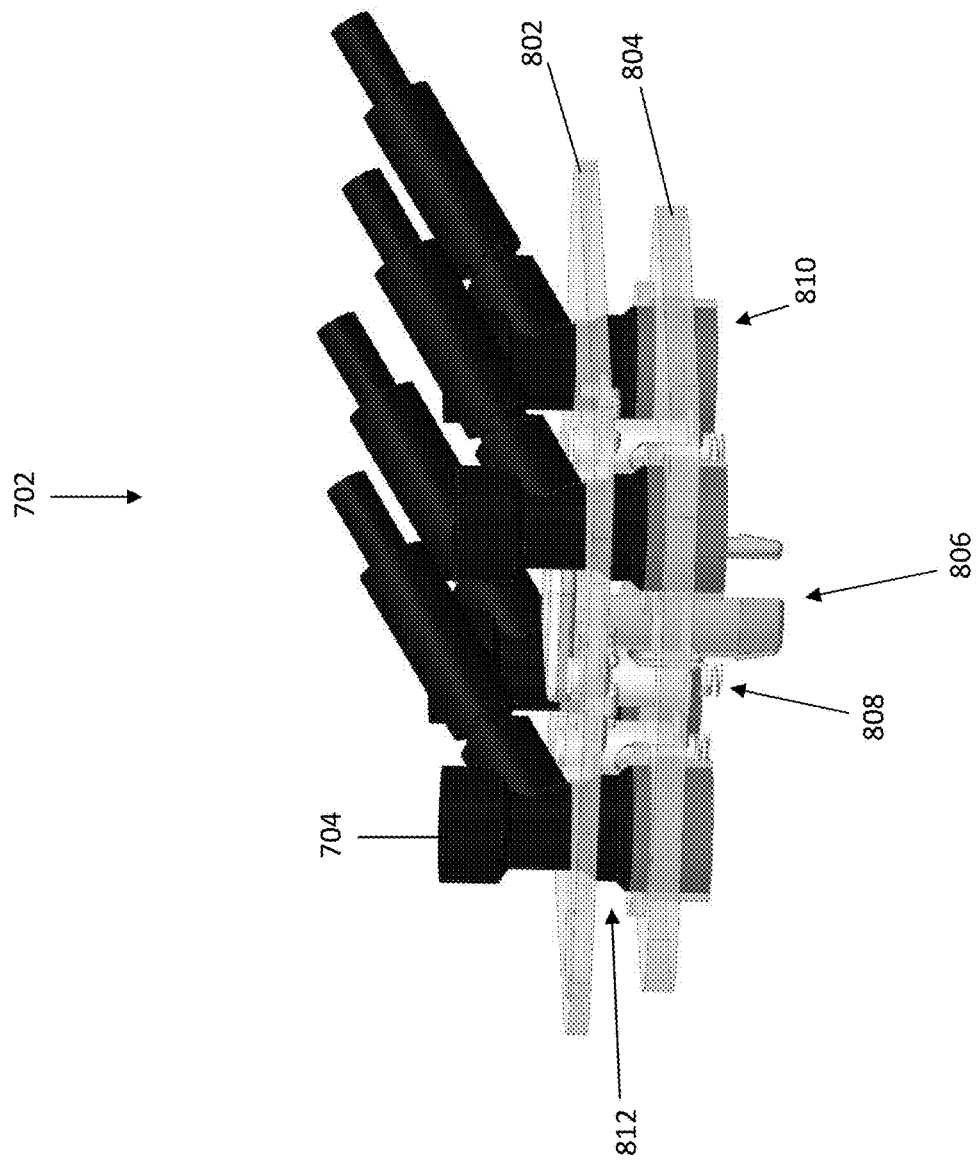
FIG. 26 illustrates a side view of the connector assembly shown in FIG. 25.

Referring to FIG. 25, a perspective view of connector assembly 702 is illustrated. FIG. 26 illustrates a side view of connector assembly 702. As illustrated in FIGS. 8 and 9, connector assembly 702 includes connectors 704, a holding plate 802, an actuator plate 804, a locking member 806, and a plurality of spring members 808. Holding plate 802, actuator plate 804, locking member 806, and spring members 808 are illustrated and described with reference to FIGS. 27-40.

In an exemplary embodiment, connectors 704 are coupled to holding plate 802 and a portion of each connector 704 extends through respective openings defined in holding plate 802 and actuator plate 804. Each connector 704, in this embodiment, is a ball lock "push-pull" connector that includes a movable portion that is able to be selectably connected to fitments 210 or disconnected from fitments 210. More specifically, when connector assembly 702 is ready to be connected to alignment plate 214 and fitments 210, a movable sleeve 810 of connector 704 is pulled toward a main body 812 of connector 704 to prepare connector 704 for attachment. Movable sleeve 810 is then pushed away from main body 812, for example, by a spring (not shown) or another suitable biasing member within connector 704, once connector 704 is attached to fitment 210 to lock connector 704 to fitment 210. When connector assembly 702 is disengaged from actuator plate 804 and outlets 404, movable sleeve 810 is again pulled toward main body 812 to release connector 704 from fitment 210.

Figure 27:
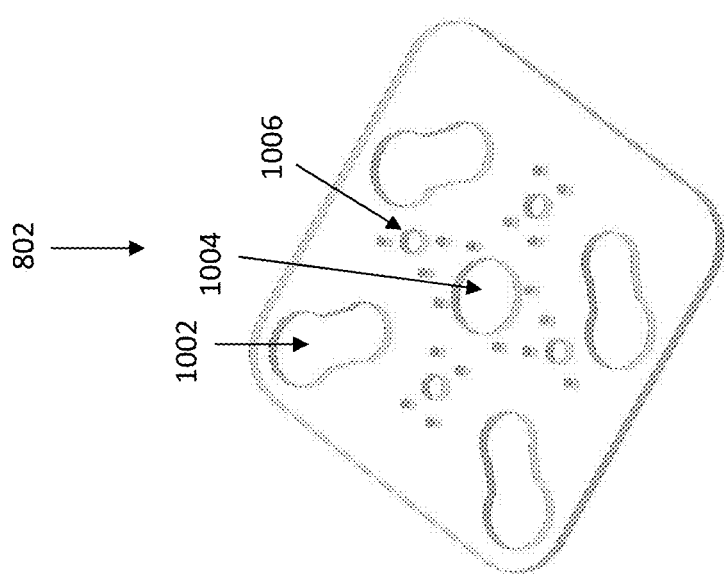
FIG. 27 is a top view of a holding plate that may be used with the beverage dispensing system shown in FIG. 24.

Referring to FIG. 27, a top view of holding plate 802 is illustrated. In an exemplary embodiment, each connector 704, locking member 806, and spring member 808 is coupled to holding plate 802.

In an exemplary embodiment, holding plate 802 includes a connector opening 1002 for each connector 704 to enable connector 704 to extend through the respective opening 1002 and thus, through holding plate 802. In an exemplary embodiment, each connector opening 1002 is shaped as a keyhole shape to facilitate attaching and aligning connectors 704 to holding plate 802. Holding plate 802 also includes a locking member opening 1004 through which locking member 806 extends.

In an exemplary embodiment, holding plate 802 also includes a plurality of spring member openings 1006 that enable a respective spring member 808 to extend through each opening 1006.

Holding plate 802 is designed to hold connectors 704 in place when attaching connector assembly 702 to alignment plate 214 (and thus box 200) and when removing connector assembly 702 from alignment plate 214 and box 200. In addition, holding plate 802 provides a secure and stable support that a user may grasp, push, and pull (as appropriate) when connecting and disconnecting connector assembly 702.

Figure 28:
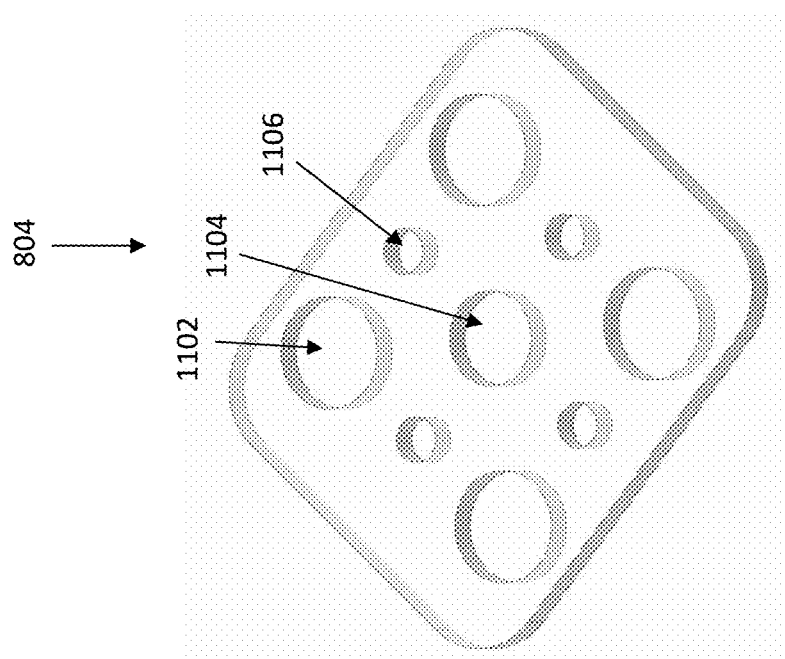
FIG. 28 is a top view of an actuator plate that may be used with the beverage dispensing system shown in FIG. 24.

Referring to FIG. 28, a top view of actuator plate 804 is illustrated. In an exemplary embodiment, each connector 704 and spring member 808 is coupled to holding plate 802. However, locking member 806 is not coupled to actuator plate 804.

In an exemplary embodiment, actuator plate 804 includes a plurality of connector openings 1102, a locking member opening 1104, and a plurality of spring member openings 1106. In a similar manner as described above with reference to holding plate 802, connectors 704 extend through a respective connector opening 1102, locking member 806 extends through locking member opening 1104, and spring members 808 extend through a respective spring member opening 1106.

Actuator plate 804 is designed to prepare connectors 704 for connecting to fitment 210 and for disconnecting from fitment 210. In an exemplary embodiment, movable sleeve 810 of each connector 704 is coupled to actuator plate 804 such that each sleeve 810 is automatically moved when actuator plate 804 is moved. For example, when actuator plate 804 is moved toward holding plate 802, movable sleeves 810 are also moved toward holding plate 802 to enable connectors 704 to be connected to fitment 210 or disconnected from fitment 210. When actuator plate 804 is moved away from holding plate 802, movable sleeves 810 are also moved away from holding plate 802 to enable movable sleeves 810 to latch onto fitments 210.

Figure 29:
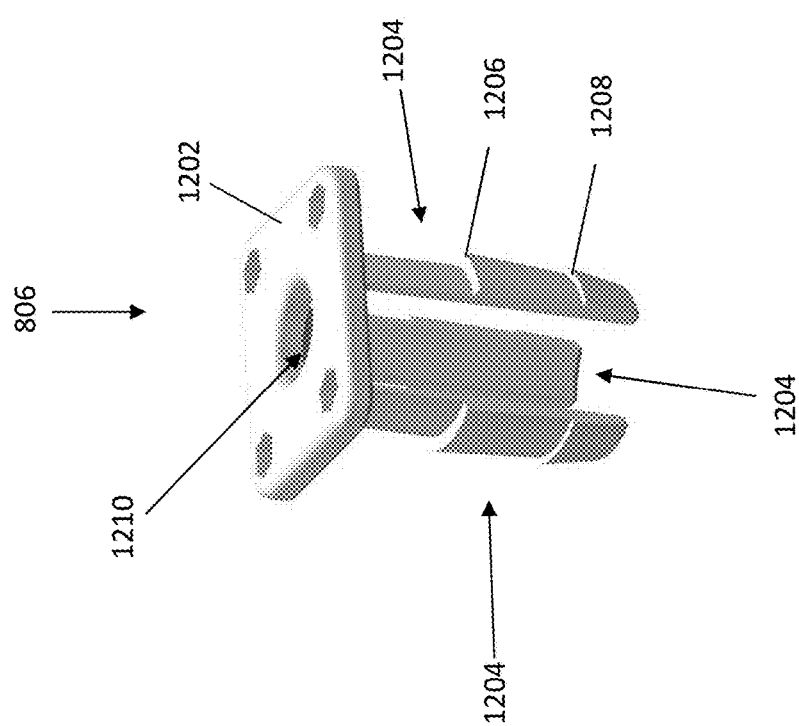
FIG. 29 is a side view of a locking member that may be used with the beverage dispensing system shown in FIG. 24.

Referring to FIG. 29, a side view of locking member 806 is illustrated. In an exemplary embodiment, locking member 806 includes a head portion 1202 and a plurality of legs 1204. Each leg 1204 includes a first engagement ridge 1206 and a second engagement ridge 1208.

Head portion 1202 includes a plurality of screw or bolt holes that enable locking member 806 to be screwed or bolted to holding plate 802. Alternatively, any other suitable means can be used to secure locking member 806 to holding plate 802. While head portion 1202 is securely attached to holding plate 802, legs 1204 extend through locking member opening 1004 of holding plate 802 and locking member opening 1104 of actuator plate 804 and are not attached to actuator plate 804.

In one embodiment, head portion 1202 includes a central opening 1210 extending through a center of head portion 1202. Alternatively, opening 1210 may be positioned in any suitable location of head portion 1202. Central opening 1210 enables a user to look through head portion 1202 (via opening 1210) to visibly identify locking member opening 220 of alignment plate 214. Accordingly, the user may align connector assembly 702 with alignment plate 214 when the user attaches connector assembly 702 to alignment plate 214. Central opening 1210 may also enable the user to visibly determine the level of liquid within one or more bags 206 when connector assembly 702 is attached to alignment plate 214 and box 200.

Locking member 806 enables connector assembly 702 to be securely attached, or locked, to alignment plate 214 of box 200. In addition, locking member 806 enables actuator plate 804 to be releasably secured in a position (also referred to as a "primed position") with respect to holding plate 802 that enables connector assembly 702 to be attached to alignment plate 214 as described more fully herein.

Figure 30:
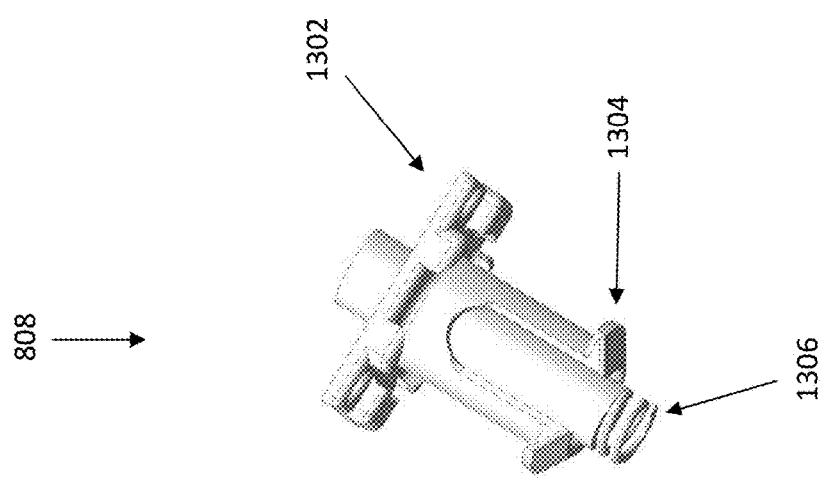
FIG. 30 is a top view of a spring member that may be used with the beverage dispensing system shown in FIG. 24.

Referring to FIG. 30, a top view of spring member 808 is illustrated. In an exemplary embodiment, each spring member 808 includes an upper flange 1302 and a lower flange 1304. Upper flange 1302 includes a plurality of screw or bolt holes that enable spring member 808 to be screwed or bolted to holding plate 802. Alternatively, any other suitable means can be used to secure upper flange 1302 to holding plate 802.

In an exemplary embodiment, spring members 808 are used to prevent actuator plate 804 from moving more than a predefined distance away from holding plate 802. For example, lower flange 1304 engages a bottom surface of actuator plate 804 (the surface facing away from holding plate 802) to prevent actuator plate 804 from moving past lower flange 1304.

Spring member 808 includes a spring 1306 or other biasing component that extends out from a bottom portion of spring member 808 away from holding plate 802 and actuator plate 804. As described more fully herein, spring 1306 contacts alignment plate 214 of box 200 when connector assembly 702 is attached to alignment plate 214 and fitments 210. Spring 1306 therefore biases connector assembly 702 away from alignment plate 214 when connector assembly 702 is attached to alignment plate 214 to facilitate disengaging connector assembly 702 from alignment plate 214 and box 200.

Figure 32:
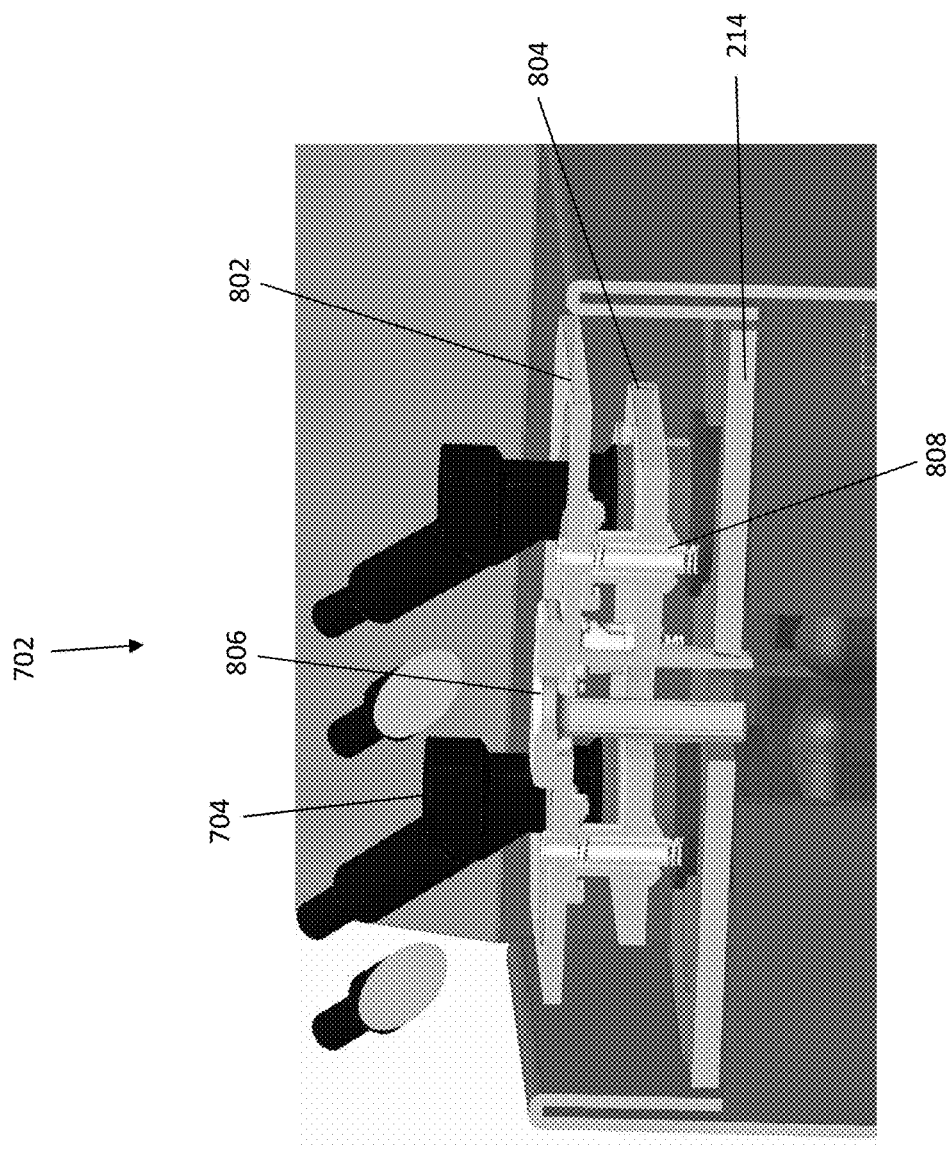
FIG. 32 is a side cut-away view of the connector assembly shown in FIG. 25 taken along line A-A.

Referring to FIG. 31, a perspective cut-away view of connector assembly 702 taken along line A-A is illustrated. FIG. 32 is a side cut-away view of connector assembly 702 taken along line A-A. FIGS. 14 and 15 may be used to illustrate the operation of connector assembly 702 when connecting to alignment plate 214 or when disconnecting from alignment plate 214.

As described above, box 200 is typically shipped or transported disconnected from connector assembly 702, and a cap 212 covers each fitment 210 of each bag 206. Once the box 200 and connector assembly 702 arrive at a destination for assembly, a user removes caps 212 from fitments 210.

The user then holds connector assembly 702 and pulls actuator plate 804 towards holding plate 802 to prepare connector assembly 702 for connection to box 200. As actuator plate 804 moves toward holding plate 802, legs 1204 of locking member 806 move further through locking member opening 1104 of actuator plate 804 until actuator plate 804 reaches first engagement ridge 1206. First engagement ridge 1206 of each leg 1204 snaps into position contacting the bottom surface of actuator plate 804. In addition, since movable sleeve 810 of each connector 704 is attached to actuator plate 804, each movable sleeve 810 is pushed toward holding plate 802, thus preparing each connector 704 for attachment to a respective fitment 210.

The user may then release actuator plate 804. First engagement ridge 1206 of each locking member leg 1204 securely holds actuator plate 804 (and connector assembly 702) in a primed position (i.e., a position ready for attachment to box 200).

Next, the user presses connector assembly 702 onto alignment plate 214 such that connectors 704 attach to fitments 210. The user may do so by wrapping his or her fingers around grip portion 302 of alignment plate 214, placing his or her palm on holding plate 802, and contracting the fingers toward the palm. As this happens, legs 1204 of locking member 806 move through locking member opening 220 of alignment plate 214.

In an exemplary embodiment, locking member opening 220 in alignment plate 214 has a smaller diameter than a diameter of locking member opening 1104 of actuator plate 804. Accordingly, when legs 1204 of locking member 806 begin to enter locking member opening 1104 of alignment plate 214, legs 1204 are pressed or bent inward by the relatively small diameter of locking member opening 220 of alignment plate 214 as compared to the diameter of the locking member opening 1104 of actuator plate 804. As legs 1204 are pushed inward from the insertion force of pressing connector assembly 702 onto alignment plate 214, first engagement ridge 1206 of each leg 1204 also is pressed inward and disengages from actuator plate 804. Thus, holding plate 802 is freed to move away from actuator plate 804 by the biasing force of spring members 808 and/or movable sleeves 810.

As holding plate 802 moves away from actuator plate 804, movable sleeves 810 also are moved away from holding plate 802 and, as a result, latch onto fitments 210. Second engagement ridge 1208 of locking member 806 latches to the underside of alignment plate 214 (i.e., the surface of alignment plate 214 facing away from connector assembly 702) to secure connector assembly 702 to alignment plate 214.

At this point, connector assembly 702 is securely attached to alignment plate 214 and fitments 210 by second engagement ridge 1208 of locking member 806 and by the biasing force of spring members 808. Furthermore, an uninterrupted fluid communication path is formed by the fact that bags 206, outlets 404, fitments 210, connectors 704, intermediate dispensing line 706 (if provided), and main dispensing line 708 are all positioned in flow communication with each other. The alcoholic beverage (or other contents) within each bag 206 may then be dispensed using a nozzle or other tool coupled to main dispensing line 708.

If the user wants to disconnect box 200 from connector assembly 702, the user grasps actuator plate 804 and holding plate 802, and squeezes the plates together to move actuator plate 804 toward holding plate 802. The diameter of locking member opening 1104 of actuator plate 804 is smaller than the portion of each leg 1204 between first engagement ridge 1206 and second engagement ridge 1208. Thus, when actuator plate 804 is moved toward holding plate 802, legs 1204 are forced inward again. As legs 1204 are forced inward, second engagement ridge 1208 disengages from alignment plate 214 such that alignment plate 214 is no longer held in place by locking member 806. The biasing force of spring members 808 against alignment plate 214 causes connector assembly 702 to be pushed away from alignment plate 214, and connectors 704 are automatically disengaged from fitments 210 and outlets 404.

When actuator plate 804 is moved sufficiently close to holding plate 802, first engagement ridge 1206 of each leg 1204 snaps into position contacting the bottom surface of actuator plate 804. The user may then release actuator plate 804. At this point, actuator plate 804 is now back in the primed position and connector assembly 702 is ready to be attached to another box 200, if desired.

Figure 33:
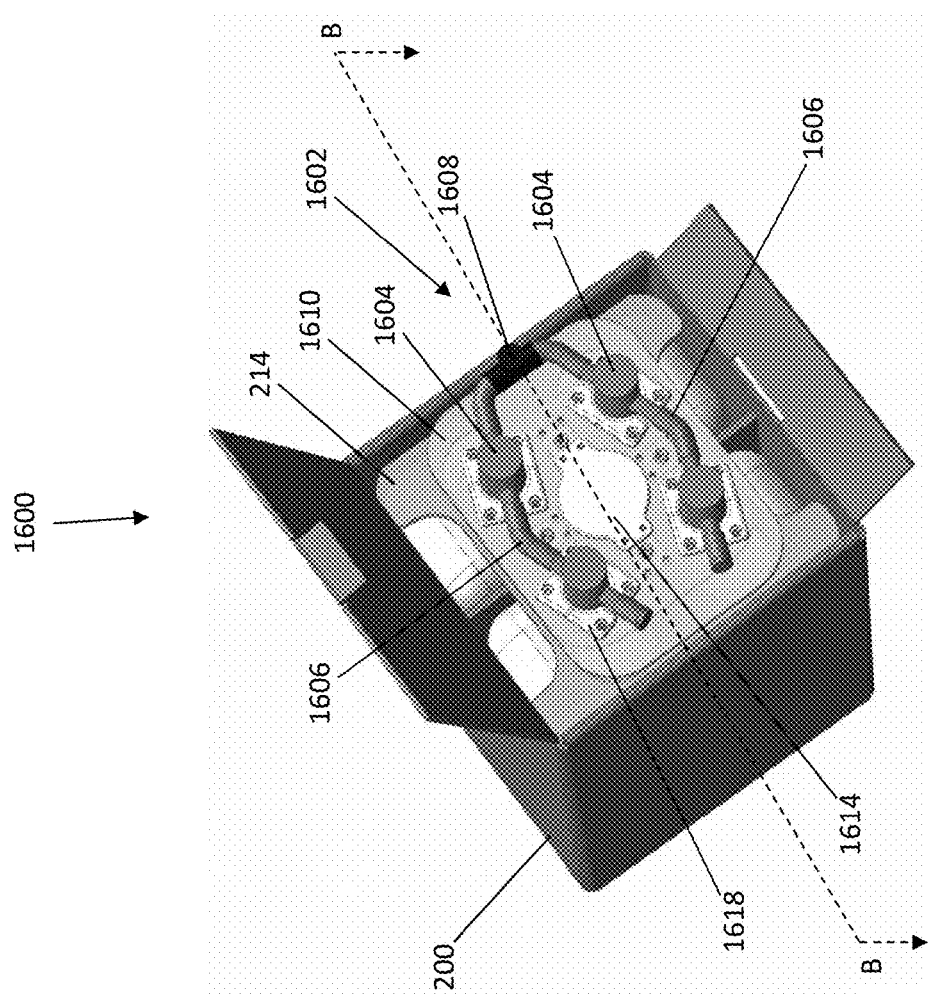
FIG. 33 is a perspective view of another beverage dispensing system.
Figure 34:
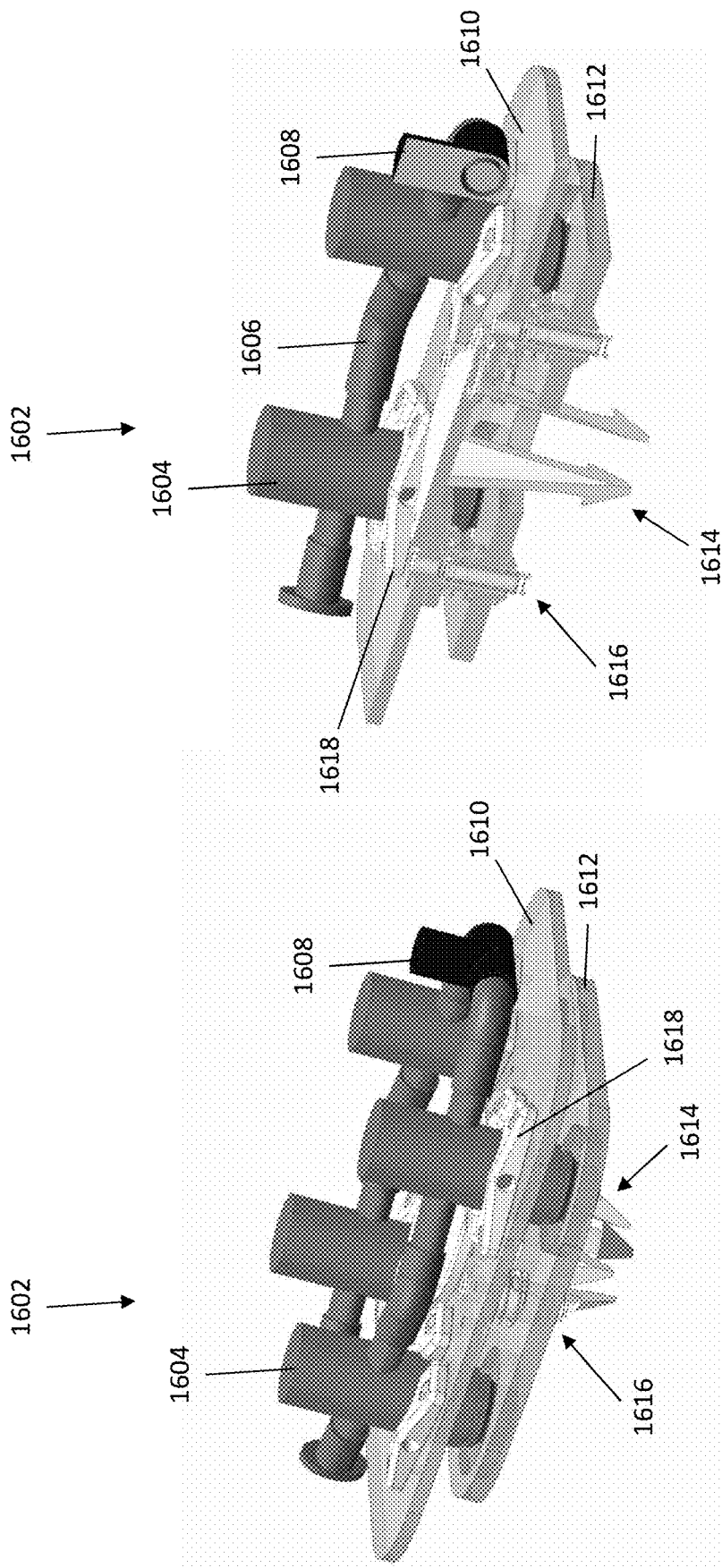
FIG. 34A is a perspective view of a connector assembly that may be used with the beverage dispensing system shown in FIG. 33.
FIG. 34B is a perspective cut-away view of the connector assembly of FIG. 33 taken along line B-B.

Referring to FIG. 33, a perspective view of a second embodiment of a beverage dispensing system 1600 is illustrated. Beverage dispensing system 1600 includes a beverage dispensing package 200 (e.g., a box) and a connector assembly 1602 that is removably coupled to box 200.

In an exemplary embodiment, box 200 includes four bags positioned within four compartments created by two dividers. Alternatively, any suitable number of compartments, bags, and dividers may be used with box 200. As described above, box 200 includes an alignment plate 214 and fitments 210.

FIG. 34A is a perspective view of connector assembly 1602 and FIG. 34B is a perspective cut-away view of connector assembly 1602 taken along line B-B.

As illustrated in FIGS. 33, 34A, and 34B, connector assembly 1602 includes a plurality of connectors 1604 that are coupled together by a single main dispensing line 1606 which terminates in a main dispensing outlet 1608. Connector assembly 1602 also includes a holding plate 1610, an actuator plate 1612, a locking member 1614, and a plurality of spring members 1616. A mounting bracket 1618 couples each connector 1604 to holding plate 1610 in an exemplary embodiment.

In the embodiment shown in FIGS. 33, 34A, and 34B, connectors 1604 are so-called "push connectors". More specifically, in one embodiment, connectors 1604 are QCD II connectors. Accordingly, connectors 1604 may be pushed into engagement with fitments 210 without first needing to be placed in a primed position (as compared to connectors 704 of FIG. 24, for example).

Figure 35:
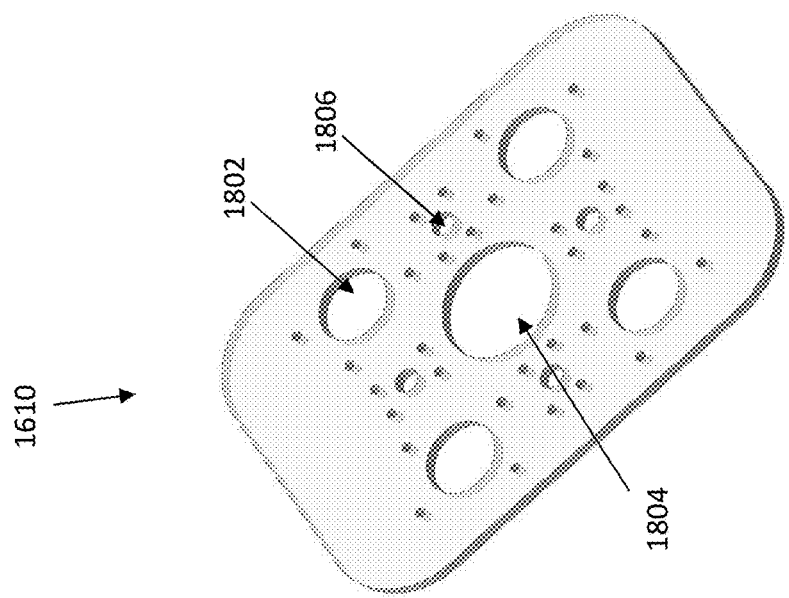
FIG. 35 is a perspective view of a holding plate that may be used with the beverage dispensing system shown in FIG. 33.

Referring to FIG. 35, a perspective view of holding plate 1610 is illustrated. Holding plate 1610 includes a plurality of connector openings 1802, a locking member opening 1804, and a plurality of spring member openings 1806. Holding plate 1610 is substantially similar to holding plate 802 (shown in FIG. 27) with the exception that connector openings 1802 are substantially circular, rather than keyhole shaped. Otherwise, holding plate 1610 operates substantially similarly to holding plate 1610 unless otherwise specified.

Figure 36:
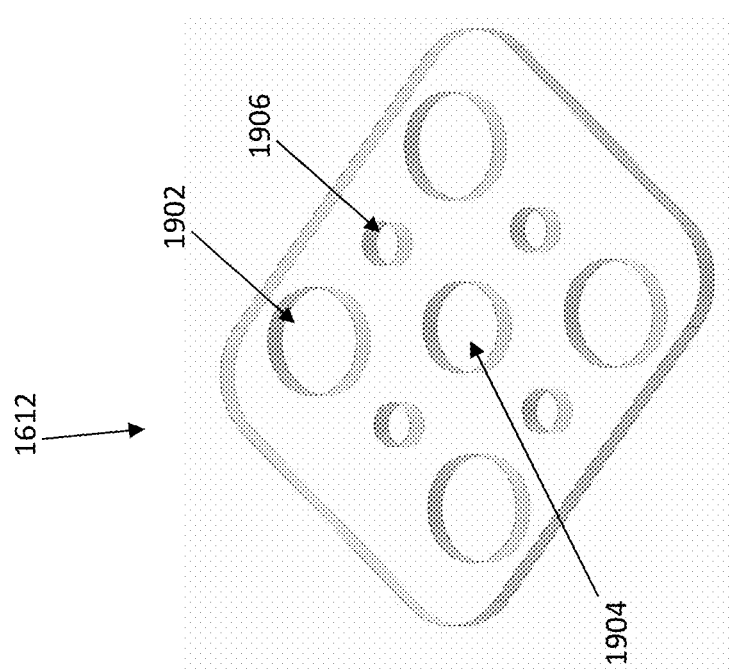
FIG. 36 is a perspective view of an actuator plate that may be used with the beverage dispensing system shown in FIG. 33.

Referring to FIG. 36, a perspective view of actuator plate 1612 is illustrated. Actuator plate 1612 includes a plurality of connector openings 1902, a locking member opening 1904, and a plurality of spring member openings 1906. Connector openings 1902 are sized and shaped to enable connectors 1604 to extend through actuator plate 1612 without engaging with actuator plate 1612. Accordingly, in this embodiment, connectors 1604 are not coupled to or otherwise engaged with actuator plate 1612 in contrast to connectors 704 (shown in FIG. 24) where movable sleeves 810 (shown in FIG. 25) are engaged with actuator plate 1612. Otherwise, actuator plate 1612 is substantially similar to actuator plate 804 (shown in FIG. 28) and operates substantially similarly unless otherwise noted.

Figure 37:
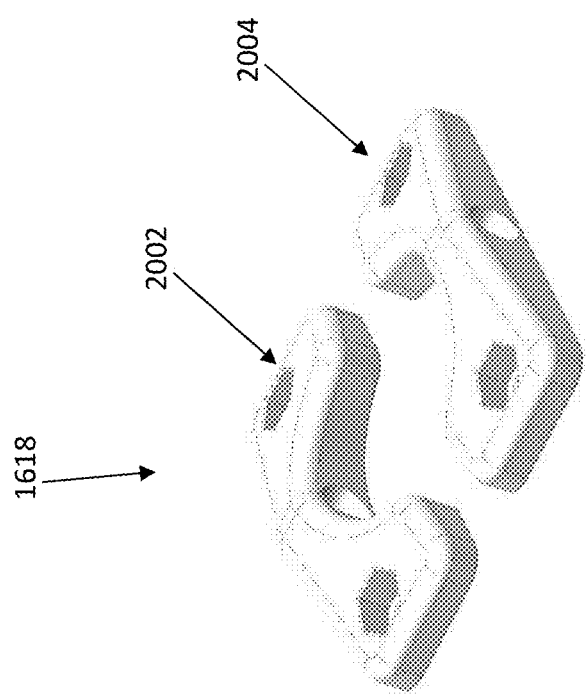
FIG. 37 is a perspective view of a mounting bracket that may be used with the beverage dispensing system shown in FIG. 33.

Referring to FIG. 37, a perspective view of mounting bracket 1618 is illustrated. In one embodiment, each mounting bracket 1618 includes a first portion 2002 and a second portion 2004 that cooperate together to secure each connector 1604 to holding plate 1610. For example, when assembling connector assembly 1602, connectors 1604 may be first positioned within respective connector openings 1802 of holding plate 1610. First portion 2002 and second portion 2004 of mounting bracket 1618 may then be placed on either side of each connector 1604 and may be bolted, screwed, or otherwise attached to holding plate 1610 to securely hold each connector 1604 in place with respect to holding plate 1610.

Figure 38:
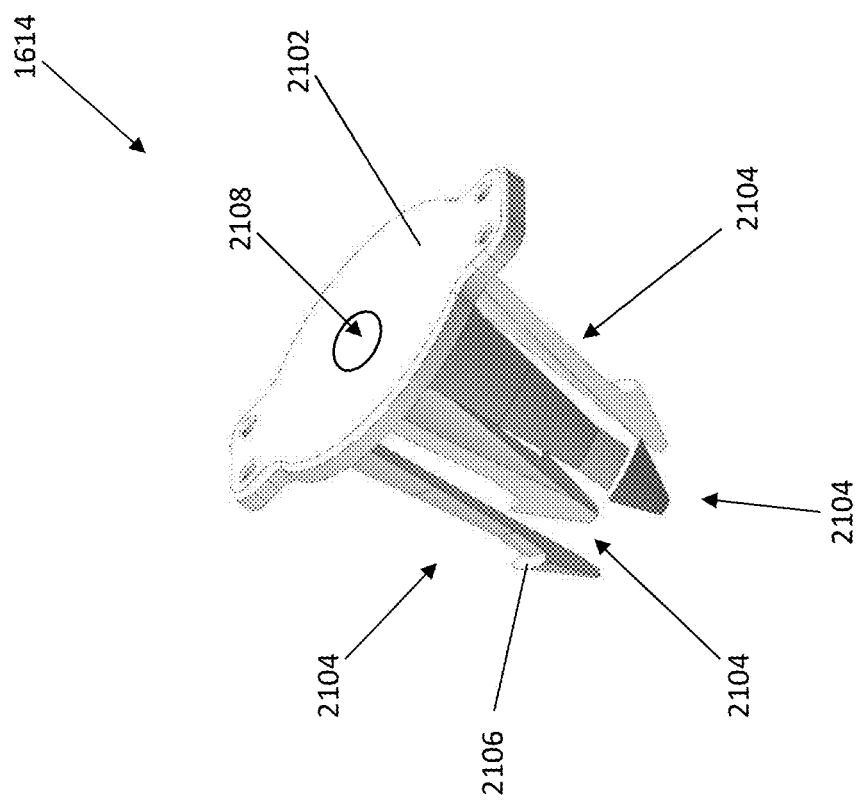
FIG. 38 is a perspective view of a locking member that may be used with the beverage dispensing system shown in FIG. 33.

Referring to FIG. 38, a perspective view of locking member 1614 is shown. Locking member 1614 includes a head portion 2102 and a plurality of legs 2104 that each include a first engagement ridge 2106. Accordingly, locking member 1614 is substantially similar to locking member 806 (shown in FIG. 29) except that locking member 1614 includes only a first engagement ridge 2106 (which is similar to second engagement ridge 1208 of locking member 806).

Similar to locking member 806, head portion 2102 of locking member 1614 includes a central opening 2108 extending through a center of head portion 2102. Alternatively, opening 2108 may be positioned in any suitable location of head portion 2102. Central opening 2108 enables a user to look through head portion 2102 (via opening 2108) to visibly identify locking member opening 220 of alignment plate 214. Accordingly, the user may align connector assembly 1602 with alignment plate 214 when the user attaches connector assembly 1602 to alignment plate 214. Central opening 2108 may also enable the user to visibly determine the level of liquid within one or more bags 206 when connector assembly 1602 is attached to alignment plate 214 and box 200.

Figure 39:
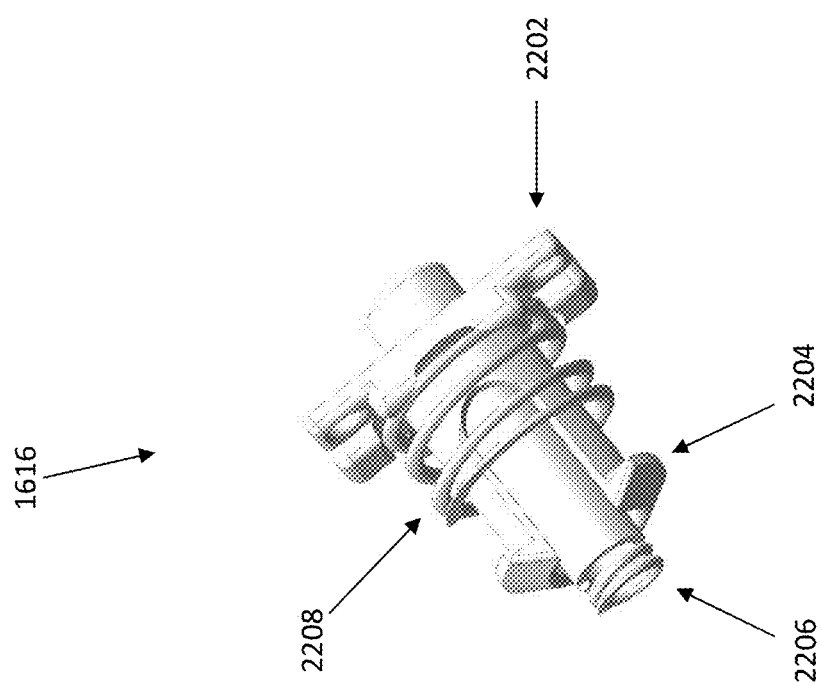
FIG. 39 is a perspective view of a spring member that may be used with the beverage dispensing system shown in FIG. 33.

Referring to FIG. 39, a perspective view of spring member 1616 is shown. In an exemplary embodiment, each spring member 1616 includes an upper flange 2202 and a lower flange 2204 that are substantially similar to upper flange 1302 and lower flange 1304 shown in FIG. 30. Spring members 1616 also include a first spring 2206 that is similar to spring 1306 shown in FIG. 30.

In an exemplary embodiment, spring members 1616 also include a second spring 2208 that is positioned between holding plate 1610 and actuator plate 1612 when connector assembly 1602 is assembled. Second spring 2208 contacts an upper surface of actuator plate 1612 (i.e., the surface facing holding plate 1610) and biases actuator plate 1612 away from holding plate 1610.

Figure 40:
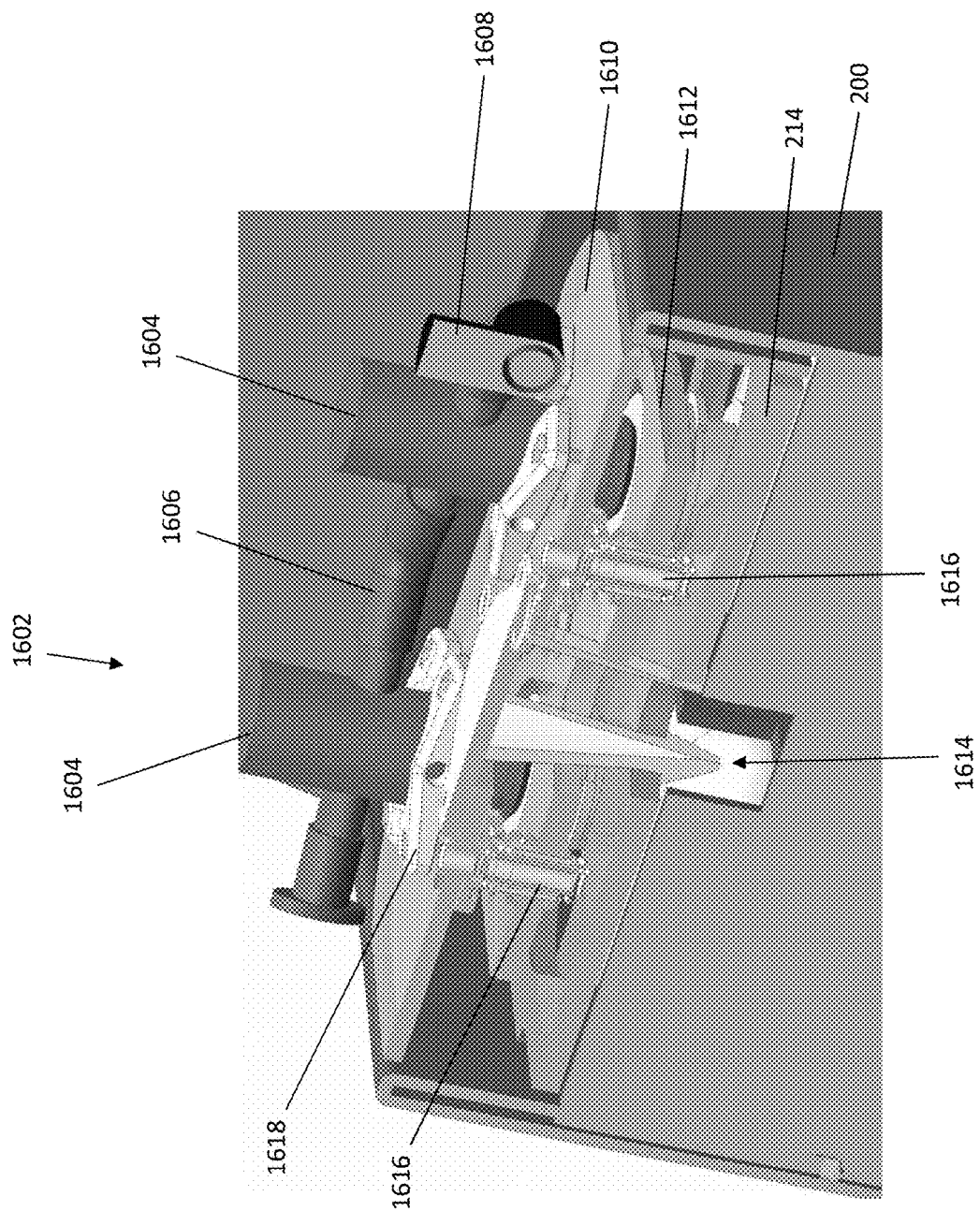
FIG. 40 is a perspective cut-away view of the connector assembly and box shown in FIG. 33 taken along line B-B.

Referring to FIG. 40, a perspective cut-away view of connector assembly 1602 and box 200 taken along line B-B is illustrated. FIG. 40 may be used to illustrate the operation of connector assembly 1602 when connecting to alignment plate 214 or when disconnecting from alignment plate 214.

As described above, box 200 is typically shipped or transported disconnected from connector assembly 1602 and a cap 212 covers each fitment 210 of each bag 206. Once the box 200 and connector assembly 1602 arrive at a destination for assembly, a user removes caps 212 from fitments 210.

In this embodiment, the user does not need to first pull actuator plate 1612 towards holding plate 1610 to prepare connector assembly 1602 for connection to box 200. Rather, the user just needs to align connectors 1604 with fitments 210, grasp holding plate 1610 and grip portions 302 of alignment plate 214, and then contract the user's hands together to push connector assembly 1602 into engagement with alignment plate 214.

As this happens, legs 2104 of locking member 1614 move through locking member opening 220 of alignment plate 214. First engagement ridge 2106 of locking member 1614 moves through locking member opening 220 of alignment plate 214 and latches to the underside of alignment plate 214 (i.e., the surface of alignment plate 214 facing away from connector assembly 1602).

At this point, connector assembly 1602 is securely attached to alignment plate 214 and fitments 210 by first engagement ridge 2106 of locking member 1614 and by the biasing force of spring members 1616. Furthermore, an uninterrupted fluid communication path is formed by the fact that bags 206, outlets 404, fitments 210, connectors 1604, intermediate dispensing line 706 (if provided), and main dispensing line 1606 are all positioned in flow communication with each other. The alcoholic beverage (or other contents) within each bag 206 may then be dispensed using a nozzle or other tool coupled to main dispensing line 1606.

If the user wants to disconnect box 200 from connector assembly 1602, the user grasps actuator plate 1612 and holding plate 1610 and squeezes the plates together to move actuator plate 1612 toward holding plate 1610. The diameter of locking member opening 1904 of actuator plate 1612 is smaller than the portion of each leg 2104 between first engagement ridge 2106 and head portion 2102. Thus, when actuator plate 1612 is moved toward holding plate 1610, legs 2104 are forced inward. As legs 2104 are forced inward, first engagement ridge 2106 disengages from alignment plate 214 such that alignment plate 214 is no longer held in place by locking member 1614. The biasing force of spring members 1616 against alignment plate 214 causes connector assembly 1602 to be pushed away from alignment plate 214, and connectors 1604 are automatically disengaged from outlets 404 and fitments 210.

Figure 41:
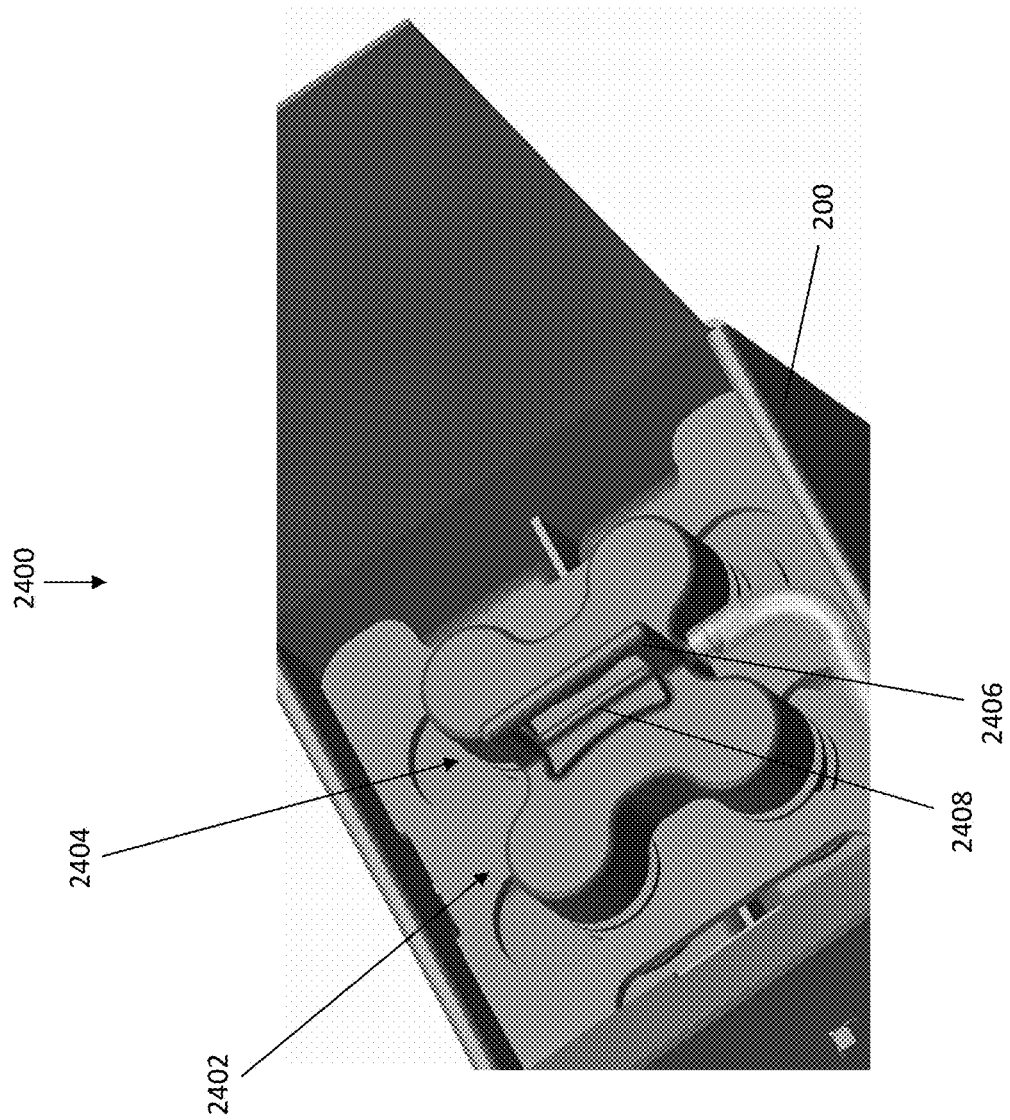
FIG. 41 is a perspective view of another beverage dispensing system.

Referring to FIG. 41, a perspective view of a third embodiment of a beverage dispensing system 2400 is illustrated. Beverage dispensing system 2400 includes a beverage dispensing package 200 (e.g., a box) and a connector assembly 2402 that is removably coupled to box 200.

In an exemplary embodiment, box 200 includes four bags positioned within four compartments created by two dividers. Alternatively, any suitable number of compartments, bags, and dividers may be used with box 200. As described above, box 200 includes an alignment plate 214 and fitments 210.

As illustrated in FIG. 41, connector assembly 2402 includes a handle assembly 2404 that covers a plurality of connectors (not shown). In one embodiment, connector assembly 2402 is substantially similar to connector assembly 702 (shown in FIG. 24) and is usable with the push-pull connectors described therein. Alternatively, connector assembly 2402 may be substantially similar to connector assembly 1602 (shown in FIG. 33) and may be used with the push connectors described therein.

Handle assembly 2404 includes a handle 2406 that enables a user to easily and securely grasp connector assembly 2402 to facilitate engaging or disengaging connector assembly 2402 and alignment plate 214. Handle assembly 2404 also includes a release lever 2408 that enables the user to release the locking member from alignment plate 214. In one embodiment, release lever 2408 causes the actuator plate to move towards the holding plate to release the locking member from alignment plate 214 when the user pulls release lever 2408 toward handle 2406. In other respects, connector assembly 2402 operates substantially similar to connector assembly 702 or connector assembly 1602.

Figure 42:
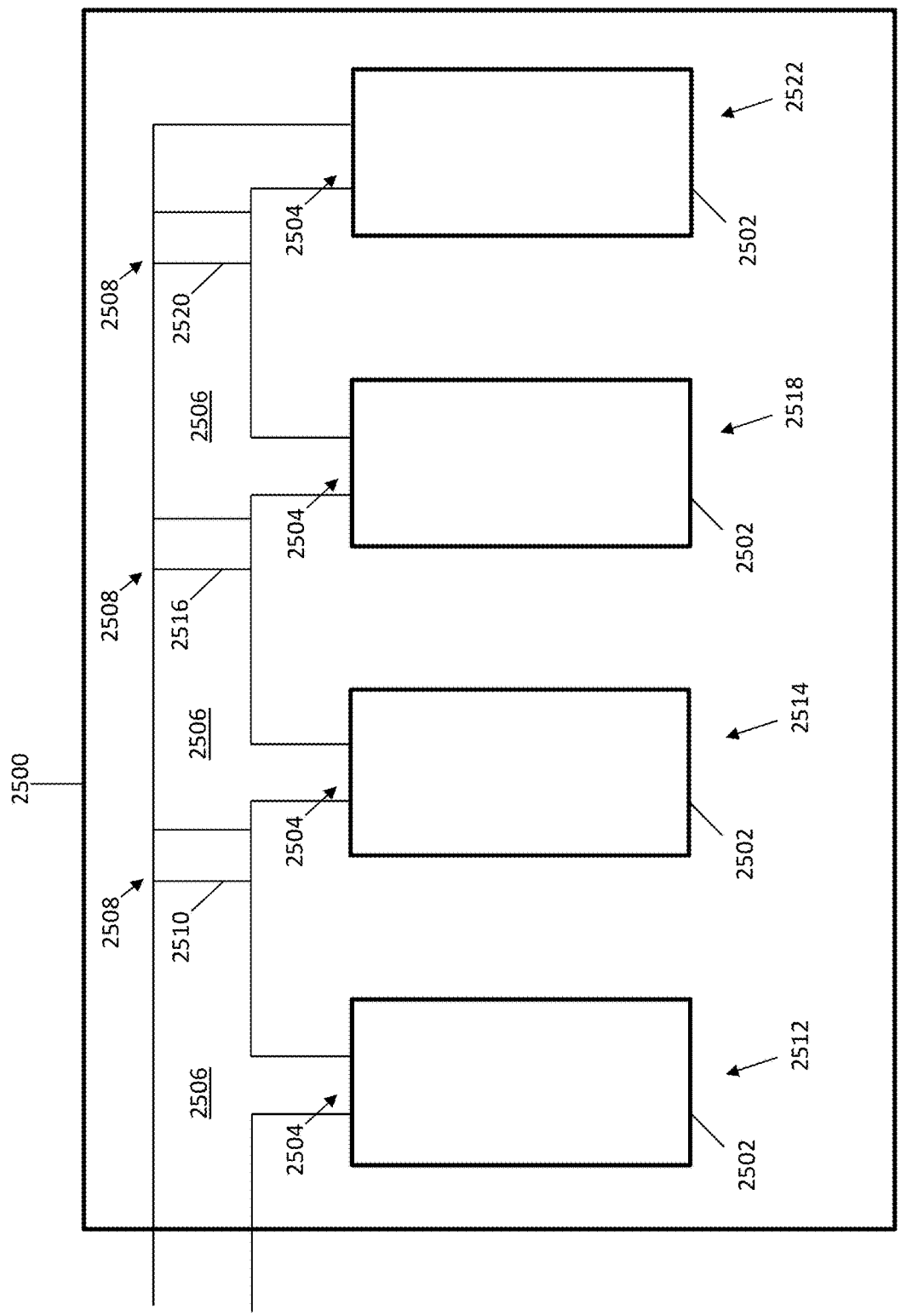
FIG. 42 is a block diagram of a beverage dispensing package having an alternative arrangement of containers.

FIG. 42 is a block diagram of a box 2500 having an alternative arrangement of bags 2502. In the example shown in FIG. 42, bags 2502 each include an outlet 2504 that is coupled to a common internal dispensing line 2506 within box 2500. Internal dispensing line 2506 extends to an exterior of box 2500 and is connectable to any suitable connector, connector assembly, or nozzle to dispense the contents of each bag 2502 through line 2506.

A plurality of membranes or pressure relief valves 2508 are positioned within internal dispensing line 2506. In an exemplary embodiment, each membrane 2508 is positioned between outlets 2504 of two adjacent bags 206 (i.e., an upstream bag and a downstream bag) to prevent the contents of the upstream bag from being dispensed until the downstream bag is fully dispensed. Accordingly, a first membrane 2510 is positioned within internal dispensing line 2506 between an outlet 2504 of a first bag 2512 and an outlet 2504 of a second bag 2514. A second membrane 2516 is positioned within internal dispensing line 2506 between outlet 2504 of second bag 2514 and an outlet 2504 of a third bag 2518. A third membrane 2520 is positioned within internal dispensing line 2506 between outlet 2504 of third bag 2518 and an outlet 2504 of a fourth bag 2522.

Each membrane 2508 is configured to break, open, or otherwise be released when a successively greater pressure is exerted as compared to a downstream membrane 2508. Accordingly, first membrane 2510 is configured to open when a first pressure is exerted on internal dispensing line 2506 (and thus on first membrane 2510), second membrane 2516 is configured to open when a second pressure is exerted on internal dispensing line 2506, and third membrane 2520 is configured to open when a third pressure is exerted on internal dispensing line 2506. In the exemplary embodiment, the first pressure is less than the second pressure, and the second pressure is less than the third pressure.

During operation, when a nozzle or other dispensing mechanism exerts pressure on internal dispensing line 2506, the contents of first bag 2512 are dispensed until first bag 2512 is empty. After first bag 2512 is empty, the pressure increases until it exceeds the first pressure, at which point first membrane 2510 opens. The contents of second bag 2514 now begin to be dispensed. When second bag 2514 is empty, the pressure increases until it exceeds the second pressure. Second membrane 2516 opens and the contents of third bag 2518 begin to be dispensed. When third bag 2518 is empty, the pressure increases until it exceeds the third pressure. Third membrane 2520 opens and the contents of fourth bag 2522 are dispensed. In such a manner, the contents of each bag may be dispensed successively.

Figure 43:
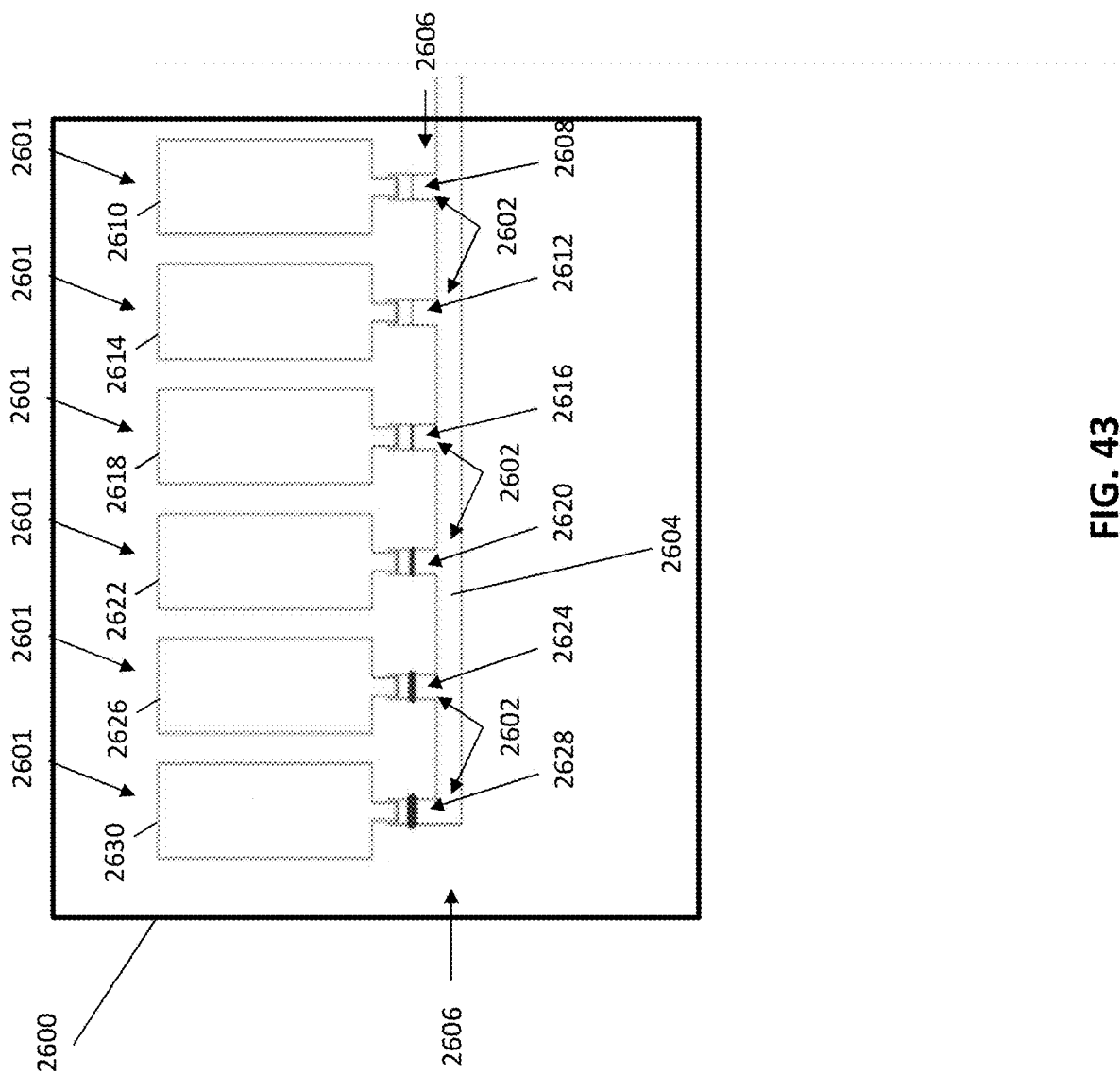
FIG. 43 is a block diagram of another beverage dispensing package having an alternative arrangement of containers.

FIG. 43 is a block diagram of a box 2600 having another alternative arrangement of bags 2601. In the example shown in FIG. 43, bags 2601 each include an outlet 2602 that is coupled to a common internal dispensing line 2604 within box 2600 in a similar manner as box 2500 (shown in FIG. 42). Internal dispensing line 2604 extends to an exterior of box 2600 and is connectable to any suitable connector, connector assembly, or nozzle to dispense the contents of each bag 2601 through line 2604.

A plurality of membranes or pressure relief valves 2606 are positioned within internal dispensing line 2604. In an exemplary embodiment, each membrane 2606 is positioned between an outlet 2602 of a respective bag 2601 and internal dispensing line 2604 to prevent the contents of bag 2601 from being dispensed until membrane 2606 is opened. Accordingly, a first membrane 2608 is positioned between outlet 2602 of a first bag 2610 and internal dispensing line 2604, and a second membrane 2612 is positioned between outlet 2602 of a second bag 2614 and internal dispensing line 2604. A third membrane 2616 is positioned between outlet 2602 of a third bag 2618 and internal dispensing line 2604, and a fourth membrane 2620 is positioned between outlet 2602 of a fourth bag 2622 and internal dispensing line 2604. In addition, in the example shown in FIG. 26, a fifth membrane 2624 is positioned between outlet 2602 of a fifth bag 2626 and internal dispensing line 2604, and a sixth membrane 2628 is positioned between outlet 2602 of a sixth bag 2630 and internal dispensing line 2604.

Each membrane 2606 is configured to break, open, or otherwise be released when a successively greater pressure is exerted as compared to a downstream membrane 2606. Accordingly, in the example shown in FIG. 43, each membrane 2606 has a different thickness or strength as compared to each other membrane. For example, first membrane 2608 has a first thickness, second membrane 2612 has a second thickness that is larger than the first thickness, third membrane 2616 has a third thickness that is larger than the second thickness, and fourth membrane 2620 has a fourth thickness that is larger than the third thickness. In addition, fifth membrane 2624 has a fifth thickness that is larger than the fourth thickness, and sixth membrane 2628 has a sixth thickness that is larger than the fifth thickness. Accordingly, a successively higher pressure is required to open each successive upstream membrane to empty the contents of the associated bag 2601 in a similar manner as described above with reference to FIG. 42.

In an alternative embodiment, the different pressures needed to open each membrane 2606 may be accomplished by using portions of internal dispensing line 2604 having a different diameter. For example, a membrane 2606 associated with each bag outlet 2602 may be positioned in a portion of internal dispensing line 2604 that has a different diameter (and thus a different pressure) than the portions of internal dispensing line 2604 associated with the other membranes 2606.

The arrangement of bags described in FIGS. 42 and 43 enables each bag to be connected to an internal dispensing line, but the contents of each bag are maintained in a separated state until the bags are dispensed. As a result, the box may be shipped with the outlets of the bags in a "divorced" state and the outlets may be efficiently and conveniently connected at a dispensing site.

Figure 44:
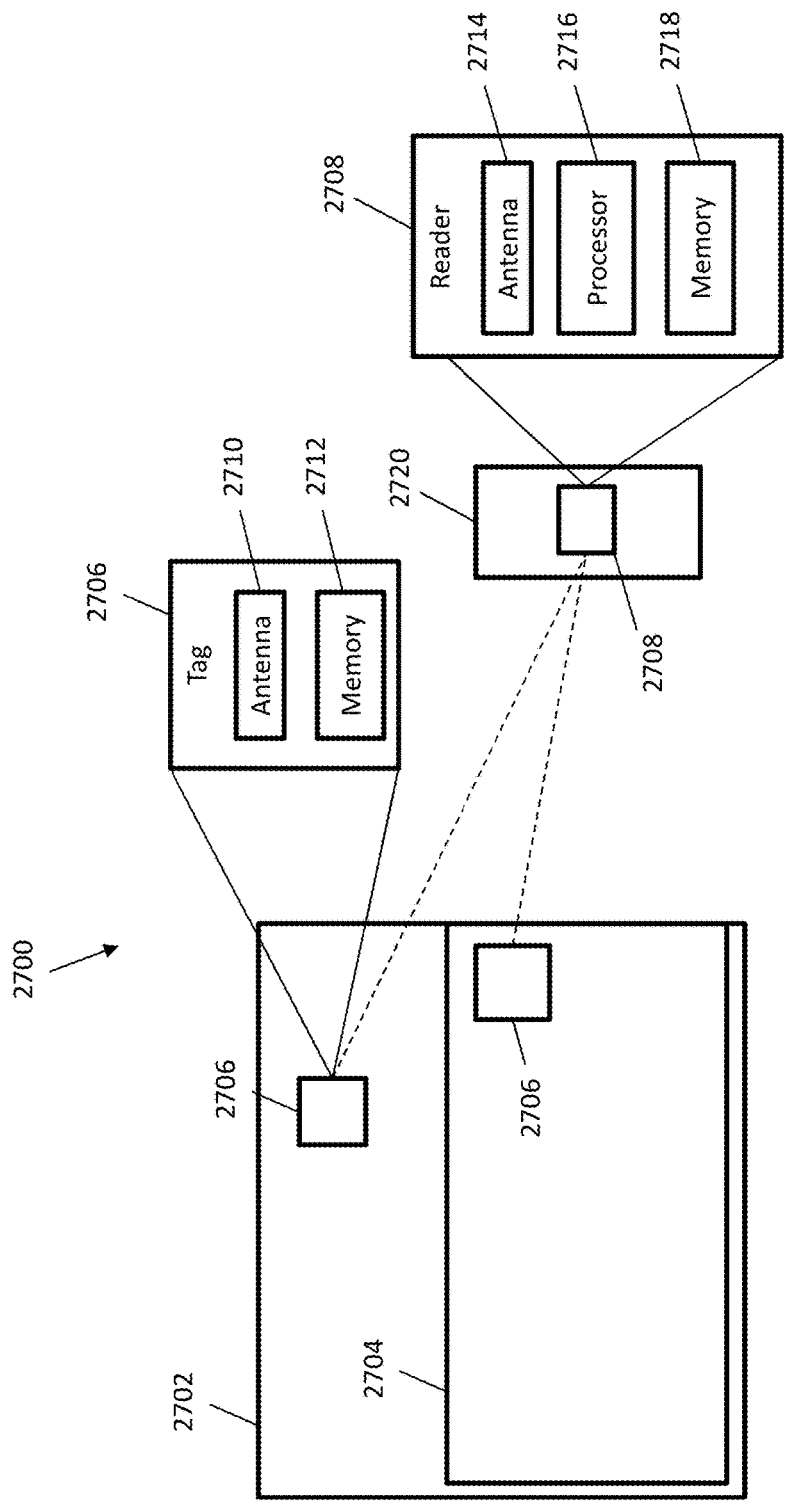
FIG. 44 is a block diagram of an exemplary system that may be used to monitor a beverage dispensing system.

FIG. 44 is a block diagram of an exemplary system 2700 that may be used to monitor a beverage dispensing system. System 2700 may be used with any of the beverage dispensing systems described herein.

In the example shown in FIG. 44, system 2700 includes a box 2702 that includes a plurality of bags 2704 similar to the boxes and bags described in the foregoing embodiments. A programmable tag 2706 is coupled to box 2702 and/or to bags 2704 in the exemplary embodiment. Tag 2706 may be used to determine the contents of box 2702 and/or bags 2704 as described more fully herein. In addition, a tag reader 2708 is provided that is able to read the contents of each tag 2706.

Tag 2706 may include an antenna 2710 and a memory 2712, such as a computer-readable memory. While tag 2706 is described herein as a radio frequency identification (RFID) tag 2706, it should be recognized that tag 2706 may be any suitable tag that is readable by an associated reader. For example, tag 2706 may be embodied as a quick response (QR) code, a bar code, a near field communication (NFC) tag, or any other suitable tag.

Antenna 2710 is configured to receive signals from tag reader 2708 and to provide data stored in memory 2712 in response to the signals received from tag reader 2708.

Memory 2712 stores data related to box 2702 or bag 2704 to which tag 2706 is attached. In an exemplary embodiment, memory 2712 is programmed to include profile data for box 2702 or bag 2704, such as the type of alcoholic beverage (or other liquid) stored in each bag 2704, the alcohol content, a brand name, an age, a production date, and/or a batch number of the alcoholic beverage stored in each bag 2704. Additionally or alternatively, the profile data may include a volume of bag 2704 and/or a volume of the alcoholic beverage stored in bag 2704, a unique identification number of the container (i.e., of bag 2704 or box 2702), a distributor of the alcoholic beverage, and/or any other suitable data. The profile data may be programmed or stored in memory 2712 during a filling process of bag 2704. Alternatively, the profile data may be included in pre-printed labels that may be attached to bags 2704 or boxes 2702 corresponding to the labels.

Still alternatively, a tag 2706 may be affixed to, or included within, bags 2704 and/or boxes 2702 before shipping or transport. Upon receipt of boxes 2702 and/or bags 2704 by the end user, tag reader 2708 scans each tag 2706 and assigns the profile of the contents corresponding to each bag 2704 or box 2702 to the unique identification number of the respective bag 2704 or box 2702.

While tag reader 2708 is described herein as an RFID reader, it should be recognized that tag reader 2708 may be any suitable reader that is designed and capable of reading tags 2706. In the exemplary embodiment, tag reader 2708 includes an antenna 2714, a processor 2716, and a memory 2718.

Antenna 2714 is configured to transmit signals to tags 2706 to request data from tags 2706. In addition, antenna 2714 is configured to receive the signals from tags 2706 in response to the data request.

Processor 2716 is configured to generate the signals to antenna 2714 and to receive the signals from antenna 2714. In addition, processor 2716 may be configured to read data from memory 2718 and to store data in memory 2718.

Memory 2718 is configured to store the data received from tags 2706 when tags 2706 are "read" (i.e., when signals requesting data from tags 2706 are transmitted to tags 2706 and when the data responsive to the requests are received).

In one embodiment, tag reader 2708 is integrated into a connector assembly 2720 to enable connector assembly 2720 to read the profile data from tags 2706 associated with bags 2704 attached to connector assembly 2720. For example, tag reader 2708 may be integrated into each connector, into the holding plate, into the actuator plate, and/or into any suitable portion of connector assembly 2720. Alternatively, tag reader 2708 may be integrated into a stand-alone device, such as a handheld computing device or any other suitable device.

When bags 2704 and boxes 2702 have tags 2706 included therein or affixed thereto, significant operational efficiencies can be gained. A tag reader mounted in close proximity to a container (e.g., a bag 2704 or box 2702) may read the unique identification number of the container.

In one embodiment, tag reader 2708 may store data representative of the profiles (or profile data) associated with bags 2704 that are intended to be used with the beverage dispensing system. If processor 2716 determines that the profile data of a bag 2704 connected to connector assembly 2720, for example, does not match the expected profile data for the beverage dispensing system, processor 2716 may notify a user that bag 2704 does not include the expected profile data.

In another embodiment, tag reader 2708, or another suitable device or system, may calculate the amount of liquids dispensed from each bag 2704 or box 2702. The amount of liquid dispensed can be compared to the amount of liquid expected to be inside bag 2704 or box 2702 based on the profile data of bag 2704 or box 2702. As a result, tag reader 2708 or another suitable device may determine when bag 2704 or box 2702 is empty or has dispensed a predetermined amount or percentage of its contents. A user may then be notified which bag 2704 or box 2702 needs to be replaced.

When bag 2704 or box 2702 is replaced, tag reader 2708 may read the profile data of the replacement bag 2704 or box 2702 and determine that the unique identification number is different than the replaced bag 2704 or box 2702, for example. Accordingly, tag reader 2708 or another device or system may determine that a replacement bag or box has been provided, and may reset or begin to recalculate the amount of liquid dispensed by the new bag or box.

Tag reader 2708 or another device may also verify that the same type of alcoholic beverage is included in the replacement bag or box as compared to the replaced bag or box. If the type of beverage is different, the beverage dispensing system may be prevented from dispensing the contents of the replacement bag or box unless a user explicitly approves the dispensing, for example.

Tag reader 2708 or another device or component of the beverage dispensing system can store the profile data of each tag 2706 of each bag 2704 or box 2702 and may, for example, store the amount of liquid dispensed by each container. In case a previously used container is put back in the beverage dispensing system, tag reader 2708 is able to determine whether that container is empty or not. If the container is not empty, the system will continue to keep track of the amount of liquid dispensed by that specific container until the system determines that the container is empty. If the container is determined to be empty, tag reader 2708 or another device or component of beverage dispensing system may notify a user and the container will need to be replaced before normal operations can continue. In one embodiment, an acceptable empty tolerance level (or waste level) can be pre-set by the user of tag reader 2708 or the beverage dispensing system, thereby allowing containers to be exchanged before they are completely empty.

Tag reader 2708 or another device or component of the beverage dispensing system can alert the user about the status of the tagged containers through a light or audible signal, for example, or in any other suitable manner. The status that the user may be notified of may include, for example, that a container needs to be replaced, a container is close to being replaced (falls within the waste tolerance zone), or that a container is still able to dispense its contents. The status can also indicate that the contents of the container have not been assigned to a particular box 2702 or to a particular location within the beverage dispensing system, for example. This may help prevent cross-contamination of materials by the beverage dispensing system.

In the embodiments described herein, the connectors of each connector assembly are separate connectors that are connected together by one or more dispensing lines. In an alternative embodiment, the connectors of a connector assembly may be unitarily formed within a single common package. For example, a single connector package may include a plurality of holes, receptacles, or other connectors for receiving or connecting to the fitments of the bags. Alternatively, the fitments of the bags within a box may be connected to individual dispensing lines that are then connected to individual holes, receptacles, or other connectors within the unitarily formed connector package. The unitarily formed package may then dispense the alcoholic beverage received from the bags through a common or main outlet. Still alternatively, the unitarily formed connector package may be included within a nozzle such that the dispensing lines or the fitments of the bags may be connected directly to connectors formed within a single nozzle or the like.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use with a beverage dispensing system, comprising:
    a memory device storing a system execution program including computer instructions;
    a database coupled to the beverage dispensing system for storing (1) data records related to a plurality of users of the system and (2) recipe records related to a plurality of beverages;
    a server coupled to the memory device and the database, the server including a processor programmed to execute the system execution program to establish a creation engine;
    wherein at least one of the users is a creator and the creation engine is programmed to allow the creator to create and/or edit a beverage recipe and store/update the beverage recipe in the database in one of the recipe records, the dispensing system being configured to dispense a beverage as a function of the beverage recipe stored in the one of the recipe records, wherein the processor executes the system execution program to establish a licensing engine, wherein the licensing engine is programmed to provide a commission to the creator in response to the dispensing system dispensing the beverage as a function of the beverage recipe stored in the one of the recipe records.

2. A system, as set forth in claim 1, further including a creator application, the creator application configured to be run by a processor on a creator device and used by the creator, the processor of the server being programmed by the system execution program to allow the creator to create and/or edit a beverage recipe using the creator application.

3. A system, as set forth in claim 2, wherein the database is configured to store ingredient records related to ingredients available to be used in beverage recipes, the creator application being programmed to allow the creator to select from the ingredient records ingredients to be used in the beverage recipe.

4. A system, as set forth in claim 3, wherein the database includes a list of ingredient combinations and a classification for each ingredient combination, wherein the classification may be one of possible, not preferred and not advisable.

5. A system, as set forth in claim 1, further including an operator application, the operator application configured to be run by a processor on an operator device and used by an operator associated with the beverage dispensing system, the processor of the server being programmed by the system execution program to establish a subscription engine, the subscription engine is programmed to allow the operator to select one or more beverage recipes stored in the database and to download the selected recipes to the beverage dispensing system.

6. A system, as set forth in claim 5, wherein operator application is programmed to allow the operator to search the recipe records based on at least one characteristic of the beverage recipes or ingredients.

7. A system, as set forth in claim 6, wherein the at least characteristic includes one or more of the following: creator, key ingredient, brand name of one of the ingredients, popularity.

8. A system, as set forth in claim 1, further including a consumer application, the consumer application being configured to be run by a processor on a consumer device and used by a consumer to order a beverage from the beverage dispensing system.

9. A system, as set forth in claim 8, wherein the consumer application is programmed to allow the consumer to create and/or edit a consumer beverage recipe using the consumer application.

10. A system, as set forth in claim 8, wherein the system is linked to a plurality of beverage dispensing systems and consumer application is programmed to allow the consumer to view and search the beverages available at each beverage dispensing system.

11. A system, as set forth in claim 8, wherein the consumer application is programmed to validate an age of the consumer before the beverage is dispensed.

12. A system, as set forth in claim 1, wherein the database includes a plurality of regulatory records, the plurality of regulatory records includes a set of rules related to the recipe records.

13. A system, as set forth in claim 12, wherein the set of rules are related to one or more of the following: (1) max volume of alcohol per recipe, (2) percentage of alcohol content, (3) amount of sugar per recipe, and (4) number of ingredients, (5) set a limit for any ingredient (min/max).

14. A system, as set forth in claim 12, wherein the creation engine is further programmed to compare the one of the recipes against the regulatory records and provide an indication of the comparison to the creator.

15. A system, as set forth in claim 12, wherein the recipe ratios are automatically adjusted to ensure compliance with the regulatory records before the beverage is dispensed.

16. A system, as set forth in claim 12, wherein the recipe ratios are automatically adjusted as a function of a geographical location associated with the dispensing system before the beverage is dispensed.

17. A system, as set forth in claim 12, wherein the creation engine is further programmed to compare the one of the recipes against the regulatory records and provide an indication of the comparison to the creator.

18. A system, as set forth in claim 1, wherein the database includes a plurality of operator records, the plurality of operator records includes a set of rules related to the recipe records.

19. A system, as set forth in claim 18, wherein the creation engine is further programmed to compare the recipes against the operator records and provide an indication of the comparison to the creator.

20. A system, as set forth in claim 18, wherein the recipe ratios are automatically adjusted to ensure compliance with the operator records before the beverage is dispensed.

21. A system, as set forth in claim 18, wherein the creation engine is further programmed to compare the one of the recipes against the operator records and provide an indication of the comparison to the creator.

22. A system, as set forth in claim 1, wherein the server executes the system execution program to establish a data analysis function, the data analysis function being programmed to maintain one or more lists of creators based on popularity.

23. A method for use with a beverage dispensing system, comprising:
    storing (1) data records related to a plurality of users of the system and (2) recipe records related to a plurality of beverages in a database, wherein at least one of the users is a creator;
    establishing a creation engine by a server coupled to the database;
    allowing the creator, using the creation engine, to create and/or edit a beverage recipe and storing/updating the beverage recipe in the database in one of the recipe records;
    providing a dispensing system access to the recipe records stored in the database;
    allowing a consumer to request a beverage from the dispensing system, the beverage being a function of the beverage recipe stored in the one of the recipe records;
    establishing a licensing engine by the server; and,
    providing, by the licensing engine, a commission to the creator in response to the dispensing system dispensing the beverage as a function of the beverage recipe stored in the one of the recipe records.

24. A method, as set forth in claim 23, further including the step of providing a creator application configured to be run by a processor on a creator device and used by the creator, the method including the step of allowing the creator to create and/or edit a beverage recipe using the creator application.

25. A method, as set forth in claim 24, including the steps of storing ingredient records related to ingredients available to be used in beverage recipes in the database and allowing the creator, using the creator application, to select from the ingredient records ingredients to be used in the beverage recipe.

26. A method, as set forth in claim 25, wherein the database includes a list of ingredient combinations and a classification for each ingredient combination, wherein the classification may be one of possible, not preferred and not advisable.

27. A method, as set forth in claim 23, including the step of providing an operator application configured to be run by a processor on an operator device and used by an operator associated with the beverage dispensing system, the method including the steps of establishing a subscription engine and allowing the operator, using the subscription engine, to select one or more beverage recipes stored in the database and to download the selected recipes to the beverage dispensing system.

28. A method, as set forth in claim 27, including the step of allowing the operator, using the operator application, to search the recipe records based on at least one characteristic of the beverage recipes or ingredients.

29. A method, as set forth in claim 28, wherein the at least characteristic includes one or more of the following: creator, key ingredient, brand name of one of the ingredients, popularity.

30. A method, as set forth in claim 23, including the step of providing a consumer application configured to be run by a processor on a consumer device and allowing a consumer to order a beverage from the beverage dispensing system.

31. A method, as set forth in claim 30, including the step of allowing the consumer, using the consumer application to create and/or edit a consumer beverage recipe.

32. A method, as set forth in claim 30, including the step of allowing the consumer to view and search the beverages available at each beverage dispensing system using the consumer application.

33. A method, as set forth in claim 30, including the step of validating, using the consumer application, an age of the consumer before the beverage is dispensed.

34. A method, as set forth in claim 23, wherein the database includes a plurality of regulatory records, the plurality of regulatory records includes a set of rules related to the recipe records.

35. A method, as set forth in claim 34, wherein the set of rules are related to one or more of the following: (1) max volume of alcohol per recipe, (2) percentage of alcohol content, (3) max volume of alcohol per recipe, (4) number of ingredients, and (5) set a limit for any ingredient (min/max).

36. A method, as set forth in claim 34, including the steps of comparing, by the creation engine, the one of the recipes against the regulatory records and providing an indication of the comparison to the creator.

37. A method, as set in claim 34, wherein the recipe ratios are automatically adjusted to ensure compliance with the regulatory records before the beverage is dispensed.

38. A method, as set forth in claim 34, wherein the recipe ratios are automatically adjusted as a function of a geographical location associated with the dispensing system before the beverage is dispensed.

39. A method, as set forth in claim 34, wherein the creation engine is further programmed to compare the one of the recipes against the regulatory records and provide an indication of the comparison to the creator.

40. A method, as set forth in claim 23, wherein the database includes a plurality of operator records, the plurality of operator records includes a set of rules related to the recipe records.

41. A method, as set forth in claim 40, wherein the creation engine is further programmed to compare the recipes against the operator records and provide an indication of the comparison to the creator.

42. A method, as set forth in claim 40, wherein the recipe ratios can automatically be adjusted to ensure compliance the operator records before the beverage is dispensed.

43. A method, as set forth in claim 40, wherein the creation engine is further programmed to compare the one of the recipes against the operator records and provide an indication of the comparison to the creator.

44. A method, as set forth in claim 23, including the step of providing a data analysis function, the data analysis function performing the step of maintaining one or more lists of creators based on popularity.

* * * * *